US010000608B2

(12) United States Patent
Cheng et al.

(10) Patent No.: US 10,000,608 B2
(45) Date of Patent: Jun. 19, 2018

(54) DYNAMIC UREA BONDS FOR REVERSIBLE AND SELF-HEALING POLYMERS

(71) Applicant: THE BOARD OF TRUSTEES OF THE UNIVERSITY OF ILLINOIS, Urbana, IL (US)

(72) Inventors: Jianjun Cheng, Urbana, IL (US); Hanze Ying, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 0 days. days.

(21) Appl. No.: 14/776,104

(22) PCT Filed: Mar. 14, 2014

(86) PCT No.: PCT/US2014/028996
§ 371 (c)(1),
(2) Date: Sep. 14, 2015

(87) PCT Pub. No.: WO2014/144539
PCT Pub. Date: Sep. 18, 2014

(65) Prior Publication Data

US 2016/0032054 A1 Feb. 4, 2016

Related U.S. Application Data

(60) Provisional application No. 61/799,144, filed on Mar. 15, 2013.

(51) Int. Cl.

| | |
|---|---|
| ***C08G 71/02*** | (2006.01) |
| ***C08G 18/73*** | (2006.01) |
| ***C08G 18/75*** | (2006.01) |
| ***C09D 175/04*** | (2006.01) |
| ***C08G 18/32*** | (2006.01) |

(Continued)

(52) U.S. Cl.
CPC ......... *C08G 71/02* (2013.01); *C08G 18/3206* (2013.01); *C08G 18/3228* (2013.01); *C08G 18/3246* (2013.01); *C08G 18/3278* (2013.01); *C08G 18/73* (2013.01); *C08G 18/757* (2013.01); *C08G 18/758* (2013.01); *C08G 18/833* (2013.01); *C09D 175/04* (2013.01); *C09J 175/04* (2013.01)

(58) Field of Classification Search
CPC .................................................. C08G 18/325
USPC ........................................................ 525/452
See application file for complete search history.

(56) References Cited

U.S. PATENT DOCUMENTS 3,637,573 A * 1/1972 Mise et al. ........... C08G 18/089 524/722
5,081,212 A * 1/1992 Prass ..................... B05D 1/202 428/411.1

(Continued)

*Primary Examiner* — Michael M Dollinger
(74) *Attorney, Agent, or Firm* — Dilworth IP LLC

(57) ABSTRACT

The disclosure provides reversible polymers from polyurea by modifying the nitrogen atom with hindered substituents. The reversibility of hindered urea bond (HUB) can be controlled by changing the bulkiness of the substituents, and N-tert-butyl-N-ethylurea (TBEU), with its high binding constant and short lifetime, is applicable in the design of reversible polymer and self-healing materials at mild temperatures without external stimuli. HUB can be used in the design of smart materials with its adjustable reversibility, facile synthesis, and compatibility with many other polymer structures.

11 Claims, 18 Drawing Sheets d)

| | TMPCA | TBIPU | TBEU | DIPU | DEU |
|---|---|---|---|---|---|
| $K_{eq}$ ($M^{-1}$) | 88 | $5.8\times10^3$ | $7.9\times10^5$ | $>10^7$ | $>10^7$ |
| $k_{-1}$ ($h^{-1}$) | - | - | 0.042(0.21[a]) | 0.0015[a] | 0.0011[a] |

*a: tested at 37 °C

(51) Int. Cl.
*C09J 175/04* (2006.01)
*C08G 18/83* (2006.01)

(56) References Cited

U.S. PATENT DOCUMENTS

| | | | | | |
|---|---|---|---|---|---|
| 2004/0171786 | A1* | 9/2004 | Klein | C08G 18/10 | 528/61 |
| 2007/0208157 | A1* | 9/2007 | Posey | C08G 18/3821 | 528/44 |
| 2007/0270566 | A1* | 11/2007 | Lee | C07C 211/09 | 528/61 |
| 2009/0283932 | A1* | 11/2009 | Petrichko | A63B 37/0023 | 264/250 |
| 2009/0324974 | A1* | 12/2009 | Bulluck | C08G 18/10 | 428/458 |
| 2010/0273008 | A1* | 10/2010 | Burckhardt | C08G 18/10 | 428/423.1 |
| 2013/0018147 | A1* | 1/2013 | Anater | C08G 18/10 | 524/590 |
| 2013/0253084 | A1* | 9/2013 | Duggal | C08G 18/10 | 521/124 |
| 2013/0344340 | A1* | 12/2013 | Senkfor | C08G 18/10 | 428/419 |

* cited by examiner

1

2a-2e 3a-3e a TMPCA b TBIPU c TBEU d DIPU e DEU d)

| | TMPCA | TBIPU | TBEU | DIPU | DEU |
|---|---|---|---|---|---|
| $K_{eq}$ ($M^{-1}$) | 88 | **$5.6x10^3$** | **$7.9x10^5$** | $>10^7$ | $>10^7$ |
| $k_{-1}$ ($h^{-1}$) | - | - | 0.042(0.21[a]) | 0.0015[a] | 0.0011[a] |

*a: tested at 37 °C

6

| Cross-linked polymer 6 | 6a | 6c | 6e |
|---|---|---|---|
|  5 |  5a |  5c |  5e |
| HUB type | TMPCA | TBEU | DEU | i)

iii)

| | $[1]_0$ (M) | $[2a]_0$ (M) | $[1]_{eq}$ (M) | $[2a]_{eq}$ (M) | $[3a]_{eq}$ (M) | $K_{eq}$ ($M^{-1}$) |
|---|---|---|---|---|---|---|
| a) | 0.160 | 0.139 | 0.049 | 0.028 | 0.111 | 81 |
| b) | 0.147 | 0.180 | 0.025 | 0.058 | 0.122 | 84 |
| c) | 0.157 | 0.270 | 0.013 | 0.126 | 0.144 | 88 |

i)

ii)

| T(°C) | $[\mathbf{1}]_0$ (M) | $[\mathbf{2a}]_0$ (M) | $[\mathbf{1}]_{eq}$ (M) | $[\mathbf{2a}]_{eq}$ (M) | $[\mathbf{3a}]_{eq}$ (M) | $K_{eq}$ ($M^{-1}$) |
|---|---|---|---|---|---|---|
| 22 | 0.110 | 0.107 | 0.032 | 0.029 | 0.078 | 84 |
| 30 | 0.110 | 0.107 | 0.037 | 0.034 | 0.073 | 58 |
| 40 | 0.110 | 0.107 | 0.042 | 0.039 | 0.068 | 42 |
| 50 | 0.110 | 0.107 | 0.053 | 0.050 | 0.057 | 22 |
| 55 | 0.110 | 0.107 | 0.057 | 0.054 | 0.053 | 17 |

iii)

i)

3c 2f 3f 2c ii)

| t(h) | $[3c]/[3c]_0$ | $[2c]/[3c]_0$ | $ln([3c]/[3c]_0-A)$ |
|---|---|---|---|
| 0.00 | 0.97 | 0.03 | -0.17 |
| 0.25 | 0.93 | 0.07 | -0.22 |
| 0.42 | 0.88 | 0.12 | -0.29 |
| 0.58 | 0.86 | 0.14 | -0.31 |
| 0.75 | 0.84 | 0.16 | -0.34 |
| 0.92 | 0.81 | 0.19 | -0.39 |
| 1.00 | 0.80 | 0.20 | -0.40 |
| 1.25 | 0.76 | 0.24 | -0.46 |
| 1.50 | 0.73 | 0.27 | -0.51 |
| 2.00 | 0.66 | 0.34 | -0.63 |
| 2.50 | 0.59 | 0.41 | -0.78 |
| 3.33 | 0.51 | 0.49 | -0.97 |
| 5.17 | 0.40 | 0.60 | -1.31 |
| 8.42 | 0.23 | 0.73 | -2.12 |
| 13.58 | 0.16 | 0.84 | -3.51 |
| 14.08 | 0.16 | 0.84 | -3.51 |
| 18.67 | 0.13 | 0.87 | / |
| 44.50 | 0.13 | 0.87 | / |

iii)

3c 7 2c

DYNAMIC UREA BONDS FOR REVERSIBLE AND SELF-HEALING POLYMERS

CROSS-REFERENCE

This disclosure claims priority to U.S. Provisional Patent Application Ser. No. 61/799,144, filed Mar. 15, 2013, and entitled "Dynamic Urea Bonds for Reversible and Self-Healing Polymers," the disclosure of which is incorporated herein by reference in its entirety.

GOVERNMENT SUPPORT

This invention was made with government support under contract number CHE 1153122 awarded by the National Science Foundation and 1DP2OD007246-01 awarded by the National Institutes of Health. The United States Government has certain rights in the invention.

BACKGROUND

Differing from polymers formed with strong, irreversible covalent bonds with stable bulk properties, polymers prepared through reversible non-covalent interaction or covalent bonds exhibit dynamic properties. The dynamic features of reversible polymers have been employed in the design of self-healing, shape-memory, stimuli-responsive, and environmentally adaptive materials. Non-covalent interactions are relatively weak and lack directionality with only a few exceptions, such as quadruple hydrogen bonding, high-valence metal chelation, and host-guest interaction. Dynamic covalent bonds, on the contrary, usually have higher strength and more controllable reversibility. Well-known dynamic covalent bonds or structures include imine, substituted cyclohexene capable of retro-Diels-Alder reaction, and thiol radical species amenable for radical association-dissociation. These dynamic chemistries have formed laboratory polymers with special properties and functions. Recently, interest has grown in designing dynamic covalent chemistry applicable in conventional polymers of widespread utility. No catalyst-free, room-temperature dynamic covalent chemistries have been reported for the synthesis of reversible polymers of industrial interest and broad application.

SUMMARY

Reversible polymers feature chain reorganization and environmental adaptation properties attributed to their dynamic backbone bonding and fast association/dissociation processes. This disclosure provides catalyst-free, room-temperature dynamic chemistries for the synthesis of reversible polymers of industrial interest and broad application. By modifying the nitrogen atom of a polyurea with hindered substituents, a polyurea can transformed into a reversible polymer. The reversibility of hindered urea bonds (HUB) can be controlled by changing the bulkiness of the substituents. N-tert-butyl-N-ethylurea (TBEU) has a high binding constant and short lifetime, and can be used in the design of reversible polymer and self-healing material at mild temperature (about 23° C.) without any external stimuli. As a member of the dynamic covalent chemistry family, HUB can be used in the design of smart materials with its adjustable reversibility, facile synthesis, and compatibility with many other polymer structures.

The disclosure thus provides polymers having dynamic urea bonds. The disclosure further provides methods for the synthesis of polyurea, one of the most widely used materials in coating, fiber, adhesive, and plastics industries. The dynamic polyurea is highly reversible and capable of catalyst-free, room-temperature self-healing.

Accordingly, the disclosure provides a polyurea polymer of Formula (I):

(I)

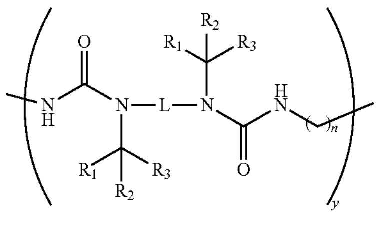

wherein $R_1$, $R_2$, and $R_3$ are independently selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, and H;

L is selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, —O—, —S—, —$NR_1$—, =N—, —$CX_2$—, —NC(=O)$(C_1\text{-}C_{20})$alkyl-, —C(=O)$(C_1\text{-}C_{20})$alkyl-, —C(=O)—($NR_1$)—, —S(=O)$_2$O—, —S(=O)$_2$—$(C_1\text{-}C_{20})$alkyl-, —OS(=O)$_2$O$(C_1\text{-}C_{20})$alkyl-, —S(=O)$_2$$NR_1$—, —S(=O)$C_1\text{-}C_{20}$)alkyl-, —OP(=O)($OR_1$)—, —P(=O)($OR_1$)—, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, —C(O)$NR_1$—$(C_1\text{-}C_{20})$alkyl-, and —C($NR_1$)$NR_1$—;

n is 2 to 12; and y is about 5 to about 500.

The disclosure also provides a polyurea polymer of Formula (Ia):

(Ia)

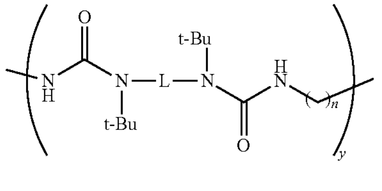

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, or $(C_2\text{-}C_{20})$alkyl-PEG-$(C_2\text{-}C_{20})$alkyl;

n is 2-12; and y is about 5 to about 500.

The disclosure also provides a copolymer comprising a poly(urea-urethane) of Formula (II):

(II)

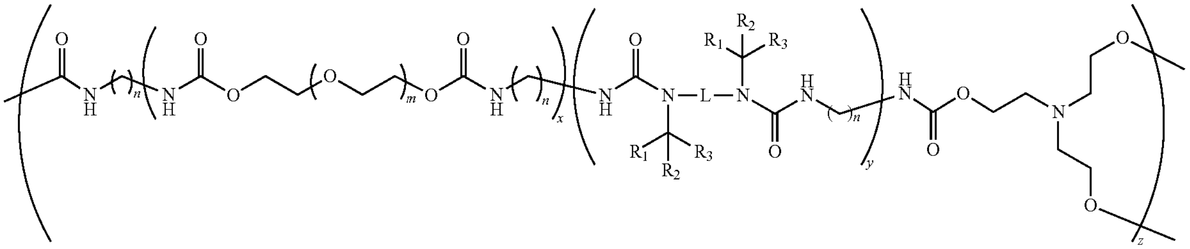

wherein n is 2 to 12;

m is 2 to 50;

x is 0 to 100;

y is 1 to 100;

z is 1 to 50;

$R_1$, $R_2$, and $R_3$ are independently selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, and H;

L is selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, —O—, —S—, $—NR_1—$, =N—, $—CX_2—$, —NC(=O)$(C_1\text{-}C_{20})$alkyl-, —C(=O)$(C_1\text{-}C_{20})$alkyl-, —C(=O)—$(NR_1)$—, $—SO(=O)_2O—$, $—S(=O)_2—(C_1\text{-}C_{20})$alkyl-, $—OS(=O)_2O(C_1\text{-}C_{20})$alkyl-, $—S(=O)_2NR_1—$, $—S(=O)C_1\text{-}C_{20})$alkyl-, $—OP(=O)(OR_1)—$, $—P(=O)(OR_1)—$, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, $—C(O)NR_1—(C_1\text{-}C_{20})$alkyl-, and $—C(NR_1)NR_1—$.

The disclosure also provides a copolymer comprising a poly(urea-urethane) of Formula (IIa):

(IIa)

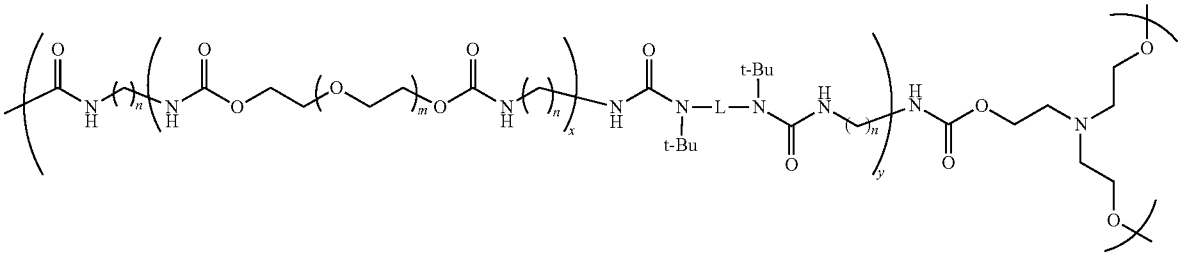

wherein n is 2-12;

m is 2-50;

x is 0-100;

y is 1-100;

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, or $(C_2\text{-}C_{20})$alkyl-PEG-$(C_2\text{-}C_{20})$alkyl.

The disclosure further provides a polyurea polymer of Formula (III):

(III)

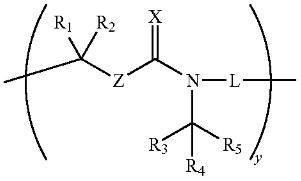

wherein $R_1$ and $R_2$ are independently selected from the group consisting of $(C_1\text{-}C_{20})$alkyl and H;

$R_3$, $R_4$, and $R_5$ are independently selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, and H;

X is O or S;

L is selected from the group consisting of a linear, branched or network polymer or a small molecule linker, $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, phenyl, $(C_1\text{-}C_{20})$alkylphenyl$(C_1\text{-}C_{20})$alkyl, —O—, —S—, $—NR_1—$, =N—, $—CX_2—$, —NC(=O)$(C_1\text{-}C_{20})$alkyl-, —C(=O)$(C_1\text{-}C_{20})$alkyl-, —C(=O)—$(NR_1)$—, —S(═O)$_2$O—, —S(═O)$_2$—($C_1$-$C_{20}$)alkyl-, —OS(═O)$_2$O($C_1$-$C_{20}$)alkyl-, —S(═O)$_2$NR$_1$—, —S(═O)$C_1$-$C_{20}$)alkyl-, —OP(═O)(OR$_1$)—, —P(═O)(OR$_1$)—, —C(S)—($C_1$-$C_{20}$)alkyl-, —C(O)O($C_1$-$C_{20}$)alkyl-, —C(═O)O—, —C(═S)O($C_1$-$C_{20}$)alkyl-, —C(═))S($C_1$-$C_{20}$)alkyl-, —C(═S)S($C_1$-$C_{20}$)alkyl-, —C(O)NR$_1$—($C_1$-$C_{20}$)alkyl-, and —C(NR$_1$)NR$_1$—; and y is about 5 to about 500.

The disclosure further provides a polyurea polymer of Formula (III) having Formula (IIIa):

(IIIa)

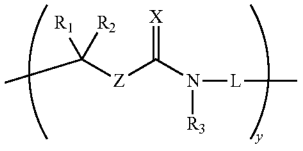

wherein

- $R_1$ is ($C_2$-$C_{20}$)alkyl or H;
- $R_2$ is ($C_2$-$C_{20}$)alkyl or H;
- $R_3$ is t-Bu i-Pr, Et, Me, cycloalkyl, adamantyl, phenyl, or a bulky alkyl or aryl group;
- X is O or S;
- Z is O, S or NH;
- L is a linear, branched or network polymer or a small molecule linker, ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, phenyl, or ($C_1$-$C_{20}$)alkylphenyl($C_1$-$C_{20}$)alkyl; and
- y is about 5 to about 500.

The disclosure further provides a polyurea polymer of Formula (III) having Formula (Mb):

(IIIb)

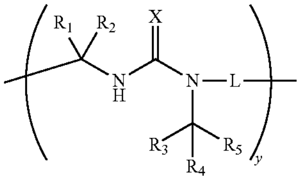

wherein

- $R_1$ and $R_2$ are independently selected from the group consisting of ($C_1$-$C_{20}$)alkyl and H;
- $R_3$, $R_4$, and $R_5$ are independently selected from the group consisting of ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H;
- X is O or S;
- L is selected from the group consisting of a linear, branched or network polymer or a small molecule linker, ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, phenyl, ($C_1$-$C_{20}$)alkylphenyl($C_1$-$C_{20}$)alkyl, —O—, —S—, —NR$_1$—, ═N—, —CX$_2$—, —NC(═O)($C_1$-$C_{20}$)alkyl-, —C(═O)($C_1$-$C_{20}$)alkyl-, —C(═O)—(NR$_1$)—, —S(═O)$_2$O—, —S(═O)$_2$—($C_1$-$C_{20}$)alkyl-, —OS(═O)$_2$O($C_1$-$C_{20}$)alkyl-, —S(═O)$_2$NR$_1$—, —S(═O)$C_1$-$C_{20}$)alkyl-, —OP(═O)(OR$_1$)—, —P(═O)(OR$_1$)—, —C(S)—($C_1$-$C_{20}$)alkyl-, —C(O)O($C_1$-$C_{20}$)alkyl-, —C(═O)O—, —C(═S)O($C_1$-$C_{20}$)alkyl-, —C(═O)S($C_1$-$C_{20}$)alkyl-, —C(═S)S($C_1$-$C_{20}$)alkyl-, —C(O)NR$_1$—($C_1$-$C_{20}$)alkyl-, and —C(NR$_1$)NR$_1$—; and
- y is about 5 to about 500.

The disclosure yet further provides a polyurea polymer of Formula (IV):

(IV)

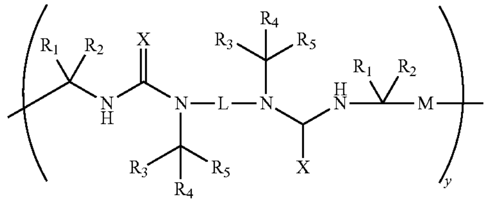

wherein

- L is selected from the group consisting of ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, phenyl, ($C_1$-$C_{20}$)alkylphenyl($C_1$-$C_{20}$)alkyl, —O—, —S—, —NR$_1$—, ═N—, —CX$_2$—, —NC(═O)($C_1$-$C_{20}$)alkyl-, —C(═O)($C_1$-$C_{20}$)alkyl-, —C(═O)—(NR$_1$)—, —S(═O)$_2$O—, —S(═O)$_2$—($C_1$-$C_{20}$)alkyl-, —OS(═O)$_2$O($C_1$-$C_{20}$)alkyl-, —S(═O)$_2$NR$_1$—, —S(═O)$C_1$-$C_{20}$)alkyl-, —OP(═O)(OR$_1$)—, —P(═O)(OR$_1$)—, —C(S)—($C_1$-$C_{20}$)alkyl-, —C(O)O($C_1$-$C_{20}$)alkyl-, —C(═O)O—, —C(═S)O($C_1$-$C_{20}$)alkyl-, —C(═O)S($C_1$-$C_{20}$)alkyl-, —C(═S)S($C_1$-$C_{20}$)alkyl-, —C(O)NR$_1$—($C_1$-$C_{20}$)alkyl-, and —C(NR$_1$)NR$_1$—;
- M is selected from the group consisting of ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, phenyl, ($C_1$-$C_{20}$)alkylphenyl($C_1$-$C_{20}$)alkyl, —O—, —S—, —NR$_1$—, ═N—, —CX$_2$—, —NC(═O)($C_1$-$C_{20}$)alkyl-, —C(═O)($C_1$-$C_{20}$)alkyl-, —C(═O)—(NR$_1$)—, —S(═O)$_2$O—, —S(═O)$_2$—($C_1$-$C_{20}$)alkyl-, —OS(═O)$_2$O($C_1$-$C_{20}$)alkyl-, —S(═O)$_2$NR$_1$—, —S(═O)$C_1$-$C_{20}$)alkyl-, —OP(═O)(OR$_1$)—, —P(═O)(OR$_1$)—, —C(S)—($C_1$-$C_{20}$)alkyl-, —C(O)O($C_1$-$C_{20}$)alkyl-, —C(═O)O—, —C(═S)O($C_1$-$C_{20}$)alkyl-, —C(═O)S($C_1$-$C_{20}$)alkyl-, —C(═S)S($C_1$-$C_{20}$)alkyl-, —C(O)NR$_1$—($C_1$-$C_{20}$)alkyl-, and —C(NR$_1$)NR$_1$—;
- $R_1$ and $R_2$ are independently selected from the group consisting of ($C_2$-$C_{20}$)alkyl and H;
- $R_3$, $R_4$, and $R_5$ are independently selected from the group consisting of ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H;
- X is O or S; and
- y is about 5 to about 500.

The disclosure yet further provides a polyurea polymer of Formula (IVa):

(IVa)

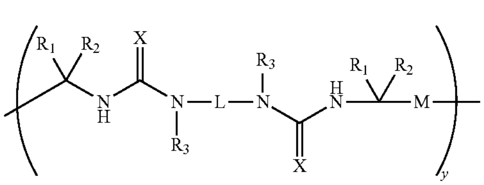

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10}$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, phenyl, or $(C_1\text{-}C_{20})$alkylphenyl$(C_1\text{-}C_{20})$alkyl;

M is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, phenyl, or $(C_1\text{-}C_{20})$alkylphenyl$(C_1\text{-}C_{20})$alkyl;

$R_1$ is $(C_2\text{-}C_{20})$alkyl, H;

$R_2$ is $(C_2\text{-}C_{20})$alkyl, H;

$R_3$ is t-Bu, i-Pr, Et, Me, cycloalkyl, adamantyl, phenyl, or bulky aryl or alkyl group;

X is O or S; and y is about 5 to about 500.

The disclosure additionally provides a polyurea polymer of Formula (V):

(V)

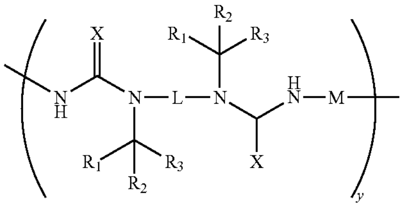

wherein

L is selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, phenyl, $(C_1\text{-}C_{20})$alkylphenyl$(C_1\text{-}C_{20})$alkyl, —O—, —S—, —$NR_1$—, =N—, —$CX_2$—, —NC(=O)$(C_1\text{-}C_{20})$alkyl-, —C(=O)$(C_1\text{-}C_{20})$alkyl-, —C(=O)—$(NR_1)$—, —S(=O)$_2$O—, —S(=O)$_2$—$(C_1\text{-}C_{20})$alkyl-, —OS(=O)$_2$O$(C_1\text{-}C_{20})$alkyl-, —S(=O)$_2$NR$_1$—, —S(=O)$C_1\text{-}C_{20})$alkyl-, —OP(=O)(OR$_1$)—, —P(=O)(OR$_1$)—, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, —C(O)NR$_1$—$(C_1\text{-}C_{20})$alkyl-, and —C(NR$_1$)NR$_1$—;

M is selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, phenyl, $(C_1\text{-}C_{20})$alkylphenyl$(C_1\text{-}C_{20})$alkyl, —O—, —S—, —$NR_1$—, =N—, —$CX_2$—, —NC(=O)$(C_1\text{-}C_{20})$alkyl-, —C(=O)$(C_1\text{-}C_{20})$alkyl-, —C(=O)—$(NR_1)$—, —S(=O)$_2$O—, —S(=O)$_2$—$(C_1\text{-}C_{20})$alkyl-, —OS(=O)$_2$O$(C_1\text{-}C_{20})$alkyl-, —S(=O)$_2$NR$_1$—, —S(=O)$C_1\text{-}C_{20})$alkyl-, —OP(=O)(OR$_1$)—, —P(=O)(OR$_1$)—, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, —C(O)NR$_1$—$(C_1\text{-}C_{20})$alkyl-, and —C(NR$_1$)NR$_1$—;

$R_1$, $R_2$, and $R_3$ are independently selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, and H;

X is O or S; and y is 5 to about 500.

The disclosure additionally provides a polyurea polymer of Formula (Va):

(Va)

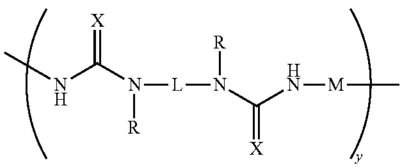

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG$(C_2\text{-}C_{20})$alkyl, phenyl, or $(C_1\text{-}C_{20})$alkylphenyl$(C_1\text{-}C_{20})$alkyl;

M is alkyl or phenyl;

R is t-Bu, i-Pr, Et, Me, cycloalkyl, adamantyl, and phenyl;

X is O or S; and y is 5 to about 500.

Furthermore, the disclosure provides a polyurea polymer of Formula (VI):

(VI)

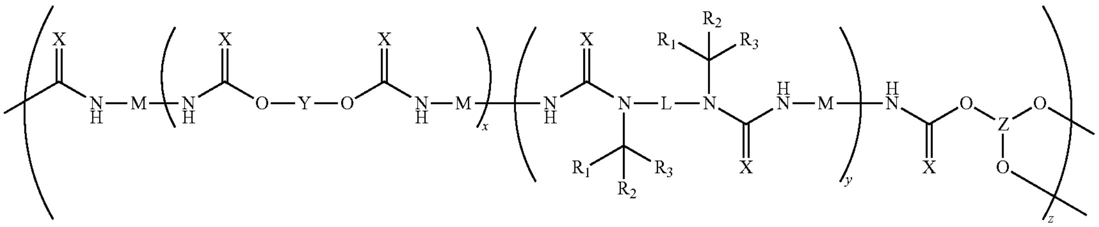

wherein

L is selected from the group consisting of $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, $(C_1$-$C_{20})$alkylphenyl$(C_1$-$C_{20})$alkyl, —O—, —S—, —$NR_1$—, =N—, —$CX_2$—, —NC(=O)$(C_1$-$C_{20})$alkyl-, —C(=O)$(C_1$-$C_{20})$alkyl-, —C(=O)—$(NR_1)$—, —S(=O)$_2$O—, —S(=O)$_2$—$(C_1$-$C_{20})$alkyl-, —OS(=O)$_2$O$(C_1$-$C_{20})$alkyl-, —S(=O)$_2$$NR_1$—, —S(=O)$C_1$-$C_{20})$alkyl-, —OP(=O)$(OR_1)$—, —P(=O)$(OR_1)$—, —C(S)—$(C_1$-$C_{20})$alkyl-, —C(O)O$(C_1$-$C_{20})$alkyl-, —C(=O)O—, —C(=S)O$(C_1$-$C_{20})$alkyl-, —C(=O)S$(C_1$-$C_{20})$alkyl-, —C(=S)S$(C_1$-$C_{20})$alkyl-, —C(O)$NR_1$$(C_1$-$C_{20})$alkyl-, and —C$(NR_1)$$NR_1$—;

M is selected from the group consisting of $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, $(C_1$-$C_{20})$alkylphenyl$(C_1$-$C_{20})$alkyl, —O—, —S—, —$NR_1$—, =N—, —$CX_2$—, —NC(=O)$(C_1$-$C_{20})$alkyl-, —C(=O)$(C_1$-$C_{20})$alkyl-, —C(=O)—$(NR_1)$—, —S(=O)$_2$O—, —S(=O)$_2$—$(C_1$-$C_{20})$alkyl-, —OS(=O)$_2$O$(C_1$-$C_{20})$alkyl-, —S(=O)$_2$$NR_1$—, —S(=O)$C_1$-$C_{20})$alkyl-, —OP(=O)$(OR_1)$—, —P(=O)$(OR_1)$—, —C(S)—$(C_1$-$C_{20})$alkyl-, —C(O)O$(C_1$-$C_{20})$alkyl-, —C(=O)O—, —C(=S)O$(C_1$-$C_{20})$alkyl-, —C(=O)S$(C_1$-$C_{20})$alkyl-, —C(=S)S$(C_1$-$C_{20})$alkyl-, —C(O)$NR_1$—$(C_1$-$C_{20})$alkyl-, and —C$(NR_1)$$NR_1$—;

Y is selected from the group consisting of $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, $(C_1$-$C_{20})$alkylphenyl$(C_1$-$C_{20})$alkyl, —O—, —S—, —$NR_1$—, =N—, —$CX_2$—, —NC(=O)$(C_1$-$C_{20})$alkyl-, —C(=O)$(C_1$-$C_{20})$alkyl-, —C(=O)—$(NR_1)$—, —S(=O)$_2$O—, —S(=O)$_2$—$(C_1$-$C_{20})$alkyl-, —OS(=O)$_2$O$(C_1$-$C_{20})$alkyl-, —S(=O)$_2$$NR_1$—, —S(=O)$C_1$-$C_{20})$alkyl-, —OP(=O)$(OR_1)$—, —P(=O)$(OR_1)$—, —C(S)—$(C_1$-$C_{20})$alkyl-, —C(O)O$(C_1$-$C_{20})$alkyl-, —C(=O)O—, —C(=S)O$(C_1$-$C_{20})$alkyl-, —C(=O)S$(C_1$-$C_{20})$alkyl-, —C(=S)S$(C_1$-$C_{20})$alkyl-, —C(O)$NR_1$—$(C_1$-$C_{20})$alkyl-, and —C$(NR_1)$$NR_1$—;

$R_1$, $R_2$, and $R_3$ are independently selected from the group consisting of $(C_1$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_2$-$C_{20})$alkyl-PEG-$(C_2$-$C_{20})$alkyl, and H;

X is O or S;

Z is a 3-arm to 8-arm cross-linker moiety;

y is 5 to about 500; and z is 1 to 50.

The disclosure also provides a polyurea polymer of Formula (VIa):

(VIa)

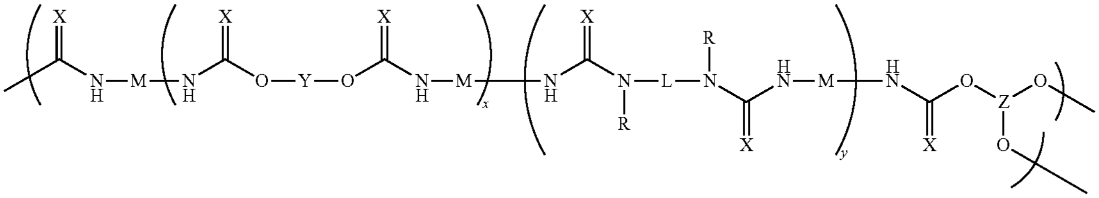

wherein

L is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, or $(C_1$-$C_{20})$alkylphenyl$(C_1$-$C_{20})$alkyl;

M is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, or $(C_1$-$C_{20})$alkylphenyl$(C_1$-$C_{20})$alkyl;

Y is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, $(C_2$-$C_{20})$alkyl-PEG-$(C_2$-$C_{20})$alkyl, phenyl, or $(C_1$-$C_{20})$alkylphenyl$(C_1$-$C_{20})$alkyl;

R is t-Bu, i-Pr, Et, Me, cycloalkyl, adamantane, and phenyl;

X is O or S;

Z is a 3-8-arm cross-linker moiety; and y is 5 to about 500.

The disclosure provides a polyurea polymer of Formula (VII):

(VII)

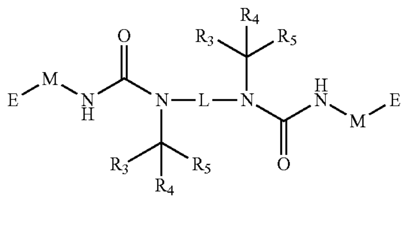

wherein

E is independently selected from the group consisting of

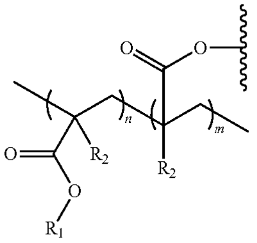
,
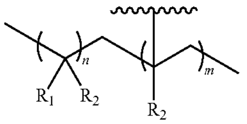
,
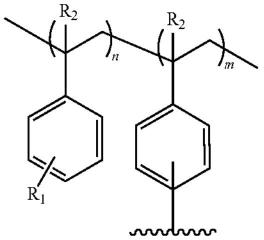
,
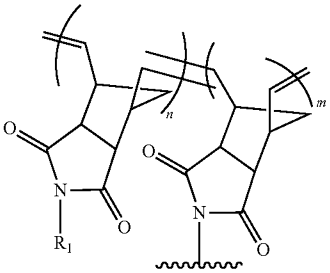
,
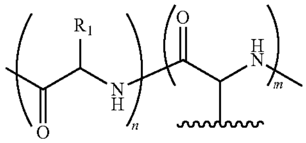
,
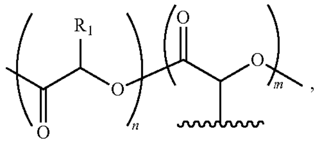
, and
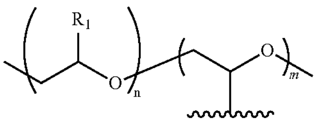
;

L is selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-PEG-$(C_2\text{-}C_{20})$alkyl, phenyl, $(C_1\text{-}C_{20})$alkylphenyl$(C_1\text{-}C_{20})$alkyl, —O—, —S—, —$NR_1$—, =N—, —$CX_2$—, —NC(=O)$(C_1\text{-}C_{20})$alkyl-, —C(=O)$(C_1\text{-}C_{20})$alkyl-, —C(=O)—($NR_1$)—, —S(=O)$_2$O—, —S(=O)$_2$—$(C_1\text{-}C_{20})$alkyl-, —OS(=O)$_2$O$(C_1\text{-}C_{20})$alkyl-, —S(=O)$_2$$NR_1$—, —S(=O)$C_1\text{-}C_{20}$)alkyl-, —OP(=O)($OR_1$)—, —P(=O)($OR_1$)—, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, —C(O)$NR_1$—$(C_1\text{-}C_{20})$alkyl-, and —C($NR_1$)$NR_1$—;

each M is independently selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, phenyl, $(C_1\text{-}C_{20})$alkylphenyl$(C_1\text{-}C_{20})$alkyl, and, —O—, —S—, —$NR_1$—, =N—, —$CX_2$—, —NC(=O)$(C_1\text{-}C_{20})$alkyl-, —C(=O)$(C_1\text{-}C_{20})$alkyl-, —C(=O)—($NR_1$)—, —S(=O)$_2$O—, —S(=O)$_2$—$(C_1\text{-}C_{20})$alkyl-, —OS(=O)$_2$O$(C_1\text{-}C_{20})$alkyl-, —S(=O)$_2$$NR_1$—, —S(=O)$C_1\text{-}C_{20}$)alkyl-, —OP(=O)($OR_1$)—, —P(=O)($OR_1$)—, —C(S)—$(C_1\text{-}C_{20})$alkyl-, —C(O)O$(C_1\text{-}C_{20})$alkyl-, —C(=O)O—, —C(=S)O$(C_1\text{-}C_{20})$alkyl-, —C(=O)S$(C_1\text{-}C_{20})$alkyl-, —C(=S)S$(C_1\text{-}C_{20})$alkyl-, —C(O)$NR_1$—$(C_1\text{-}C_{20})$alkyl-, and —C($NR_1$)$NR_1$—;

each $R_1$ and $R_2$ is independently selected from the group consisting of $(C_2\text{-}C_{20})$alkyl and H;

each $R_3$, $R_4$, and $R_5$ is independently selected from the group consisting of $(C_1\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_2\text{-}C_{20})$alkyl-PEG-$(C_2\text{-}C_{20})$alkyl, and H;

n is 2 to 12; and m is independently 2 to 50.

The disclosure provides a polyurea polymer of Formula (VIII):

(VIII)

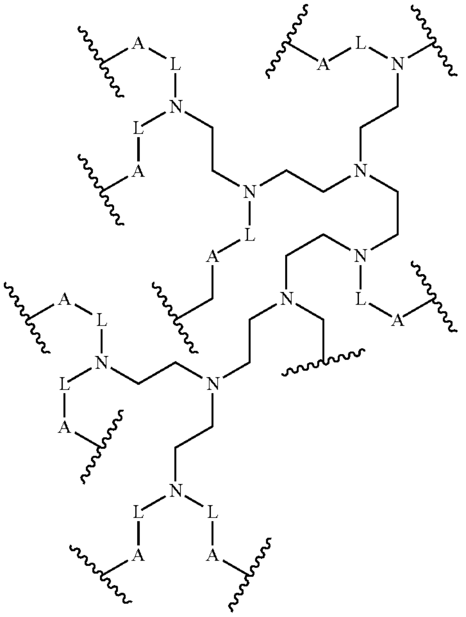

wherein

A is

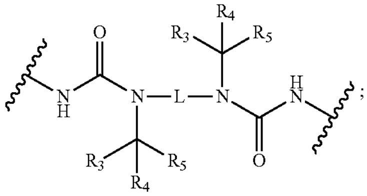
;

each L is selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, ($C_2$-$C_{20}$)alkyl-PEG-($C_2$-$C_{20}$)alkyl, phenyl, ($C_1$-$C_{20}$)alkylphenyl($C_1$-$C_{20}$)alkyl, —O—, —S—, —$NR_1$—, =N—, —$CX_2$—, —NC(=O)($C_1$-$C_{20}$)alkyl-, —C(=O)($C_1$-$C_{20}$)alkyl-, —C(=O)—($NR_1$)—, —S(=O)$_2$O—, —S(=O)$_2$—($C_1$-$C_{20}$)alkyl-, —OS(=O)$_2$O($C_1$-$C_{20}$)alkyl-, —S(=O)$_2NR_1$—, —S(=O)$C_1$-$C_{20}$)alkyl-, —OP(=O)($OR_1$)—, —P(=O)($OR_1$)—, —C(S)—($C_1$-$C_{20}$)alkyl-, —C(O)O($C_1$-$C_{20}$)alkyl-, —C(=O)O—, —C(=S)O($C_1$-$C_{20}$)alkyl-, —C(=O)S($C_1$-$C_{20}$)alkyl-, —C(=S)S($C_1$-$C_{20}$)alkyl-, —C(O)$NR_1$—($C_1$-$C_{20}$)alkyl-, and —C($NR_1$)$NR_1$—;

each $R_3$, $R_4$ and $R_5$ is independently selected from the group consisting of ($C_1$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_2$-$C_{20}$)alkyl-PEG-($C_2$-$C_{20}$)alkyl, and H.

The disclosure provides polymers as described herein, intermediates for the synthesis of the polymers described herein, as well as methods of preparing the polymers as described herein. The disclosure also provides polymers as described herein that are useful as intermediates for the synthesis of other useful polymers.

BRIEF DESCRIPTION OF THE DRAWINGS

The following drawings form part of the specification and are included to further demonstrate certain embodiments or various aspects of the disclosure. In some instances, embodiments of the disclosure can be best understood by referring to the accompanying drawings in combination with the detailed description presented herein. The description and accompanying drawings may highlight a certain specific example, or a certain aspect of the disclosure. However, one skilled in the art will understand that portions of the example or aspect may be used in combination with other examples or aspects of the disclosure.

$$k_{-1} = -\frac{\ln\left(1 - \frac{[1]}{[3c]_0}\right)}{T} \quad (T\text{: reaction time}).$$

Figure 8:
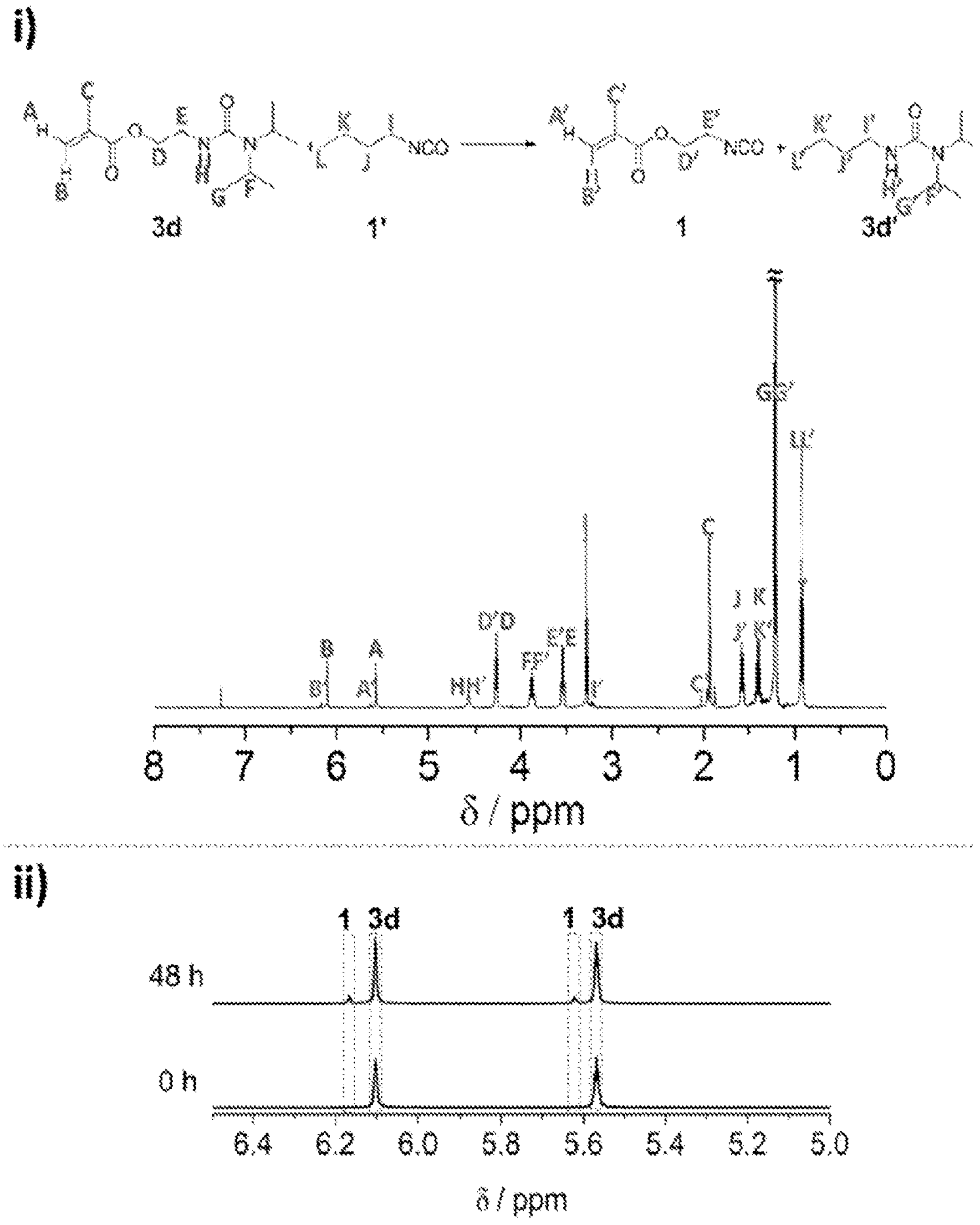

FIG. 8. Dissociation kinetics of DIPU bond. i) $^1$H-NMR spectrum of the mixture of compound 1' and 3d (and the produced compounds 1 and 3d') in $CDCl_3$. Peaks are assigned to each compound. The spectrum was taken 48 h after 1' and 3d were mixed. ii) $^1$H-NMR spectra showing exchange reaction between 3d and 1' at 37° C. The generation rate of free isocyanate 1 was used to calculate the disassociation rate of DIPU bond with the following equation:

$$k_{-1} = \frac{\ln\left(1 - \frac{[1]}{[3d]_0}\right)}{T} \quad (T\text{: reaction time}).$$

Figure 9:
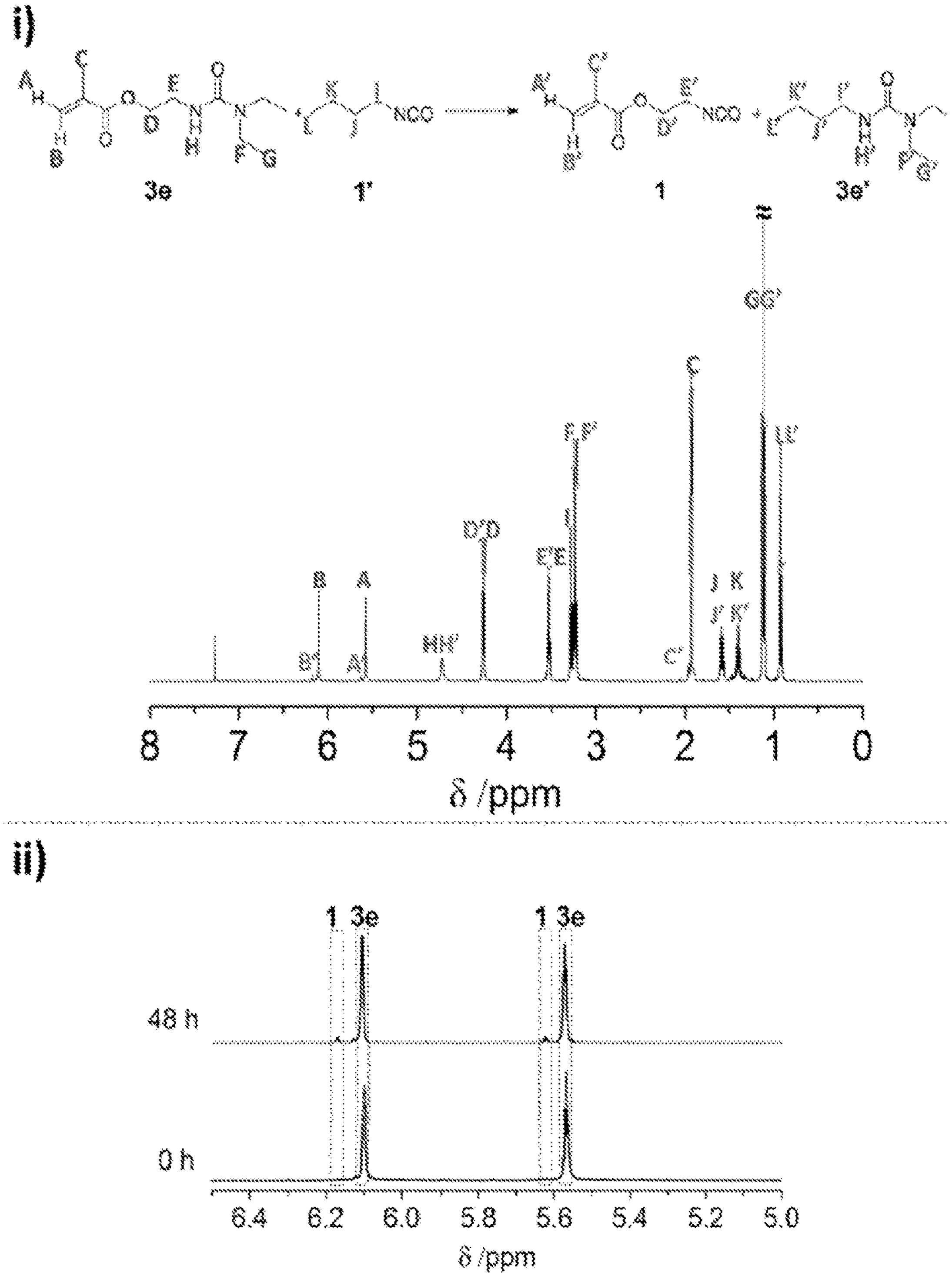

FIG. 9. Dissociation kinetics of DEU bond. i) $^1$H NMR spectrum of mixture of compound 1' and 3e (and the produced compound 1 and 3e') in $CDCl_3$. Peaks are well assigned to each compound. The spectrum was taken 48 h after 1' and 3e were mixed. ii)$^1$H NMR showing exchange reaction between 3e and 1' at 37° C. The generation rate of free isocyanate 1 was used to calculate the disassociation rate of TBEU bond with the following equation:

$$k_{-1} = \frac{\ln\left(1 - \frac{[1]}{[3e]_0}\right)}{T} \quad (T\text{: reaction time}).$$

Figure 10:
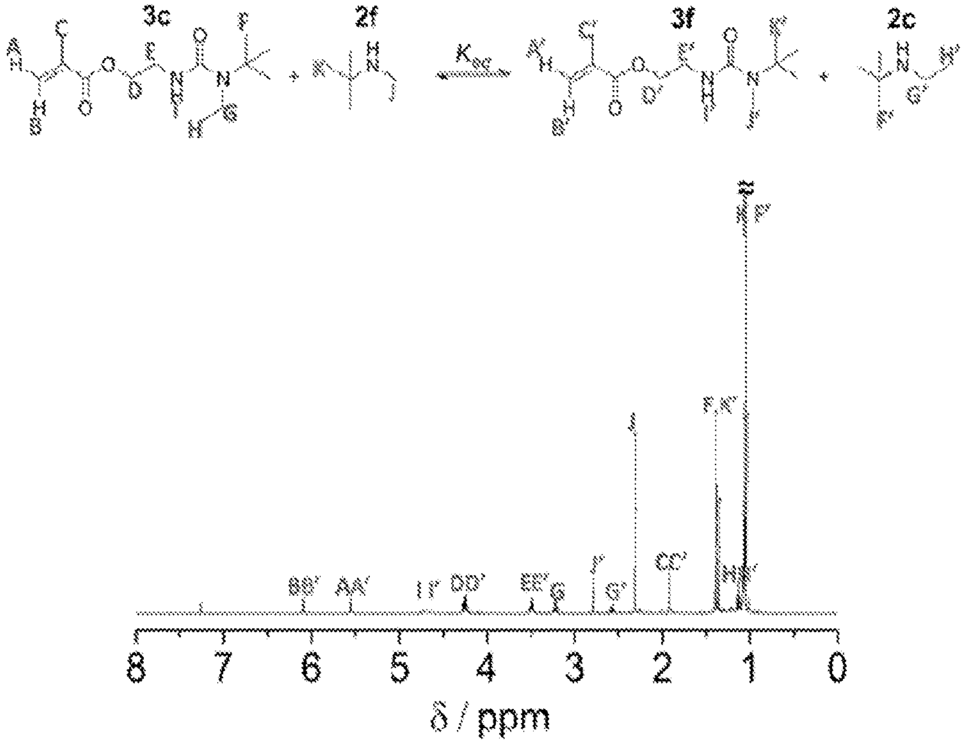
Figure 10:
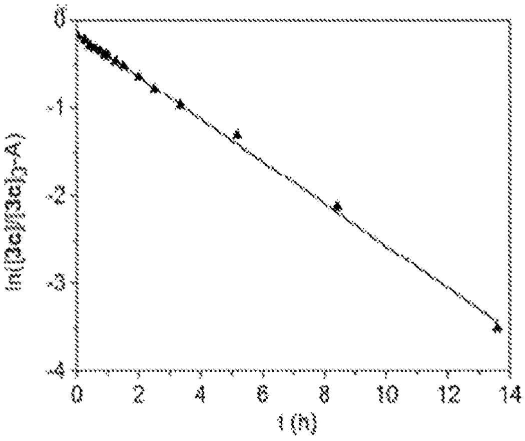

FIG. 10. Dynamic exchange between compounds 3c and 2f. i) $^1$H-NMR spectrum of the mixture of compound 3c and 2f (and the produced compound 3f and 2c) in $CDCl_3$. Peaks are assigned to each compound. The spectrum was taken 2 h after 3c and 2f were mixed. ii) Variation of concentrations of compound 3c and 2c in different time showing the progress of exchange reaction.

$$A = \frac{[3c]_{eq}}{[3c]_{eq} + [2c]_{eq}} = 0.13$$

iii) Linear fitting of $$\ln\left(\frac{[3c]}{[3c]_0} - A\right)$$

and t.

Figure 11:
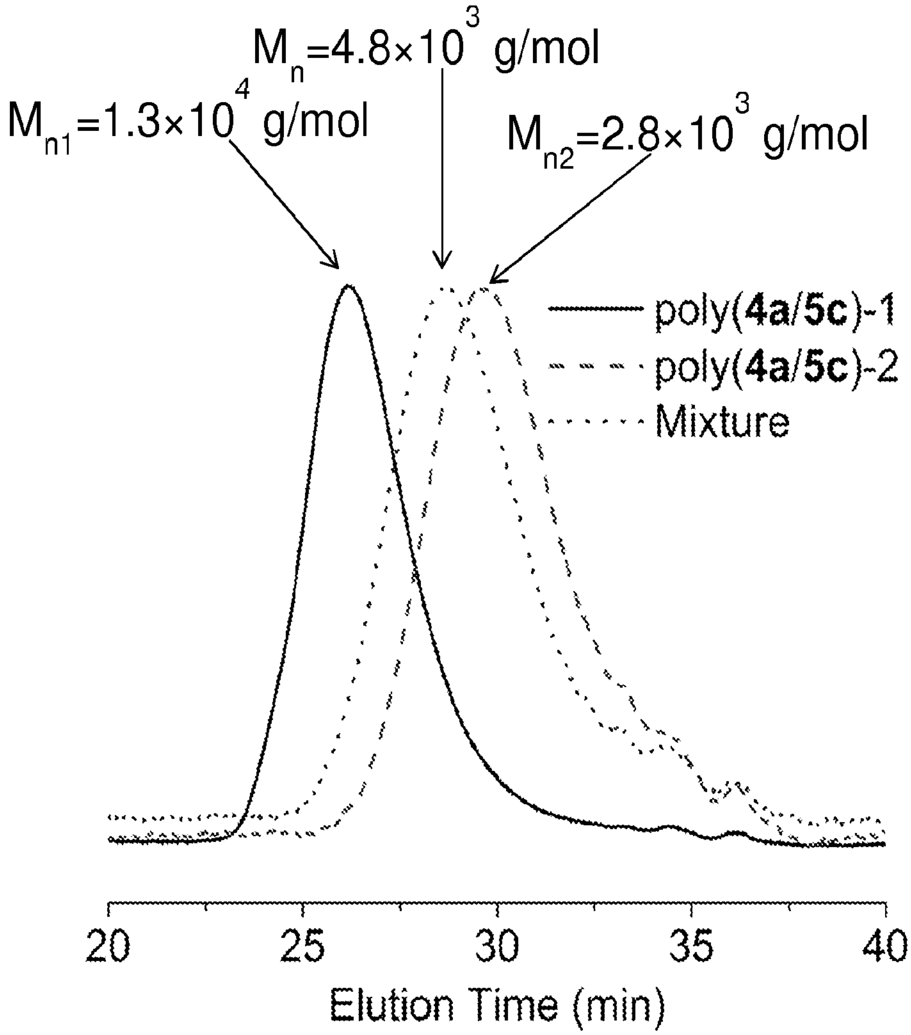

FIG. 11. Chain reshuffling of two TBEU polymer with different molecular weights. Gel permeation chromatographic (GPC) curves from light scattering detector showing two batches of poly(4a/5c) with different molecular weights (black curve for poly(4a/5c)-1 ($M_n$=1.3×10$^4$ g/mol) and red curve for poly(4a/5c)-2 ($M_n$=2.8×10$^3$ g/mol)) were mixed and stirred for 12 h at 37° C. The peaks for poly(4a/5c)-1 and poly(4a/5c)-2 were merged into a single peak ($M_n$=4.8×10$^3$ g/mol) with retention time between the two original peaks.

Figure 12:
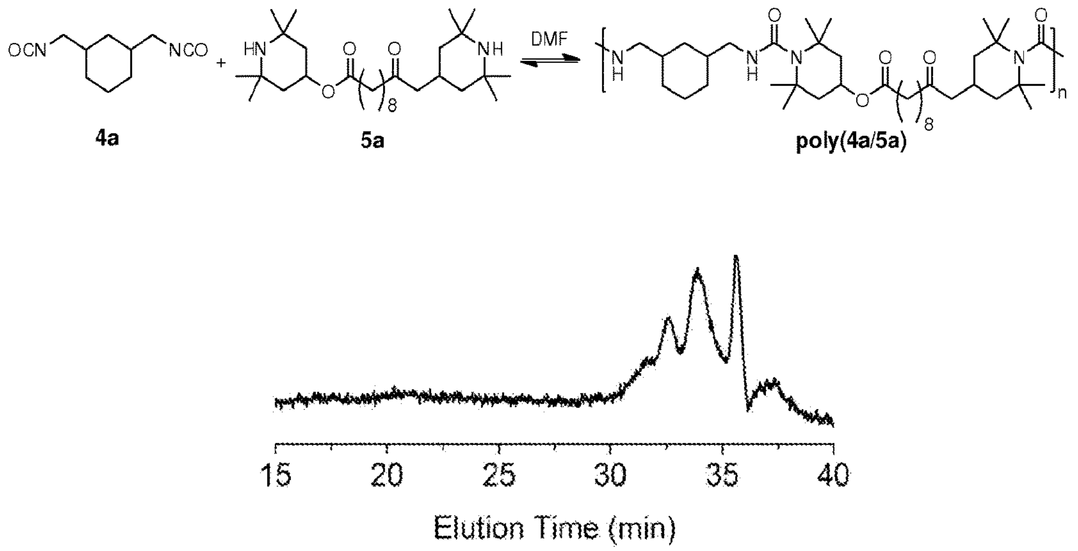

FIG. 12. Dynamic property of TMPCA based polymer. GPC curves from light scattering detector of dynamic polymer poly(4a/5a) formed between equal molar of compound 4a and 5a in room temperature. Only the oligomer was obtained because of the low binding constant of TMPCA bond.

Figure 13:
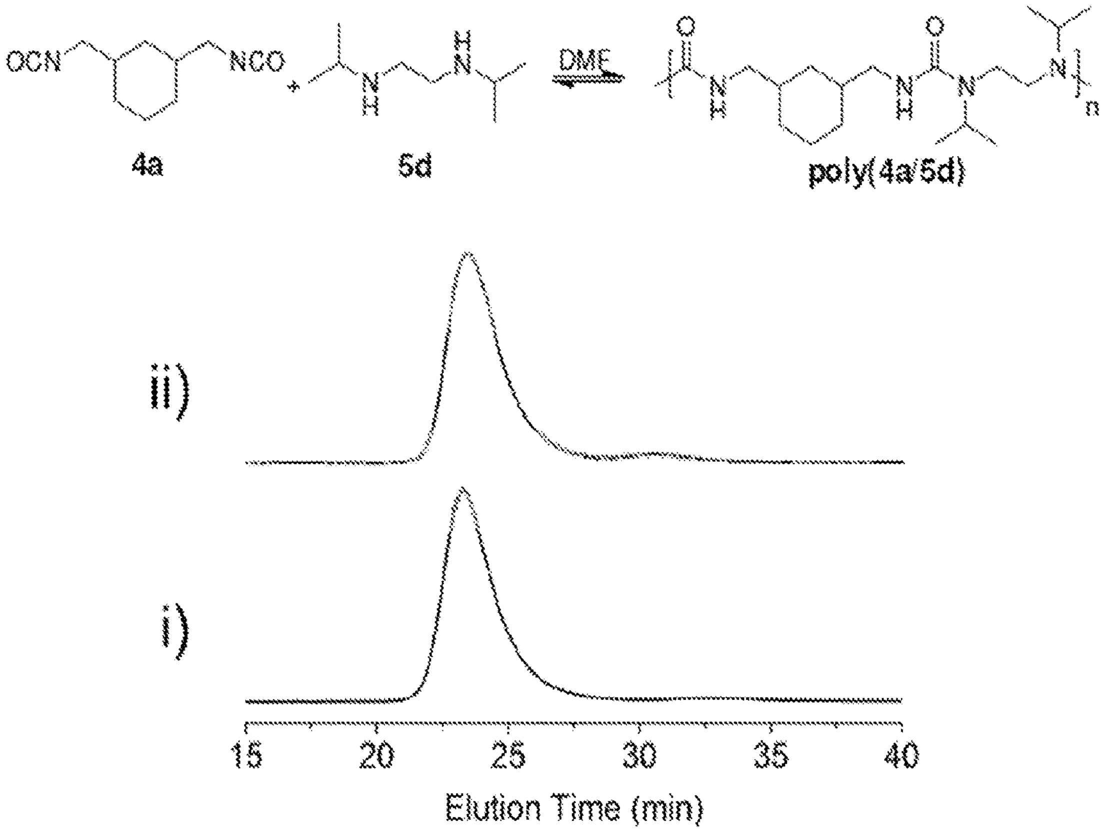

FIG. 13. Dynamic property of DIPU based polymer. GPC curves from light scattering detector of dynamic polymer poly(4a/5d) formed between compound 4a and 5d. i) DMF solution with [4a]: [5d]=1:1; ii) solution with another molar equivalant of 5d added to i). No significant change of GPC peak was observed with the addition of 5d after stirring for 12 hours at 37° C.

Figure 14:
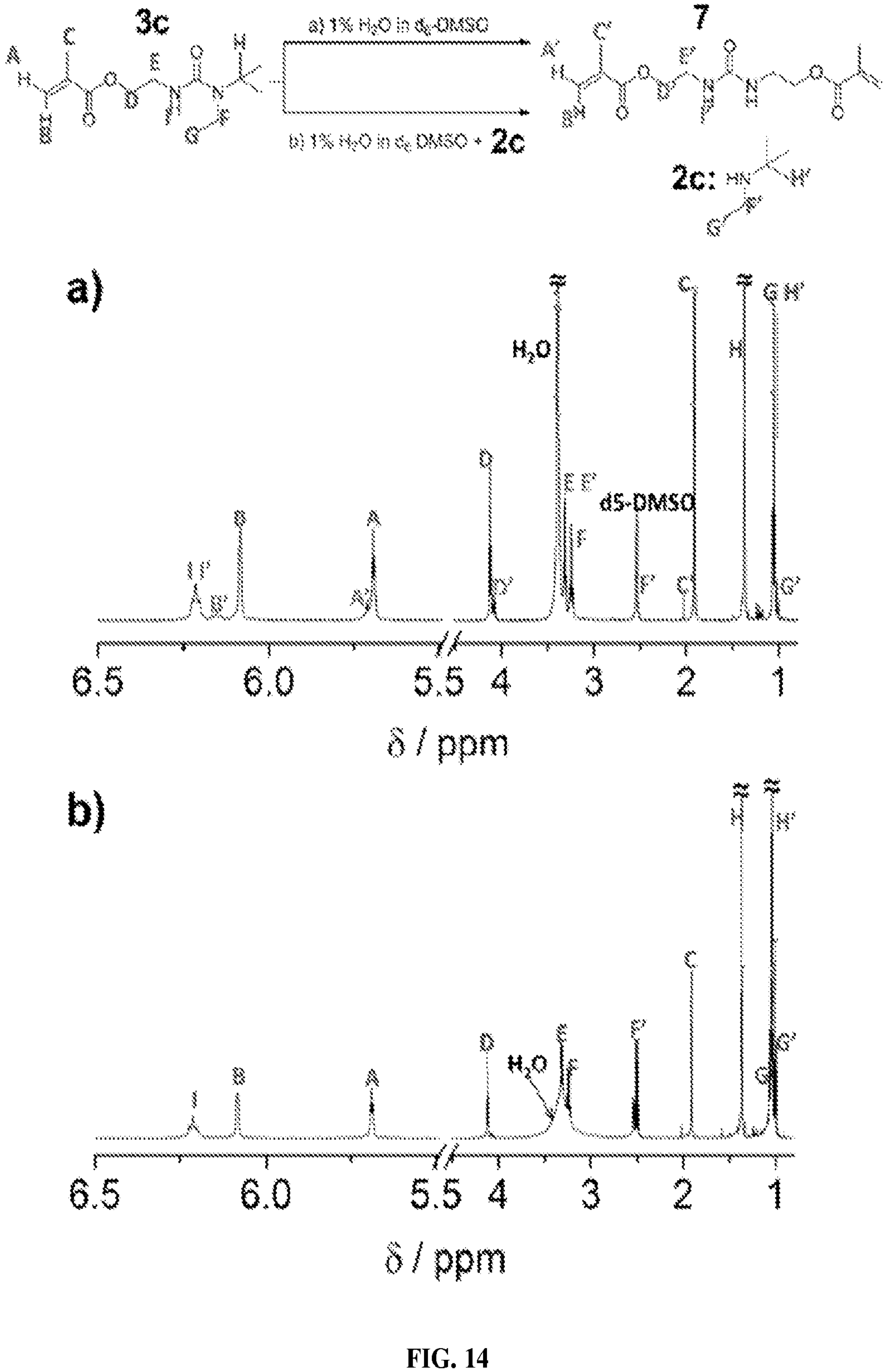
Figure 15:
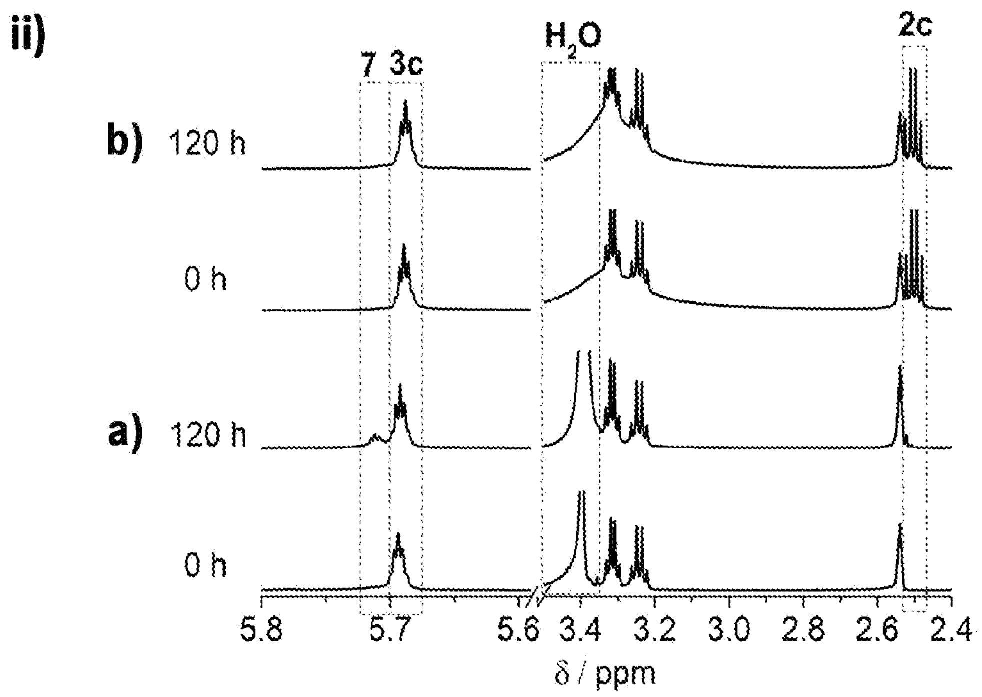

FIGS. 14 and 15. Stability of TBEU compound 3c to water. i) $^1$H-NMR spectrum of mixture of compound 3c and water in $d_6$-DMSO with (experiment a) or without (experiment b) compound 2c. Peaks are assigned to each compound. The spectrum was taken 120 hours (5 days) after mixing in room temperature for both (a) and (b). ii) a) After 120 hours, partial hydrolysis was observed for the solution without compound 2c (experiment a), while negligible hydrolysis was observed for the solution with compound 2c (experiment b).

Figure 16:
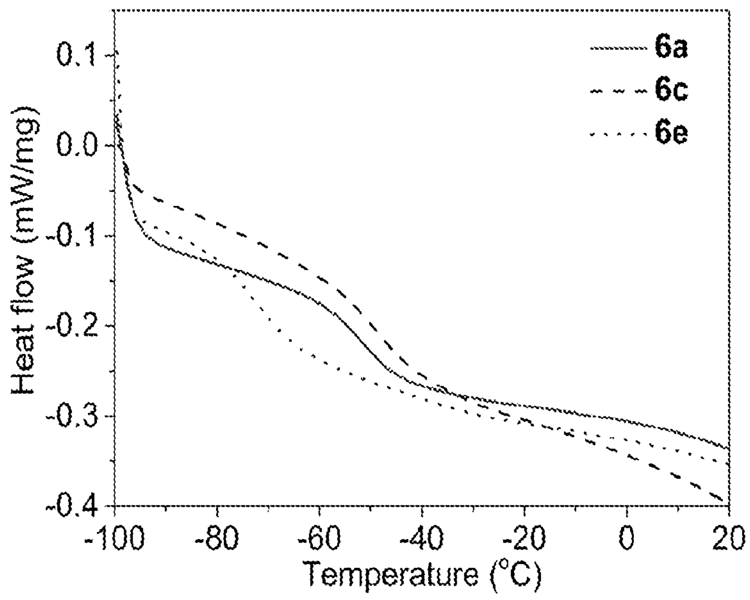

FIG. 16. Characterization of $T_g$ of self-healing materials. DSC curves of cross-linked polyurethane/urea 6a, 6c and 6e. (See Table 1 for detailed $T_g$ data).

Figure 17:
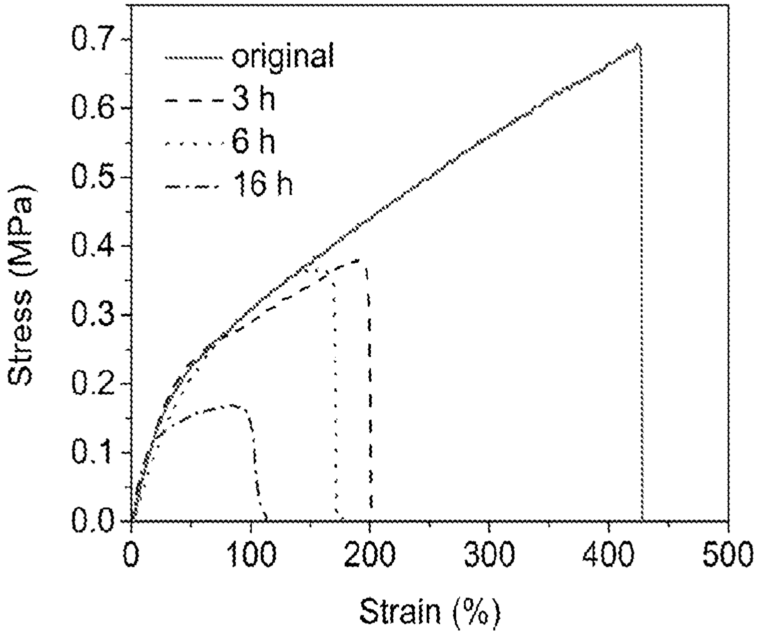

FIG. 17. Self-healing efficiencies of TMPCA based 6a at different time. 6a recovered significant breaking strain at an early time. The breaking strain dropped later because of irreversible hydrolysis at the cut.

Figure 18:
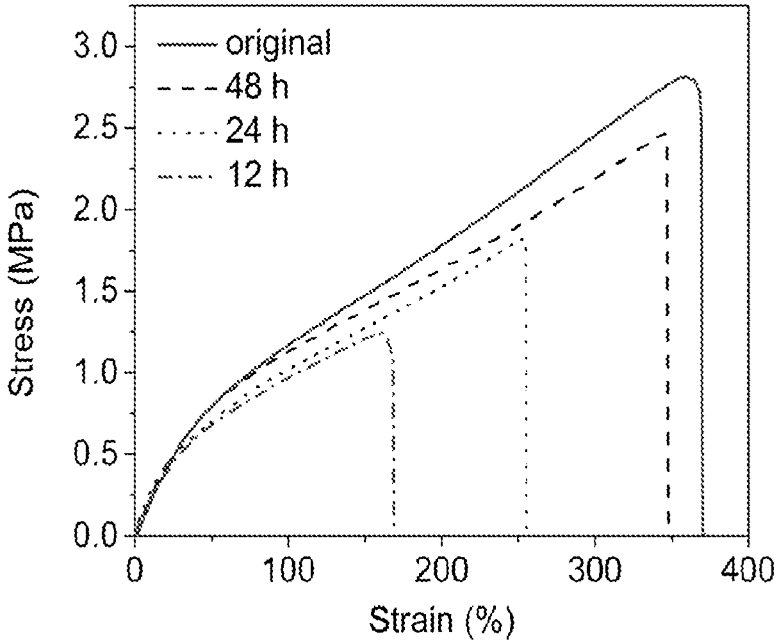

FIG. 18. Self-healing efficiencies of 6c' at different time. Compared with 6c, 6c' has higher Young's Modulus (2.20±0.15 MPa) and breaking strain (370±18%). Efficient recovery of breaking strain (94±2%) may be achieved after 48 h healing at 37° C.

DETAILED DESCRIPTION

The disclosure provides polymers having dynamic urea bonds and methods for the synthesis of polyurea, one of the most widely used materials in coating, fiber, adhesive, and plastics industries. The dynamic polyurea is highly reversible and capable of catalyst-free, room-temperature self-healing.

(I) Polyurea Polymers

In some embodiments, the disclosure provides a polyurea polymer of Formula (I):

(I)

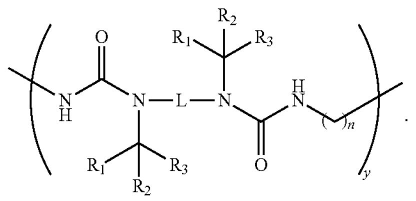

In one embodiment, $R_1$, $R_2$, and $R_3$ are independently selected from the group consisting of $(C_1\text{-}C_{10})$alkyl, $(C_5\text{-}C_6)$cycloalkyl, $(C_1\text{-}C_{10})$alkyl$(C_5\text{-}C_6)$cycloalkyl, $(C_1\text{-}C_{10})$alkyl$(C_5\text{-}C_6)$cycloalkyl$(C_1\text{-}C_{10})$alkyl, $(C_2\text{-}C_{10})$alkyl-PEG-$(C_2\text{-}C_{10})$alkyl, and H. In another embodiment, $R_1$, $R_2$, and $R_3$ are independently selected from the group consisting of $(C_2\text{-}C_8)$alkyl, $(C_5\text{-}C_6)$cycloalkyl, $(C_2\text{-}C_8)$alkyl$(C_5\text{-}C_6)$cycloalkyl, $(C_2\text{-}C_8)$alkyl$(C_5\text{-}C_6)$cycloalkyl$(C_2\text{-}C_8)$alkyl, $(C_2\text{-}C_8)$alkyl-PEG-$(C_2\text{-}C_8)$alkyl, and H. In yet another embodiment, $R_1$, $R_2$, and $R_3$ are each methyl.

In some embodiments, L may be selected from the group consisting of $(C_2\text{-}C_{10})$alkyl, $(C_4\text{-}C_6)$cycloalkyl, $(C_1\text{-}C_{10})$alkyl$(C_4\text{-}C_6)$cycloalkyl, $(C_1\text{-}C_{10})$alkyl$(C_4\text{-}C_6)$cycloalkyl$(C_1\text{-}C_{10})$alkyl, $(C_6\text{-}C_{10})$aryl, $(C_1\text{-}C_{10})$alkyl$(C_6\text{-}C_{10})$aryl, $(C_1-C_{10})$alkyl$(C_6-C_{10})$aryl$(C_1-C_{10})$alkyl, $(C_2-C_{10})$alkyl-PEG-$(C_2-C_{20})$alkyl, —O—, —S—, —$NR_1$—, =N—, —$CX_2$—, —NC(=O)$(C_1-C_{10})$alkyl-, —C(=O)$(C_1-C_{10})$alkyl-, —C(=O)—$(NR_1)$—, —S(=O)$_2$O—, —S(=O)$_2$—$(C_1-C_{10})$alkyl-, —OS(=O)$_2$O$(C_1-C_{10})$alkyl-, —S(=O)$_2$$NR_1$—, —S(=O)$C_1$-$C_{10}$)alkyl-, —OP(=O)$(OR_1)$—, —P(=O)$(OR_1)$—, —C(S)—$(C_1-C_{10})$alkyl-, —C(O)O$(C_1-C_{10})$alkyl-, —C(=O)O—, —C(=S)O$(C_1-C_{10})$alkyl-, —C(=O)S$(C_1-C_{10})$alkyl-, —C(=S)S$(C_1-C_{10})$alkyl-, —C(O)$NR_1$—$(C_1-C_{10})$alkyl-, and —C$(NR_1)NR_1$—. In other embodiments, L may be selected from the group consisting of $(C_2-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl. In some other embodiments, L may be selected from the group consisting of —O—, —S—, —$NR_1$—, =N—, —$CX_2$—, —NC(=O)$(C_1-C_{10})$alkyl-, —C(=O)$(C_1-C_{10})$alkyl-, —C(=O)—$(NR_1)$—, —S(=O)$_2$O—, —S(=O)$_2$—$(C_1-C_{10})$alkyl-, —OS(=O)$_2$O$(C_1-C_{10})$alkyl-, —S(=O)$_2$$NR_1$—, —S(=O)$C_1$-$C_{10}$)alkyl-, —OP(=O)$(OR_1)$—, —P(=O)$(OR_1)$—, —C(S)—$(C_1-C_{10})$alkyl-, —C(O)O$(C_1-C_{10})$alkyl-, —C(=O)O—, —C(=S)O$(C_1-C_{10})$alkyl-, —C(=O)S$(C_1-C_{10})$alkyl-, —C(=S)S$(C_1-C_{10})$alkyl-, —C(O)$NR_1$—$(C_1-C_{10})$alkyl-, and —C$(NR_1)NR_1$—. In one embodiment, L may be selected from the group consisting of $(C_2-C_{10})$alkyl, $(C_4-C_{10})$cycloalkyl, $(C_1-C_{10})$alkyl$(C_4-C_{10})$cycloalkyl, $(C_1-C_{10})$alkyl$(C_4-C_{10})$cycloalkyl$(C_1-C_{10})$alkyl, $(C_6-C_{10})$aryl, $(C_1-C_{10})$alkyl$(C_6-C_{10})$aryl, $(C_1-C_{10})$alkyl$(C_6-C_{10})$aryl$(C_1-C_{10})$alkyl, and $(C_2-C_{10})$alkyl-PEG-$(C_2-C_{20})$alkyl. In another embodiment, L may be selected from the group consisting of $(C_2-C_8)$alkyl, $(C_5-C_6)$cycloalkyl, $(C_2-C_8)$alkyl$(C_5-C_6)$cycloalkyl, $(C_2-C_8)$alkyl$(C_5-C_6)$cycloalkyl$(C_2-C_8)$alkyl, $C_6$-aryl, $(C_2-C_8)$alkyl$(C_6)$aryl, $(C_2-C_8)$alkyl$(C_6)$aryl$(C_2-C_8)$alkyl, and $(C_2-C_8)$alkyl-PEG-$(C_2-C_8)$alkyl. In yet another embodiment, L may be phenyl. In some other embodiment, L may be $(C_2-C_{20})$alkyl. In still another embodiment, L may be $(C_4-C_{12})$alkyl. In a further embodiment, L may be $(C_2-C_8)$alkyl. In a still further embodiment, the polyethylene glycol (PEG) may be tetraethylene glycol (TEG). In a particular embodiment, L may be ethyl, propyl, or cyclohexyl.

The number n may range from 2 to 12, for example from 4 to 8, or 2, 3, 4, 5, 7, 8, 9, 10, 11, or 12. In some embodiments, n is less than 12. In some other embodiments, n is greater than 2.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

In exemplary embodiments, L is cyclohexyl and n is 2.

In one embodiment, the polymer may display dynamic urea bonding where the tert-butyl urea bonds of Formula (I) reversibly dissociate into stable isocyanate and amine moieties. The dissociation may have a $K_{eq}$ of greater than about $10^7$ $M^{-1}$, such as greater than about $10^8$ $M^{-1}$, greater than about $10^9$ $M^{-1}$, or greater than about $10^{10}$ $M^{-1}$ The $k_{-1}$ of the reaction may be at least about 0.03 $h^{-1}$ at about 23° C., such as at least about 0.04 $h^{-1}$, at least about 0.05 $h^{-1}$, at least about 0.06 $h^{-1}$, at least about 0.07 $h^{-1}$, at least about 0.08 $h^{-1}$, at least about 0.09 $h^{-1}$, or at least about 0.10 $h^{-1}$.

In other embodiments, the disclosure provides a polyurea polymer of Formula (Ia):

(Ia)

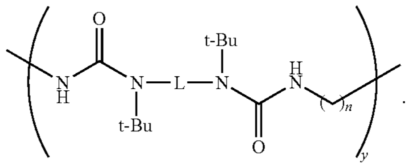

L may be as defined above under the description of Formula (I) or any embodiments thereof.

The number n may be as defined above under the description of Formula (I) or any embodiments thereof.

The number y may be as defined above under the description of Formula (I) or any embodiments thereof.

In exemplary embodiments, L is cyclohexyl and n is 2.

The disclosure also provides a copolymer comprising a poly(urea-urethane) of Formula (II):

(II)

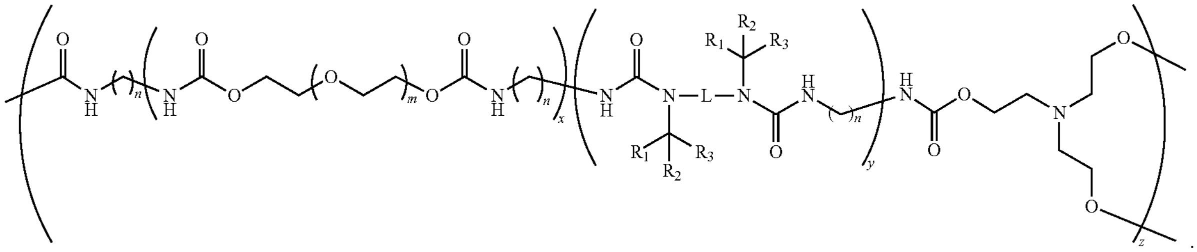

In one embodiment, $R_1$, $R_2$, and $R_3$ are independently selected from the group consisting of $(C_1-C_{10})$alkyl, $(C_5-C_6)$cycloalkyl, $(C_1-C_{10})$alkyl$(C_5-C_6)$cycloalkyl, $(C_1-C_{10})$alkyl$(C_5-C_6)$cycloalkyl$(C_1-C_{10})$alkyl, $(C_2-C_{10})$alkyl-PEG-$(C_2-C_{10})$alkyl, and H. In another embodiment, $R_1$, $R_2$, and $R_3$ are independently selected from the group consisting of $(C_2-C_8)$alkyl, $(C_5-C_6)$cycloalkyl, $(C_2-C_8)$alkyl$(C_5-C_6)$cycloalkyl, $(C_2-C_8)$alkyl$(C_5-C_6)$cycloalkyl$(C_2-C_8)$alkyl, $(C_2-C_8)$alkyl-PEG-$(C_2-C_8)$alkyl, and H. In still another embodiment, $R_1$, $R_2$, and $R_3$ are each methyl.

L may be as defined above under the description of Formula (I) or any embodiments thereof.

The number n may be as defined above under the description of Formula (I) or any embodiments thereof.

The number m may range from 2 to 50, such as 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments, m is less than 50. In some other embodiments, m is greater than 2.

The number x may range from 0 to 100, such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In some embodiments, x is less than 100. In some other embodiments, x is greater than 0.

The number y may range from 1 to 100, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100. In some embodiments, y is less than 100. In some other embodiments, y is greater than 1. In yet other embodiments, y is 10 to about 100.

The number z may range from 1 to 50, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments, z is less than 50. In some other embodiments, z is greater than 1.

The disclosure also provides a copolymer comprising a poly(urea-urethane) of Formula (IIa):

(IIa)

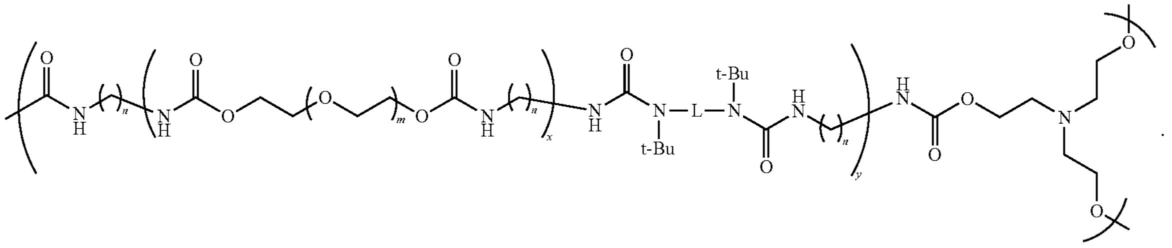

L may be as defined above under the description of Formula (I) or any embodiments thereof.

The number n may be as defined above under the description of Formula (I) or any embodiments thereof.

The number m may be as defined above under the description of Formula (II) or any embodiments thereof.

The number x may be as defined above under the description of Formula (II) or any embodiments thereof.

The number y may be as defined above under the description of Formula (II) or any embodiments thereof.

The disclosure further provides a polyurea polymer of Formula (III):

(III)

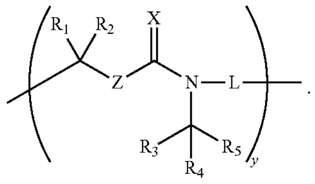

In some embodiments, the polyurea polymer of Formula (III) may have Formula (IIIa):

(IIIa)

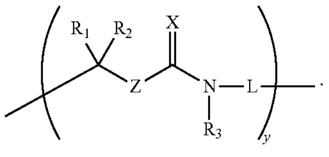

In other embodiments, the polyurea polymer of Formula (III) may have the Formula (IIIb):

(IIIb)

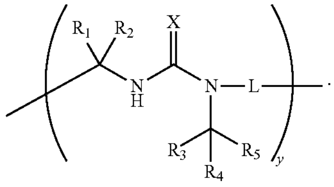

In one embodiment, $R_1$ and $R_2$ may be independently $(C_2\text{-}C_{10})$alkyl. In another embodiment, $R_1$ and $R_2$ may be independently $(C_2\text{-}C_8)$alkyl. In some embodiments, $R_1$ and $R_2$ may be independently selected from the group consisting of tert-butyl, isopropyl, ethyl, and methyl.

In one embodiment, $R_3$, $R_4$, and $R_5$ are independently selected from the group consisting of $(C_1\text{-}C_{10})$alkyl, ($C_5$-

$C_6$)cycloalkyl, ($C_1$-$C_{10}$)alkyl($C_5$-$C_6$)cycloalkyl, ($C_1$-$C_{10}$)alkyl($C_5$-$C_6$)cycloalkyl($C_1$-$C_{10}$)alkyl, ($C_2$-$C_{10}$)alkyl-PEG-($C_2$-$C_{10}$)alkyl, and H. In another embodiment, $R_3$, $R_4$, and $R_5$ are independently selected from the group consisting of ($C_2$-$C_8$)alkyl, ($C_5$-$C_6$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, ($C_2$-$C_8$)alkyl-PEG-($C_2$-$C_8$)alkyl, and H. In yet another embodiment, $R_3$, $R_4$, and $R_5$ are each methyl.

L may be as defined above under the description of Formula (I) or any embodiments thereof.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

In exemplary embodiments, X is O and Z is NH.

The disclosure yet further provides polyurea polymer of Formula (IV):

(IV)

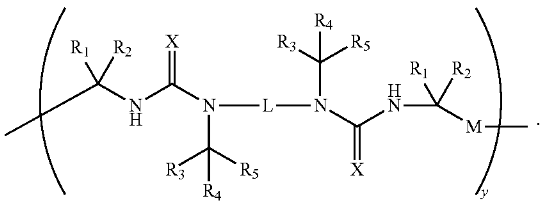

In one embodiment, $R_1$ and $R_2$ may be independently ($C_2$-$C_{10}$)alkyl. In one embodiment, $R_1$ and $R_2$ may be independently ($C_2$-$C_8$)alkyl. In some embodiments, $R_1$ and $R_2$ may be independently selected from the group consisting of tert-butyl, isopropyl, ethyl, and methyl.

In one embodiment, $R_3$, $R_4$, and $R_5$ are independently selected from the group consisting of ($C_1$-$C_{10}$)alkyl, ($C_5$-$C_6$)cycloalkyl, ($C_1$-$C_{10}$)alkyl($C_5$-$C_6$)cycloalkyl, ($C_1$-$C_{10}$)alkyl($C_5$-$C_6$)cycloalkyl($C_1$-$C_{10}$)alkyl, ($C_2$-$C_{10}$)alkyl-PEG-($C_2$-$C_{10}$)alkyl, and H. In one embodiment, $R_3$, $R_4$, and $R_5$ are independently selected from the group consisting of ($C_2$-$C_8$)alkyl, ($C_5$-$C_6$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, ($C_2$-$C_8$)alkyl-PEG-($C_2$-$C_8$)alkyl, and H. In one embodiment, $R_3$, $R_4$, and $R_5$ are each methyl.

L may be as defined above under the description of Formula (I) or any embodiments thereof.

In some embodiments, M may be selected from the group consisting of ($C_2$-$C_{10}$)alkyl, ($C_4$-$C_6$)cycloalkyl, ($C_1$-$C_{10}$)alkyl($C_4$-$C_6$)cycloalkyl, ($C_1$-$C_{10}$)alkyl($C_4$-$C_6$)cycloalkyl($C_1$-$C_{10}$)alkyl, ($C_6$-$C_{10}$)aryl, ($C_1$-$C_{10}$)alkyl($C_6$-$C_{10}$)aryl, ($C_1$-$C_{10}$)alkyl($C_6$-$C_{10}$)aryl($C_1$-$C_{10}$)alkyl, ($C_2$-$C_{10}$)alkyl-PEG-($C_2$-$C_{20}$)alkyl, —O—, —S—, —$NR_1$—, =N—, —$CX_2$—, —NC(=O)($C_1$-$C_{10}$)alkyl-, —C(=O)($C_1$-$C_{10}$)alkyl-, —C(=O)—($NR_1$)—, —S(=O)$_2$O—, —S(=O)$_2$—($C_1$-$C_{10}$)alkyl-, —OS(=O)$_2$O($C_1$-$C_{10}$)alkyl-, —S(=O)$_2$$NR_1$—, —S(=O)$C_1$-$C_{10}$)alkyl-, —OP(=O)($OR_1$)—, —P(=O)($OR_1$)—, —C(S)—($C_1$-$C_{10}$)alkyl-, —C(O)O($C_1$-$C_{10}$)alkyl-, —C(=O)O—, —C(=S)O($C_1$-$C_{10}$)alkyl-, —C(=O)S($C_1$-$C_{10}$)alkyl-, —C(=S)S($C_1$-$C_{10}$)alkyl-, —C(O)$NR_1$—($C_1$-$C_{10}$)alkyl-, and —C($NR_1$)$NR_1$—. In other embodiments, M may be selected from the group consisting of ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, and ($C_2$-$C_{20}$)alkyl-PEG-($C_2$-$C_{20}$)alkyl. In some other embodiments, M may be selected from the group consisting of —O—, —S—, —$NR_1$—, =N—, —$CX_2$—, —NC(=O)($C_1$-$C_{10}$)alkyl-, —C(=O)($C_1$-$C_{10}$)alkyl-, —C(=O)—($NR_1$)—, —S(=O)$_2$O—, —S(=O)$_2$—($C_1$-$C_{10}$)alkyl-, —OS(=O)$_2$O($C_1$-$C_{10}$)alkyl-, —S(=O)$_2$$NR_1$—, —S(=O)$C_1$-$C_{10}$)alkyl-, —OP(=O)($OR_1$)—, —P(=O)($OR_1$)—, —C(S)—($C_1$-$C_{10}$)alkyl-, —C(O)O($C_1$-$C_{10}$)alkyl-, —C(=O)O—, —C(=S)O($C_1$-$C_{10}$)alkyl-, —C(=O)S($C_1$-$C_{10}$)alkyl-, —C(=S)S($C_1$-$C_{10}$)alkyl-, —C(O)$NR_1$—($C_1$-$C_{10}$)alkyl-, and —C($NR_1$)$NR_1$—. In one embodiment, M may be selected from the group consisting of ($C_2$-$C_{10}$)alkyl, ($C_4$-$C_{10}$)cycloalkyl, ($C_1$-$C_{10}$)alkyl($C_5$-$C_6$)cycloalkyl, ($C_1$-$C_{10}$)alkyl($C_5$-$C_6$)cycloalkyl($C_1$-$C_{10}$)alkyl, ($C_2$-$C_{10}$)alkyl-PEG-($C_2$-$C_{10}$)alkyl, phenyl, and ($C_1$-$C_{10}$)alkylphenyl($C_1$-$C_{10}$)alkyl. In another embodiment, M may be selected from the group consisting of ($C_2$-$C_8$)alkyl, ($C_4$-$C_8$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, ($C_2$-$C_8$)alkyl-PEG-($C_2$-$C_8$)alkyl, phenyl, and ($C_2$-$C_8$)alkylphenyl($C_2$-$C_8$)alkyl. In yet another embodiment, M may be ($C_4$-$C_{12}$)alkyl. In still another embodiment, M may be ($C_2$-$C_8$)alkyl. In a further embodiment, the PEG may be TEG. In a particular embodiment, M may be ethyl, propyl, or cyclohexyl.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

The disclosure also provides polyurea polymer of Formula (IVa):

(IVa)

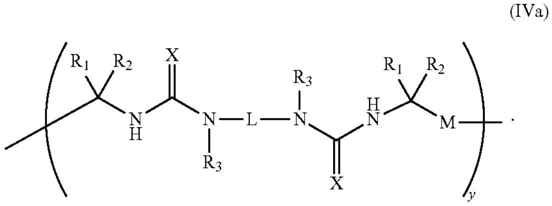

In one embodiment, $R_1$ and $R_2$ may be independently ($C_2$-$C_{10}$)alkyl. In another embodiment, $R_1$ and $R_2$ may be independently ($C_2$-$C_8$)alkyl. In some embodiments, $R_1$ and $R_2$ may be independently selected from the group consisting of tert-butyl, isopropyl, ethyl, and methyl.

L may be as defined above under the description of Formula (I) or any embodiments thereof.

M may be as defined above under the description of Formula (IV) or any embodiments thereof.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

The disclosure additionally provides a polyurea polymer of Formula (V):

(V)

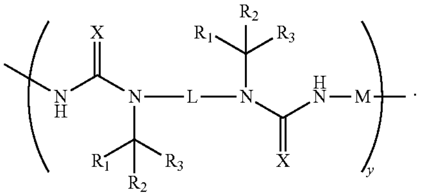

(Va)

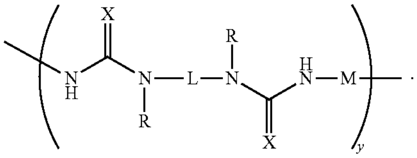

L may be as defined above under the description of Formula (I) or any embodiments thereof.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

Furthermore, the disclosure provides a polyurea polymer of Formula (VI):

(VI)

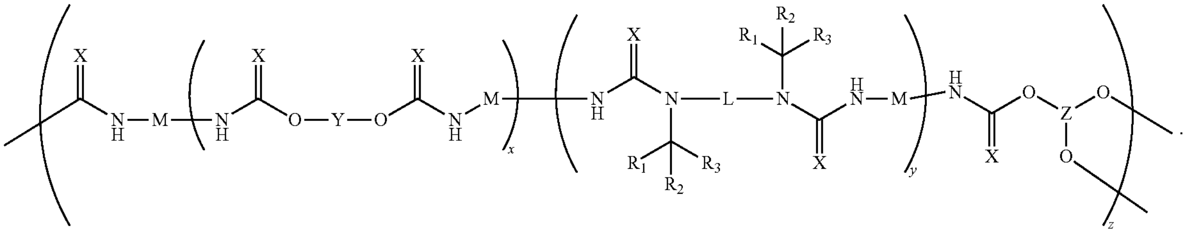

L may be as defined above under the description of Formula (I) or any embodiments thereof.

M may be as defined above under the description of Formula (IV) or any embodiments thereof.

In one embodiment, $R_1$, $R_2$, and $R_3$ are independently selected from the group consisting of $(C_1\text{-}C_{10})$alkyl, $(C_5\text{-}C_6)$cycloalkyl, $(C_1\text{-}C_{10})$alkyl$(C_5\text{-}C_6)$cycloalkyl, $(C_1\text{-}C_{10})$alkyl$(C_5\text{-}C_6)$cycloalkyl$(C_1\text{-}C_{10})$alkyl, $(C_2\text{-}C_{10})$alkyl-PEG-$(C_2\text{-}C_{10})$alkyl, and H. In another embodiment, $R_1$, $R_2$, and $R_3$ are independently selected from the group consisting of $(C_2\text{-}C_8)$alkyl, $(C_5\text{-}C_6)$cycloalkyl, $(C_2\text{-}C_8)$alkyl$(C_5\text{-}C_6)$cycloalkyl, $(C_2\text{-}C_8)$alkyl$(C_5\text{-}C_6)$cycloalkyl$(C_2\text{-}C_8)$alkyl, $(C_2\text{-}C_8)$alkyl-PEG-$(C_2\text{-}C_8)$alkyl, and H. In yet another embodiment, $R_1$, $R_2$, and $R_3$ are each methyl.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

The disclosure also provides a polyurea polymer of Formula (Va):

L may be as defined above under the description of Formula (I) or any embodiments thereof.

M may be as defined above under the description of Formula (IV) or any embodiments thereof.

In some embodiments, Y may be selected from the group consisting of $(C_2\text{-}C_{10})$alkyl, $(C_4\text{-}C_6)$cycloalkyl, $(C_1\text{-}C_{10})$alkyl$(C_4\text{-}C_6)$cycloalkyl, $(C_1\text{-}C_{10})$alkyl$(C_4\text{-}C_6)$cycloalkyl$(C_1\text{-}C_{10})$alkyl, $(C_6\text{-}C_{10})$aryl, $(C_1\text{-}C_{10})$alkyl$(C_6\text{-}C_{10})$aryl, $(C_1\text{-}C_{10})$alkyl$(C_6\text{-}C_{10})$aryl$(C_1\text{-}C_{10})$alkyl, $(C_2\text{-}C_{10})$alkyl-PEG-$(C_2\text{-}C_{20})$alkyl, —O—, —S—, —$NR_1$—, =N—, —$CX_2$—, —NC(=O)$(C_1\text{-}C_{10})$alkyl-, —C(=O)$(C_1\text{-}C_{10})$alkyl-, —C(=O)—$(NR_1)$—, —S(=O)$_2$O—, —S(=O)$_2$—$(C_1\text{-}C_{10})$alkyl-, —OS(=O)$_2$O$(C_1\text{-}C_{10})$alkyl-, —S(=O)$_2$NR$_1$—, —S(=O)$C_1\text{-}C_{10}$)alkyl-, —OP(=O)(OR$_1$)—, —P(=O)(OR$_1$)—, —C(S)—$(C_1\text{-}C_{10})$alkyl-, —C(O)O$(C_1\text{-}C_{10})$alkyl-, —C(=O)O—, —C(=S)O$(C_1\text{-}C_{10})$alkyl-, —C(=O)S$(C_1\text{-}C_{10})$alkyl-, —C(=S)S$(C_1\text{-}C_{10})$alkyl-, —C(O)NR$_1$—$(C_1\text{-}C_{10})$alkyl-, and —C(NR$_1$)NR$_1$—. In other embodiments, Y may be selected from the group consisting of $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, and $(C_2\text{-}C_{20})$alkyl-PEG-$(C_2\text{-}C_{20})$alkyl. In some other embodiments, Y may be selected from the group consisting of —O—, —S—, —NR$_1$—, =N—, —CX$_2$—, —NC(=O)$(C_1\text{-}C_{10})$alkyl-, —C(=O)$(C_1\text{-}C_{10})$alkyl-, —C(=O)—(NR$_1$)—, —S(=O)$_2$O—, —S(=O)$_2$—$(C_1\text{-}C_{10})$alkyl-, —OS(=O)$_2$O$(C_1\text{-}C_{10})$alkyl-, —S(=O)$_2$NR$_1$—, —S(=O)$C_1\text{-}C_{10}$)alkyl-, —OP(=O)(OR$_1$)—, —P(=O)(OR$_1$)—, —C(S)—$(C_1\text{-}C_{10})$ alkyl-, —C(O)O($C_1$-$C_{10}$)alkyl-, —C(═O)O—, —C(═S)O ($C_1$-$C_{10}$)alkyl-, —C(═O)S($C_1$-$C_{10}$)alkyl-, —C(═S)S($C_1$-$C_{10}$)alkyl-, —C(O)$NR_1$—($C_1$-$C_{10}$)alkyl-, and —C($NR_1$)$NR_1$—. In one embodiment, Y may be selected from the group consisting of ($C_2$-$C_{10}$)alkyl, ($C_5$-$C_6$)cycloalkyl, ($C_1$-$C_{10}$)alkyl($C_5$-$C_6$)cycloalkyl, ($C_1$-$C_{10}$)alkyl($C_5$-$C_6$)cycloalkyl($C_1$-$C_{10}$)alkyl, ($C_6$)aryl, ($C_1$-$C_{10}$)alkyl($C_6$)aryl, ($C_1$-$C_{10}$)alkyl($C_6$)aryl($C_1$-$C_{10}$)alkyl, ($C_2$-$C_{10}$)alkyl-PEG-($C_2$-$C_{10}$)alkyl, phenyl, and ($C_1$-$C_{10}$)alkylphenyl($C_1$-$C_{10}$)alkyl. In another embodiment, Y may be selected from the group consisting of ($C_2$-$C_8$)alkyl, ($C_5$-$C_6$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, ($C_2$-$C_8$)alkylphenyl, ($C_2$-$C_8$)alkyl-PEG-($C_2$-$C_8$)alkyl, phenyl, and ($C_2$-$C_8$)alkylphenyl($C_2$-$C_8$)alkyl. In yet another embodiment, Y may be phenyl. In still another embodiment, Y may be ($C_4$-$C_{12}$)alkyl. In a further embodiment, Y may be ($C_2$-$C_8$)alkyl. In a still further embodiment, the PEG may be TEG. In a particular embodiment, Y may be ethyl, propyl, or cyclohexyl.

In one embodiment, $R_1$, $R_2$, and $R_3$ are independently selected from the group consisting of ($C_1$-$C_{10}$)alkyl, ($C_5$-$C_6$)cycloalkyl, ($C_1$-$C_{10}$)alkyl($C_5$-$C_6$)cycloalkyl, ($C_1$-$C_{10}$)alkyl($C_5$-$C_6$)cycloalkyl($C_1$-$C_{10}$)alkyl, ($C_2$-$C_{10}$)alkyl-PEG-($C_2$-$C_{10}$)alkyl, and H. In another embodiment, $R_1$, $R_2$, and $R_3$ are independently selected from the group consisting of ($C_2$-$C_8$)alkyl, ($C_5$-$C_6$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, ($C_2$-$C_8$)alkyl-PEG-($C_2$-$C_8$)alkyl, and H. In yet another embodiment, $R_1$, $R_2$, and $R_3$ are each methyl.

The cross-linker moiety Z may have 3 to 8 arms, such as 3 arms, 4 arms, 5 arms, 6 arms, 7 arms, or 8 arms.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

The number z may range from 1 to 50, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments, z is less than 50. In some other embodiments, z is greater than 1.

The disclosure also provides a polyurea polymer of Formula (VIa):

(VIa)

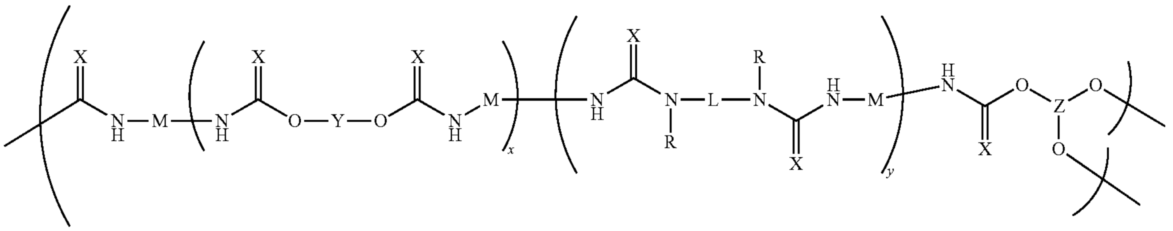

L may be as defined above under the description of Formula (I) or any embodiments thereof.

M may be as defined above under the description of Formula (IV) or any embodiments thereof.

Y may be as defined above under the description of Formula (VI) or any embodiments thereof.

The cross-linker moiety Z may have 3 to 8 arms, such as 3 arms, 4 arms, 5 arms, 6 arms, 7 arms, or 8 arms.

The number y may range from about 5 to about 500, such as from about 10 to about 100, of from about 5 to about 10, from about 10 to about 25, from about 25 to about 50, from about 50 to about 75, from about 75 to about 100, from about 100 to about 200, from about 200 to about 300, from about 300 to about 400, or from about 400 to about 500. In some embodiments, y is less than about 500. In some other embodiments, y is greater than about 5. In yet other embodiments, y is 10 to about 100. As used in this example, the term "about" refers to the average value for y in a given polyurea polymer sample.

The disclosure also provides a polyurea polymer of Formula (VII):

(VII)

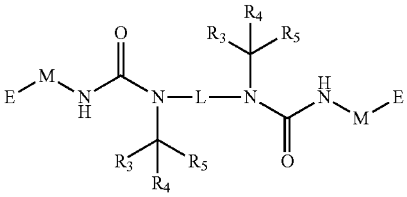

wherein

E is independently selected from the group consisting of

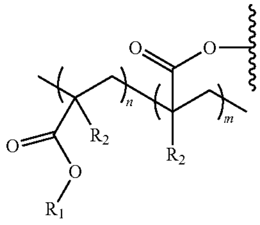

,

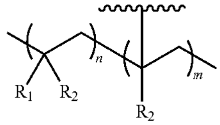

,

-continued

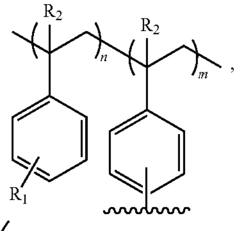

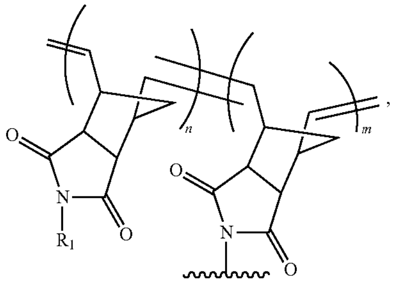

-continued

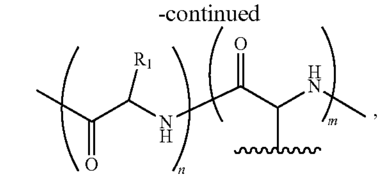

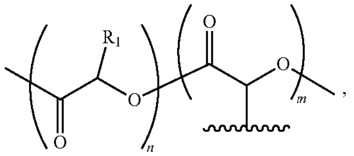

and

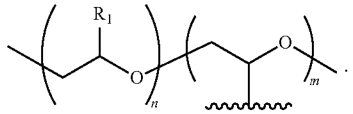

In some embodiments, the disclosure provides a polyurea polymer of Formula (VII) having Formula (VIIa):

(VIIa)

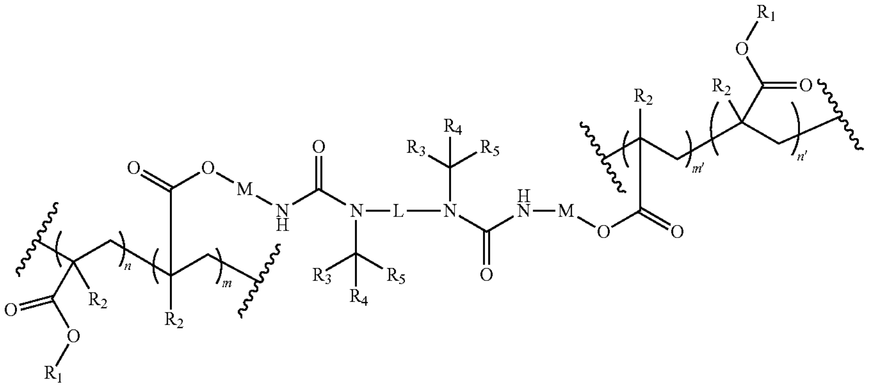

wherein n and n' are each independently 2 to 12; and m and m' are each independently 2 to 50.

In some embodiments, the disclosure provides a polyurea polymer of Formula (VII) having Formula (VIIb):

(VIIb)

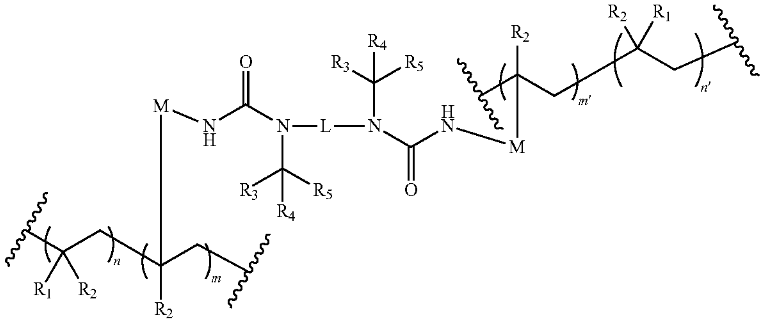

wherein n and n' are each independently 2 to 12; and m and m' are each independently 2 to 50.

In some embodiments, the disclosure provides a polyurea polymer of Formula (VIIc):
(VIIc)
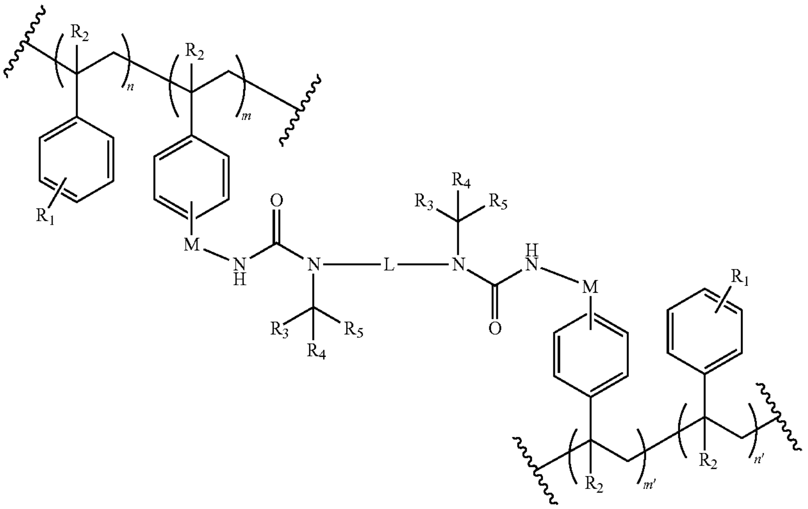
wherein
n and n' are each independently 2 to 12; and
m and m' are each independently 2 to 50.
In some embodiments, the disclosure provides a polyurea polymer of Formula (VII) having Formula (VIId):
(VIId)
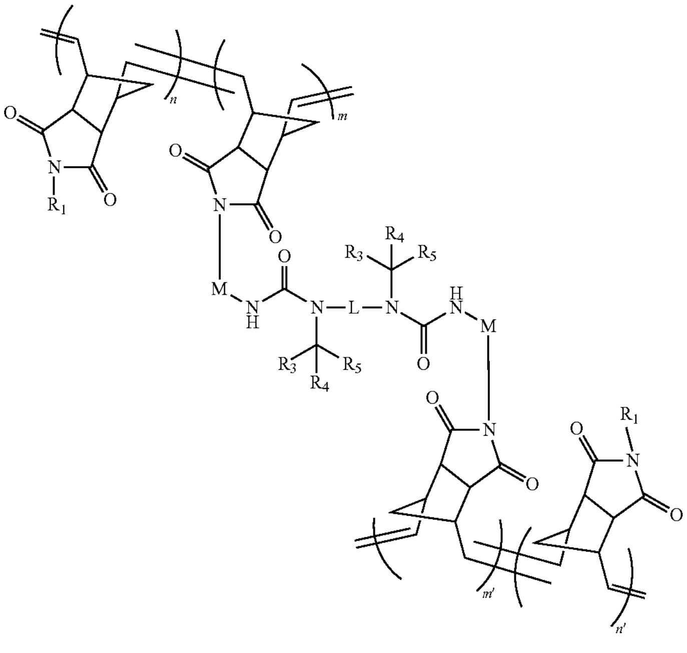

In some embodiments, the disclosure provides a polyurea polymer of Formula (VII) having Formula (VIIe):

(VIIe)

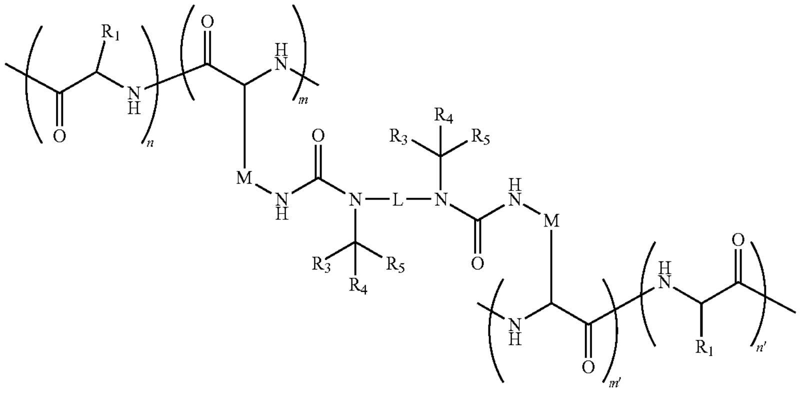

wherein n and n' are each independently 2 to 12; and m and m' are each independently 2 to 50.

In some embodiments, the disclosure provides a polyurea polymer of Formula (VII) having Formula (VIIf):

(VIIf)

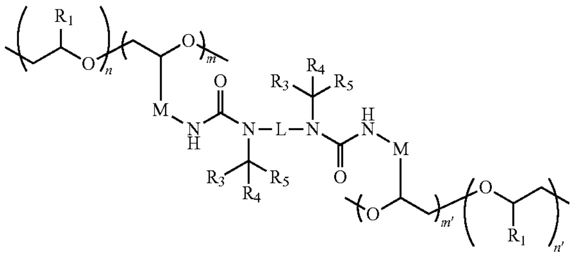

wherein n and n' are each independently 2 to 12; and m and m' are each independently 2 to 50.

In some embodiments, the disclosure provides a polyurea polymer of Formula (VII) having Formula (VIIg):

(VIIg)

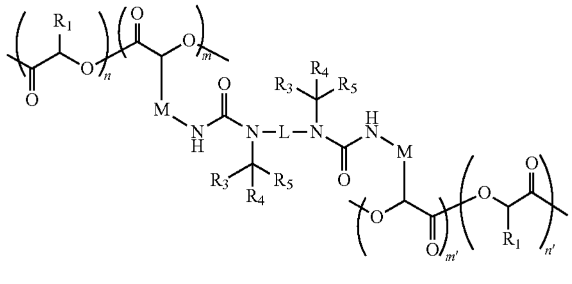

wherein n and n' are each independently 2 to 12; and m and m' are each independently 2 to 50.

In one aspect, in any compound of Formula (VII) or Formulae (VIIa-VIIg), L may be selected from the group consisting of ($C_2$-$C_{10}$)alkyl, ($C_4$-$C_6$)cycloalkyl, ($C_1$-$C_{10}$)alkyl($C_4$-$C_6$)cycloalkyl, ($C_1$-$C_{10}$)alkyl($C_4$-$C_6$)cycloalkyl($C_1$-$C_{10}$)alkyl, ($C_6$-$C_{10}$)aryl, ($C_1$-$C_{10}$)alkyl($C_6$-$C_{10}$)aryl, ($C_1$-$C_{10}$)alkyl($C_6$-$C_{10}$)aryl($C_1$-$C_{10}$)alkyl, ($C_2$-$C_{10}$)alkyl-PEG-($C_2$-$C_{20}$)alkyl, —O—, —S—, —$NR_1$—, =N—, —$CX_2$—, —NC(=O)($C_1$-$C_{10}$)alkyl-, —C(=O)($C_1$-$C_{10}$)alkyl-, —C(=O)—($NR_1$)—, —S(=O)$_2$O—, —S(=O)$_2$—($C_1$-$C_{10}$)alkyl-, —OS(=O)$_2$O($C_1$-$C_{10}$)alkyl-, —S(=O)$_2$$NR_1$—, —S(=O)$C_1$-$C_{10}$alkyl-, —OP(=O)($OR_1$)—, —P(=O)($OR_1$)—, —C(S)—($C_1$-$C_{10}$)alkyl-, —C(O)O($C_1$-$C_{10}$)alkyl-, —C(=O)O—, —C(=S)O($C_1$-$C_{10}$)alkyl-, —C(=O)S($C_1$-$C_{10}$)alkyl-, —C(=S)S($C_1$-$C_{10}$)alkyl-, —C(O)$NR_1$—($C_1$-$C_{10}$)alkyl-, and —C($NR_1$)$NR_1$—. In other embodiments of this aspect, L may be selected from the group consisting of ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, and ($C_2$-$C_{20}$)alkyl-PEG-($C_2$-$C_{20}$)alkyl. In some other embodiments of this aspect, L may be selected from the group consisting of —O—, —S—, —$NR_1$—, =N—, —$CX_2$—, —NC(=O)($C_1$-$C_{10}$)alkyl-, —C(=O)($C_1$-$C_{10}$)alkyl-, —C(=O)—($NR_1$)—, —S(=O)$_2$O—, —S(=O)$_2$—($C_1$-$C_{10}$)alkyl-, —OS(=O)$_2$O($C_1$-$C_{10}$)alkyl-, —S(=O)$_2$$NR_1$—, —S(=O)$C_1$-$C_{10}$alkyl-, —OP(=O)($OR_1$)—, —P(=O)($OR_1$)—, —C(S)—($C_1$-$C_{10}$)alkyl-, —C(O)O($C_1$-$C_{10}$)alkyl-, —C(=O)O—, —C(=S)O($C_1$-$C_{10}$)alkyl-, —C(=O)S($C_1$-$C_{10}$)alkyl-, —C(=S)S($C_1$-$C_{10}$)alkyl-, —C(O)$NR_1$—($C_1$-$C_{10}$)alkyl-, and —C($NR_1$)$NR_1$—. In one embodiment of this aspect, L may be selected from the group consisting of ($C_2$-$C_{10}$)alkyl, ($C_4$-$C_{10}$)cycloalkyl, ($C_1$-$C_{10}$)alkyl($C_4$-$C_{10}$)cycloalkyl, ($C_1$-$C_{10}$)alkyl($C_4$-$C_{10}$)cycloalkyl($C_1$-$C_{10}$)alkyl, ($C_6$-$C_{10}$)aryl, ($C_1$-$C_{10}$)alkyl($C_6$-$C_{10}$)aryl, ($C_1$-$C_{10}$)alkyl($C_6$-$C_{10}$)aryl($C_1$-$C_{10}$)alkyl, and ($C_2$-$C_{10}$)alkyl-PEG-($C_2$-$C_{20}$)alkyl. In another embodiment of this aspect, L may be selected from the group consisting of ($C_2$-$C_8$)alkyl, ($C_5$-$C_6$)cycloalkyl, ($C_2$-$C_8$)alkyl($C_5$-$C_6$)cycloalkyl, ($C_2$-$C_8$)alkyl($C_5$-$C_6$)cycloalkyl($C_2$-$C_8$)alkyl, $C_6$-aryl, ($C_2$-$C_8$)alkyl($C_6$)aryl, ($C_2$-$C_8$)alkyl($C_6$)aryl($C_2$-$C_8$)alkyl, and ($C_2$-$C_8$)alkyl-PEG-($C_2$-$C_8$)alkyl. In yet another embodiment of this aspect, L may be phenyl. In some other embodiment of this aspect, L may be ($C_2$-$C_{20}$)alkyl. In still another embodiment of this aspect, L may be ($C_4$-$C_{12}$)alkyl. In a further embodiment of this aspect, L may be ($C_2$-$C_8$)alkyl. In a still further embodiment of this aspect, the PEG may be TEG. In a particular embodiment of this aspect, L may be ethyl, propyl, or cyclohexyl.

In one aspect, in any compound of Formula (VII) or Formulae (VIIa-VIIg), M may be selected from the group consisting of $(C_2-C_{10})$alkyl, $(C_4-C_6)$cycloalkyl, $(C_1-C_{10})$alkyl$(C_4-C_6)$cycloalkyl, $(C_1-C_{10})$alkyl$(C_4-C_6)$cycloalkyl$(C_1-C_{10})$alkyl, $(C_6-C_{10})$aryl, $(C_1-C_{10})$alkyl$(C_6-C_{10})$aryl, $(C_1-C_{10})$alkyl$(C_6-C_{10})$aryl$(C_1-C_{10})$alkyl, $(C_2-C_{10})$alkyl-PEG-$(C_2-C_{20})$alkyl, —O—, —S—, —$NR_1$—, =N—, —$CX_2$—, —NC(=O)$(C_1-C_{10})$alkyl-, —C(=O)$(C_1-C_{10})$alkyl-, —C(=O)—$(NR_1)$—, —S(=O)$_2$O—, —S(=O)$_2$—$(C_1-C_{10})$alkyl-, —OS(=O)$_2$O$(C_1-C_{10})$alkyl-, —S(=O)$_2$$NR_1$—, —S(=O)$C_1-C_{10}$alkyl-, —OP(=O)$(OR_1)$—, —P(=O)$(OR_1)$—, —C(S)—$(C_1-C_{10})$alkyl-, —C(O)O$(C_1-C_{10})$alkyl-, —C(=O)O—, —C(=S)O$(C_1-C_{10})$alkyl-, —C(=O)S$(C_1-C_{10})$alkyl-, —C(=S)S$(C_1-C_{10})$alkyl-, —C(O)$NR_1$—$(C_1-C_{10})$alkyl-, and —C$(NR_1)NR_1$—. In other embodiments of this aspect, M may be selected from the group consisting of $(C_2-C_{20})$alkyl, $(C_4-C_{10})$cycloalkyl, $(C_1-C_{20})$alkyl$(C_4-C_{10})$cycloalkyl, $(C_1-C_{20})$alkyl$(C_4-C_{10})$cycloalkyl$(C_1-C_{20})$alkyl, $(C_6-C_{10})$aryl, $(C_1-C_{20})$alkyl$(C_6-C_{10})$aryl, $(C_1-C_{20})$alkyl$(C_6-C_{10})$aryl$(C_1-C_{20})$alkyl, and $(C_2-C_{20})$alkyl-PEG-$(C_2-C_{20})$alkyl. In some other embodiments of this aspect, M may be selected from the group consisting of —O—, —S—, —$NR_1$—, =N—, —$CX_2$—, —NC(=O)$(C_1-C_{10})$alkyl-, —C(=O)$(C_1-C_{10})$alkyl-, —C(=O)—$(NR_1)$—, —S(=O)$_2$O—, —S(=O)$_2$—$(C_1-C_{10})$alkyl-, —OS(=O)$_2$O$(C_1-C_{10})$alkyl-, —S(=O)$_2$$NR_1$—, —S(=O)$C_1-C_{10}$)alkyl-, —OP(=O)$(OR_1)$—, —P(=O)$(OR_1)$—, —C(S)—$(C_1-C_{10})$alkyl-, —C(O)O$(C_1-C_{10})$alkyl-, —C(=O)O—, —C(=S)O$(C_1-C_{11})$alkyl-, —C(=O)S$(C_1-C_{10})$alkyl-, —C(=S)S$(C_1-C_{10})$alkyl-, —C(O)$NR_1$—$(C_1-C_{10})$alkyl-, and —C$(NR_1)NR_1$—. In one embodiment of this aspect, M may be selected from the group consisting of $(C_2-C_{10})$alkyl, $(C_4-C_{10})$cycloalkyl, $(C_1-C_{10})$alkyl$(C_5-C_6)$cycloalkyl, $(C_1-C_{10})$alkyl$(C_5-C_6)$cycloalkyl$(C_1-C_{10})$alkyl, $(C_2-C_{10})$alkyl-PEG-$(C_2-C_{10})$alkyl, phenyl, and $(C_1-C_{10})$alkylphenyl$(C_1-C_{10})$alkyl. In another embodiment of this aspect, M may be selected from the group consisting of $(C_2-C_8)$alkyl, $(C_4-C_8)$cycloalkyl, $(C_2-C_8)$alkyl$(C_5-C_6)$cycloalkyl, $(C_2-C_8)$alkyl$(C_5-C_6)$cycloalkyl$(C_2-C_8)$alkyl, $(C_2-C_8)$alkyl-PEG-$(C_2-C_8)$alkyl, phenyl, and $(C_2-C_8)$alkylphenyl$(C_2-C_8)$alkyl. In yet another embodiment of this aspect, M may be $(C_4-C_{12})$alkyl. In still another embodiment of this aspect, M may be $(C_2-C_8)$alkyl. In a further embodiment, the PEG may be TEG. In a particular embodiment of this aspect, M may be ethyl, propyl, or cyclohexyl.

In one aspect, in any compound of Formula (VII) or Formulae (VIIa-VIIg), $R_1$ and $R_2$ may be independently $(C_2-C_{10})$alkyl. In another embodiment of this aspect, $R_1$ and $R_2$ may be independently $(C_2-C_8)$alkyl. In some embodiments of this aspect, $R_1$ and $R_2$ may be independently selected from the group consisting of tert-butyl, isopropyl, ethyl, and methyl.

In one aspect, in any compound of Formula (VII) or Formulae (VIIa-VIIg), $R_3$, $R_4$, and $R_5$ are independently selected from the group consisting of $(C_1-C_{10})$alkyl, $(C_5-C_6)$cycloalkyl, $(C_1-C_{10})$alkyl$(C_5-C_6)$cycloalkyl, $(C_1-C_{10})$alkyl$(C_5-C_6)$cycloalkyl$(C_1-C_{10})$alkyl, $(C_2-C_{10})$alkyl-PEG-$(C_2-C_{10})$alkyl, and H. In another embodiment of this aspect, $R_3$, $R_4$, and $R_5$ are independently selected from the group consisting of $(C_2-C_8)$alkyl, $(C_5-C_6)$cycloalkyl, $(C_2-C_8)$alkyl$(C_5-C_6)$cycloalkyl, $(C_2-C_8)$alkyl$(C_5-C_6)$cycloalkyl$(C_2-C_8)$alkyl, $(C_2-C_8)$alkyl-PEG-$(C_2-C_8)$alkyl, and H. In yet another embodiment of this aspect, $R_3$, $R_4$, and $R_5$ are each methyl.

In one aspect, in any compound of Formulae (VIIa-VIIg), the number n may range from 2 to 12, for example from 4 to 8, or 2, 3, 4, 5, 7, 8, 9, 10, 11, or 12. In some embodiments of this aspect, n is less than 12. In some other embodiments of this aspect, n is greater than 2. In yet other embodiments, n is 4-8.

In one aspect, in any compound of Formulae (VIIa-VIIg), the number n' may range from 2 to 12, for example from 4 to 8, or 2, 3, 4, 5, 7, 8, 9, 10, 11, or 12. In some embodiments of this aspect, n' is less than 12. In some other embodiments of this aspect, n' is greater than 2. In yet other embodiments of this aspect, n' is 4-8.

In one aspect, in any compound of Formulae (VIIa-VIIg), the number m may range from 2 to 50, such as 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments of this aspect, m is less than 50. In some other embodiments of this aspect, m is greater than 2.

In one aspect, in any compound of Formulae (VIIa-VIIg), the number m' may range from 2 to 50, such as 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50. In some embodiments of this aspect, m' is less than 50. In some other embodiments of this aspect, m' is greater than 2.

In other embodiments, the disclosure provides a polyurea polymer of Formula (VIII):

(VIII)

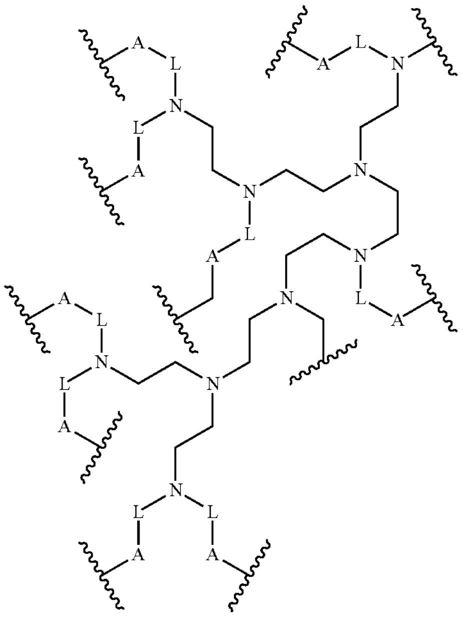

wherein

A is

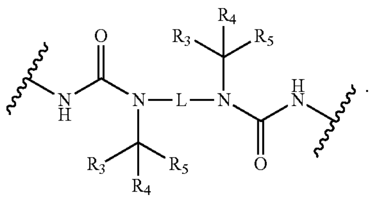

L may be as defined above under the description of Formula (I) or any embodiments thereof.

In one embodiment, $R_3$, $R_4$, and $R_5$ are independently selected from the group consisting of $(C_1\text{-}C_{10})$alkyl, $(C_5\text{-}C_6)$cycloalkyl, $(C_1\text{-}C_{10})$alkyl$(C_5\text{-}C_6)$cycloalkyl, $(C_1\text{-}C_{10})$alkyl$(C_5\text{-}C_6)$cycloalkyl$(C_1\text{-}C_{10})$alkyl, $(C_2\text{-}C_{10})$alkyl-PEG-$(C_2\text{-}C_{10})$alkyl, and H. In another embodiment, $R_3$, $R_4$, and $R_5$ are independently selected from the group consisting of $(C_2\text{-}C_8)$alkyl, $(C_5\text{-}C_6)$cycloalkyl, $(C_2\text{-}C_8)$alkyl$(C_5\text{-}C_6)$cycloalkyl, $(C_2\text{-}C_8)$alkyl$(C_5\text{-}C_6)$cycloalkyl$(C_2\text{-}C_8)$alkyl, $(C_2\text{-}C_8)$alkyl-PEG-$(C_2\text{-}C_8)$alkyl, and H. In yet another embodiment, $R_3$, $R_4$, and $R_5$ are each methyl.

(a) Combinations and Copolymers

The polyurea polymers described herein may be used in combination with a polyurethane polymer. In exemplary embodiments, the combination may include polyethylene glycol (PEG) segments, crosslinking, or a combination thereof, and the crosslinking may include triethanolamine moieties.

In other embodiments, a copolymer may comprise a polyurea segment, a polyurethane segment, and a polyethylene glycol (PEG) segment. The copolymer may comprise crosslinking with triethanolamine moieties, and the polyurea segment comprises tert-butyl groups on one of the nitrogen moieties of the urea bonds that render the urea linkages reversibly dissociable. The copolymer may be derived from an alkyldiisocyanate, a polyethylene glycol (PEG) chain extender, a trialkanolamine cross-linker, and an alkane diamine of the formula (tBu)NH—$((C_2\text{-}C_{20})$ alkyl)NH(tBu). In some other embodiments, the copolymer may be derived from an alkyldiisocyanate, a polyethylene glycol (PEG) chain extender, a trialkanolamine cross-linker, and an alkane diamine of the formula (tBu)NH—$((C_2\text{-}C_8)$alkyl)NH(tBu). In exemplary embodiments, the components may be such that the copolymer formed reaches a gel point.

A polymer described herein containing hindered urea bonds may be formed into a stiff and stable elastomer that, after being pulled apart or cut apart, or two pieces are otherwise formed from one, can heal (re-form into one piece) within several hours at room temperature by simply applying to two pieces back together without any external trigger or reagent.

(b) Methods for Preparing a Copolymer

The disclosure further provides a method for preparing a copolymer comprising dynamic urea moieties. The method comprises contacting an alkyldiisocyanate and an alkyldiamine in solution, wherein the amines of the alkyldiamine comprise a tert-butyl substituent in a solvent system to form an oligourea. The oligourea is contacted with a trialkanolamine and a polyethylene glycol in the presence of a condensation reaction catalyst, thereby initiating cross-linking. The method provides a cross-linked poly(urea-urethane) polymer.

In one embodiment, the diisocyanate may be a $C_2\text{-}C_{12}$ diisocyanate. Exemplary diisocyantes include, but are not limited to, toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate, and tetramethylenexylylene diisocyanate. In some embodiments, the diisocyanate may be a $C_2\text{-}C_{12}$ diisocyanate.

Exemplary alkyldiamines include, but are not limited to, diprimary diamines, diamines containing one or two secondary amino groups with an alkyl substituent having from 1 to 8 carbon atoms attached to the N-atom, and a heterocyclic diamine. The diprimary aliphatic diamines may contain terminal amino groups. In some embodiments, the diamine may be ethylenediamine, propylenediamine, hexamethylenediamine, dimer fatty diamines, aromatic diamines, and homologs thereof. Suitable aromatic diamines may be derived from benzene, toluene or otherwise substituted aromatics, for example 2,6-tolylenediamine, 4,4-diphenylmethanediamine, and xylylenediamine. The corresponding cyclohexane derivatives may also be used. In one embodiment, the alkyldiamine may have the formula (tBu)NH—$((C_2\text{-}C_{20})$alkyl)NH(tBu). In another embodiment, the alkyldiamine may have the formula (tBu)NH—$((C_2\text{-}C_8)$alkyl)NH(tBu).

Suitable trialkanolamines include, but are not limited to, trimethanolamine, triethanolamine, tripropanolamine, triisopropanolamine, tributanolamine, tri-sec-butanolamine, and tri-tert-butanolamine. In one embodiment, the trialkanolamine may be triethanolamine.

"Polyalkylene glycol" refers to group comprising the formula $-(O-R)_n-$, wherein R is an alkyl and n is an integer of 2 or greater. When R is ethyl, then the polyalkylene glycol is a polyethylene glycol (PEG). Suitable polyethylene glycols include, but are not limited to, triethylene glycol, tetraethylene glycol, pentaethylene glycol, and hexaethylene glycol. In one embodiment, the polyethylene glycol may be tetraethylene glycol (TEG). In other embodiments, the polyalkylene glycol may be a polypropylene glycol.

Suitable condensation reaction catalysts include, but are not limited to, 1,4-diazabicyclo[2.2.2]octane (DABCO, TEDA), dimethylcyclohexylamine (DMCHA), dimethylethanolamine (DMEA), mercury carboxylate, a bismuth compound, such as bismuth octanoate; or tin compound, such as dibutyltin diaceate, dibutyltin dilaurate, dibutyltin dichloride, dibutyltin bis(acetylacetonate), dibutyltin maleate, dibutyltin diisothiocyanate, dibutyltin dimyristate, dibutyltin dioleate, dibutyltin distearate, dibutyltin bis(lauryl mercaptide), dibutyltin bis(isooctylmercaptoacetate), dibutyltin oxide, stannous bis(2-ethylhexoate), stannous oxide, stannous oxatlate, hydrated monobutyltin oxide, monobutyltin trioctoate, dimethyltin salts, and dioctyltin salts. In one embodiment, the condensation reaction catalyst may be dibutyltin diacetate.

In one embodiment, the copolymer may be cured at about room temperature (23° C.) to about 75° C., such as from about 23° C. to about 30° C., from about 30° C. to about 35° C., from about 35° C. to about 40° C., from about 40° C. to about 45° C., from about 45° C. to about 50° C., from about 50° C. to about 55° C., from about 55° C. to about 60° C., from about 60° C. to about 65° C., from about 65° C. to about 70° C., or from about 70° C. to about 75° C. In some embodiments, the copolymer may be cured at a temperature less than 75° C. In some embodiments, the copolymer may be cured at a temperature greater than 23° C.

In one embodiment, the cross-linked poly(urea-urethane) polymer may be a reversible polymer at room temperature. In one embodiment, the stoichiometry of the components may be such that a gel point is achieved. The disclosure also provides a copolymer as described herein in combination with one or more additional polymers. The resulting composition may be, for example, a coating, fiber, adhesive, or plastic. The polyurea or copolymer may be self-healing.

The compounds and compositions can be prepared by any of the applicable techniques of organic synthesis. Many such techniques are well known in the art. Many known techniques are elaborated in *Compendium of Organic Synthetic Methods* (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6, Michael B. Smith; as well as standard organic reference texts such as *March's*

*Advanced Organic Chemistry: Reactions, Mechanisms, and Structure*, 5th Ed. by M. B. Smith and J. March (John Wiley & Sons, New York, 2001), *Comprehensive Organic Synthesis; Selectivity, Strategy & Efficiency in Modern Organic Chemistry*, in 9 Volumes, Barry M. Trost, Ed.-in-Chief (Pergamon Press, New York, 1993 printing)); *Advanced Organic Chemistry, Part B: Reactions and Synthesis*, Second Edition, Cary and Sundberg (1983); *Protecting Groups in Organic Synthesis*, Second Edition, Greene, T. W., and Wutz, P. G. M., John Wiley & Sons, New York; and *Comprehensive Organic Transformations*, Larock, R. C., Second Edition, John Wiley & Sons, New York (1999).

A number of exemplary methods for preparing the compositions of the disclosure are provided below. These methods are intended to illustrate the nature of such preparations are not intended to limit the scope of applicable methods. Generally, the reaction conditions such as temperature, reaction time, solvents, work-up procedures, and the like, will be those common in the art for the particular reaction. The cited reference material, together with material cited therein, contains detailed descriptions of such conditions. Typically the temperatures will be −100° C. to 200° C., solvents will be aprotic or protic, depending on the conditions and reaction times will be 1 minute to 10 days. Work-up typically consists of quenching any unreacted reagents followed by partition between a water/organic layer system (extraction) and separation of the layer containing the product.

Oxidation and reduction reactions are typically carried out at temperatures near room temperature (about 20° C.), although for metal hydride reductions frequently the temperature is reduced to 0° C. to −100° C. Heating may also be used when appropriate. Solvents are typically aprotic for reductions and may be either protic or aprotic for oxidations. The reaction times are adjusted to achieve desired conversions.

The condensation reactions are typically carried out at temperatures near room temperature, although for non-equilibrating, kinetically controlled condensations reduced temperatures (0° C. to −100° C.) are also common. Solvents can be either protic (common in equilibrating reactions) or aprotic (common in kinetically controlled reactions). Standard synthetic techniques such as azeotropic removal of reaction byproducts and use of anhydrous reaction conditions (e.g. inert gas environments) are common in the art and will be applied when applicable.

Protecting Groups. The term "protecting group" refers to any group that, when bound to a hydroxyl, nitrogen, or other heteroatom, prevents undesired reactions at the sight of the heteroatom, and which group can be removed by conventional chemical or enzymatic steps to reestablish the 'unprotected' hydroxyl, nitrogen, or other heteroatom group. The particular removable group employed is often interchangeable with other groups in various synthetic routes. Certain removable protecting groups include conventional substituents such as, for example, allyl, benzyl, acetyl, chloroacetyl, thiobenzyl, benzylidine, phenacyl, methyl methoxy, silyl ethers (e.g., trimethylsilyl (TMS), t-butyl-diphenylsilyl (TBDPS), or t-butyldimethylsilyl (TBS)) and any other group that can be introduced chemically onto a hydroxyl functionality and later selectively removed either by chemical or enzymatic methods in mild conditions compatible with the nature of the product. The $R^1$ groups of Formula (I) can also be protecting groups, as described herein.

Protecting groups are available, commonly known and used, and are optionally used to prevent side reactions with the protected group during synthetic procedures; i.e., routes or methods to prepare the compounds by the methods of the disclosure. For the most part the decision as to which groups to protect, when to do so, and the nature of the chemical protecting group "PG" will be dependent upon the chemistry of the reaction to be protected against (e.g., acidic, basic, oxidative, reductive or other conditions) and the intended direction of the synthesis.

A large number of protecting groups and corresponding chemical cleavage reactions are described in *Protective Groups in Organic Synthesis*, Theodora W. Greene (John Wiley & Sons, Inc., New York, 1991, ISBN 0-471-62301-6) ("Greene", which is incorporated herein by reference in its entirety). Greene describes many nitrogen protecting groups, for example, amide-forming groups. In particular, see Chapter 1, Protecting Groups: An Overview, pages 1-20, Chapter 2, Hydroxyl Protecting Groups, pages 21-94, Chapter 4, Carboxyl Protecting Groups, pages 118-154, and Chapter 5, Carbonyl Protecting Groups, pages 155-184. See also Kocienski, Philip J; *Protecting Groups* (Georg Thieme Verlag Stuttgart, New York, 1994), which is incorporated herein by reference in its entirety. Some specific protecting groups that can be employed in conjunction with the methods of the disclosure are discussed below.

Protecting groups do not need to be, and often are not, the same if the compound is substituted with multiple PGs. In general, PG will be used to protect functional groups such as carboxyl, hydroxyl, thio, or amino groups and to thus prevent side reactions or to otherwise facilitate the synthetic efficiency. The order of deprotection to yield free, deprotected groups is dependent upon the intended direction of the synthesis and the reaction conditions to be encountered, and may occur in any order as determined by the artisan.

Various functional groups of the compounds of the disclosure may be protected. For example, protecting groups for —OH groups (whether hydroxyl, carboxylic acid, or other functions) include "ether- or ester-forming groups". Ether- or ester-forming groups can function as chemical protecting groups in the synthetic schemes set forth herein. Some hydroxyl and thio protecting groups are neither ether- nor ester-forming groups, as will be understood by those skilled in the art. For further detail regarding carboxylic acid protecting groups and other protecting groups for acids, see Greene, cited above. Such groups include by way of example and not limitation, esters, amides, hydrazides, and the like.

Typical nitrogen protecting groups described in Greene (pages 14-118) include benzyl ethers, silyl ethers, esters including sulfonic acid esters, carbonates, sulfates, and sulfonates. For example, suitable nitrogen protecting groups include substituted methyl ethers; substituted ethyl ethers; p-chlorophenyl, p-methoxyphenyl, 2,4-dinitrophenyl, benzyl; substituted benzyl ethers (p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2- and 4-picolyl, diphenylmethyl, 5-dibenzosuberyl, triphenylmethyl, p-methoxyphenyl-diphenylmethyl, di(p-methoxyphenyl)phenylmethyl, tri(p-methoxyphenyl)methyl, 1,3-benzodithiolan-2-yl, benzisothiazolyl S,S-dioxido);

silyl ethers (silyloxy groups) (trimethylsilyl, triethylsilyl, triisopropylsilyl, dimethylisopropylsilyl, diethylisopropylsilyl, dimethylthexylsilyl, t-butyldimethylsilyl, t-butyldiphenylsilyl, tribenzylsilyl, tri-p-xylylsilyl, triphenylsilyl, diphenylmethylsilyl, t-butylmethoxy-phenylsilyl);

esters (formate, benzoylformate, acetate, choroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), pivaloate, adamantoate, crotonate, 4-methoxycrotonate, benzoate, p-phenylbenzoate, 2,4,6-trimethylbenzoate (mesitoate));

carbonates (methyl, 9-fluorenylmethyl, ethyl, 2,2,2-trichloroethyl, 2-(trimethylsilyl)ethyl, 2-(phenylsulfonyl)ethyl, 2-(triphenylphosphonio)ethyl, isobutyl, vinyl, allyl, p-nitrophenyl, benzyl, p-methoxybenzyl, 3,4-dimethoxybenzyl, o-nitrobenzyl, p-nitrobenzyl, S-benzyl thiocarbonate, 4-ethoxy-1-naphthyl, methyl dithiocarbonate);

groups with assisted cleavage (2-iodobenzoate, 4-azidobutyrate, 4-nitro-4-methylpentanoate, o-(dibromomethyl)benzoate, 2-formylbenzenesulfonate, 2-(methylthiomethoxy)ethyl carbonate, 4-(methylthiomethoxy) butyrate; and miscellaneous esters (2,6-dichloro-4-methylphenoxyacetate, 2,6-dichloro-4-(1,1,3,3 tetramethylbutyl)phenoxyacetate, 2,4-bis(1,1-dimethylpropyl)phenoxyacetate, chlorodiphenylacetate, isobutyrate, monosuccinate, (E)-2-methyl-2-butenoate (tiglate), o-(methoxycarbonyl)benzoate, p-poly-benzoate, α-naphthoate, nitrate, alkyl N,N,N',N'-tetramethylphosphorodiamidate, n-phenylcarbamate, borate, 2,4-dinitrophenylsulfenate); and sulfonates (sulfate, methanesulfonate (mesylate), benzylsulfonate, tosylate, triflate).

(II) Polymer Characteristics

The amide bond has been one of the most important functional groups and the basic structure of numerous biological and industrial polymers (e.g., nylon, polypeptide, etc.). It has remarkable stability because of the conjugation effect between the electron lone pair on the nitrogen atom and the i-electrons on the carbonyl p-orbital. Usually extreme conditions (e.g., in highly basic or acidic solutions and/or at high temperature) reverse the amide bond (amidolysis) or the presence of special reagent (e.g., enzymes). Introducing bulky substituents to amide nitrogen atom has been reported to weaken the amide bond and result in amidolysis in mild conditions because the bulky group disturbs the orbital co-planarity of the amide bond, which diminishes the conjugation effect and thus weakens the carbonyl-amine interaction (FIG. 1*a*).

The dissociated intermediate from amidolysis (ketene) is too active for the reversible formation of amide bonds. To make the amide structure reversible, the dissociated carbonyl structure is stable under ambient conditions but still highly reactive with amines. One such group is isocyanate, which is reasonably stable under ambient condition and can react with amines rapidly to form urea bonds. This reaction has been broadly utilized in the synthesis of polyurea. Like amides made of bulky amines, a urea bond bearing a bulky group on the nitrogen atom can reversibly disassociate into an isocyanate and an amine, the reverse process of urea bond formation (FIG. 1*b*).

Reversible chemistry may not lead to polymers with dynamic properties. To render reversible chemistry dynamic and use the dynamic chemistry for the synthesis of polymers with bulk properties, both the forward and the reverse reaction should be very fast (with large $k_1$ and $k_{-1}$, equation 1), and the equilibrium favors the formation of the polymer (large $K_{eq}=k_1/k_{-1}$). In the design of dynamic polyurea specifically, it is thus important to identify a hindered urea bond (HUB) with the properly selected substituent on the amine group so that the corresponding HUB can meet the above. For example, equilibrium and exchange studies using 2-isocyanatoethyl methacrylate (1) and amines with different steric hindrance to identify such HUB (FIG. 1*c* and 1*d*) have been studied.

Figure 1:
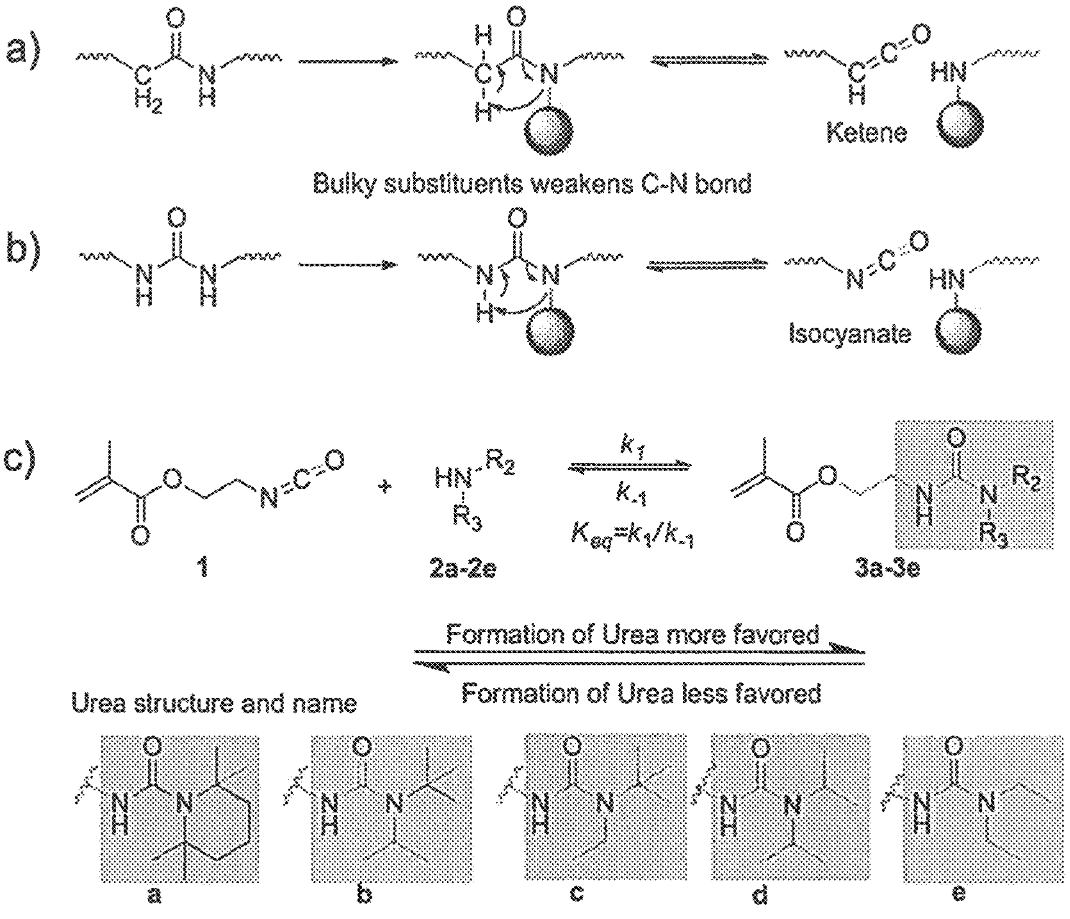
FIG. 1. Bulky substituents weaken the carboxyl-amine bond. (a) Hindered amide bond dissociates into unstable ketene intermediate; (b) hindered urea bond (HUB) dissociates into stable isocyanate, which makes it a dynamic covalent bond; (c) equilibrium between isocyanate, amine and hindered urea. Five urea bonds with decreasing substituents bulkiness were examined: 2,2,6,6-tetramethylpiperidinylcarboxyamide (TMPCA), N-tert-butyl-N-isopropylurea (TBIPU), N-tert-butyl-N-ethylurea (TBEU), N,N-diisopropylurea (DIPU) and N,N-diethylurea (DEU); (d) equilibrium constant or dissociation rate of five urea bonds with different substituents bulkiness in room temperatures or at 37° C. Decreased bulkiness of substituents gives higher binding constants and lower dissociation rates.
Figure 5:
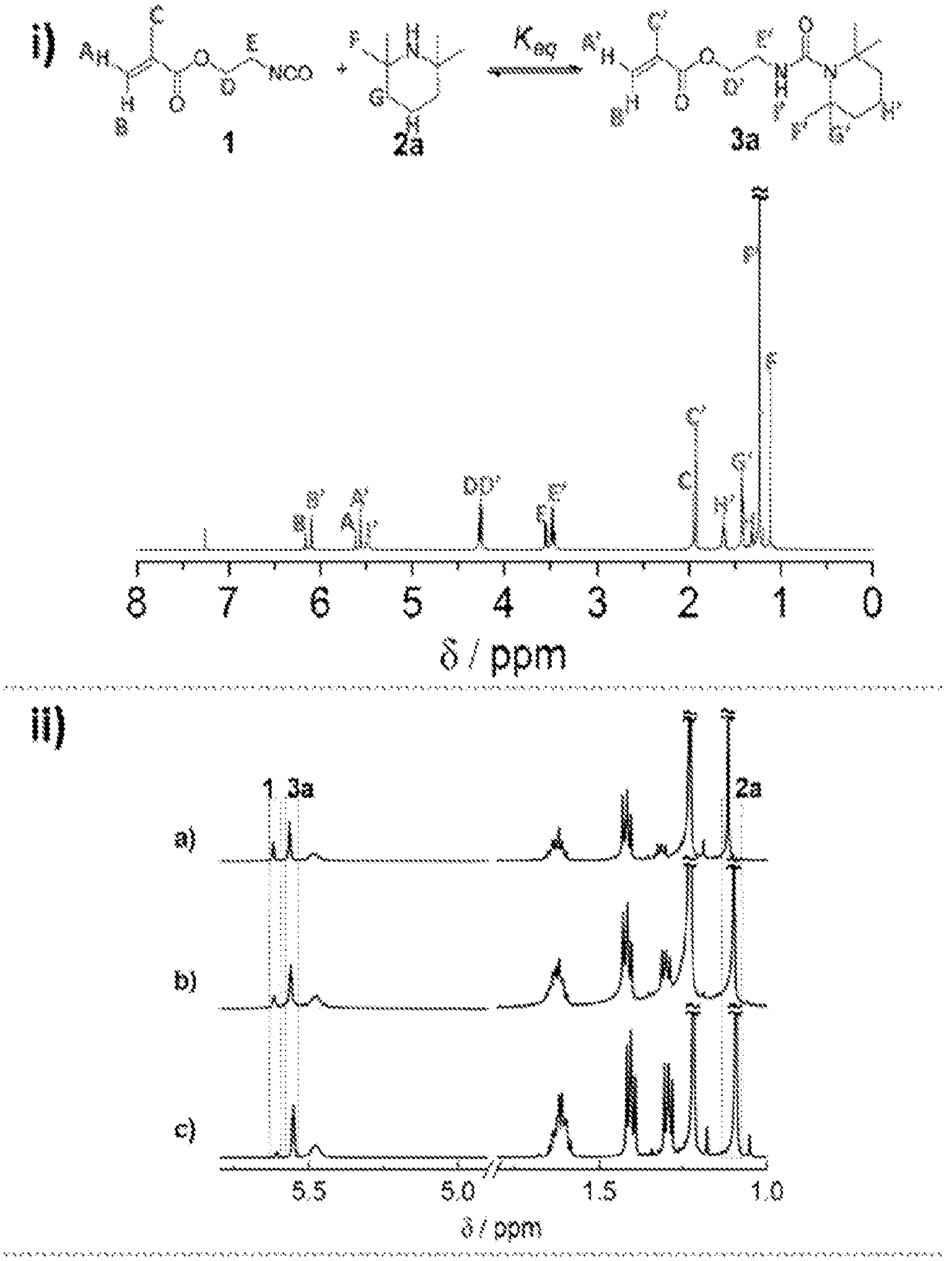
FIG. 5. Thermodynamic equilibrium of TMPCA bond with different initial ratios. i) $^1$H-NMR spectrum of the mixture of compound 1 and 2a at initial ratio of 1.15:1 and the produced compound 3a in $CDCl_3$. Peaks are assigned to each compound. The spectrum was taken 30 min after 1 and 2a were mixed. ii) $^1$H-NMR spectra of 1 and 2a mixture with different initial concentrations at room temperature (see iii for the initial concentrations of 1 and 2a). All spectra showed coexistence of compound 1, 2a and 3a when equilibrium was reached. iii) Concentrations of 1, 2a and 3a with calculated equilibrium constants from each experiment with different initial ratios of 1:2a at room temperature. Different initial ratios of 1:2a gave identical $K_{eq}$ value, demonstrating that the mixture is in thermodynamic equilibrium. The equilibrium concentrations of 1 and 2a and the calculated equilibrium constants did not change once the equilibrium was reached.
Figure 6:
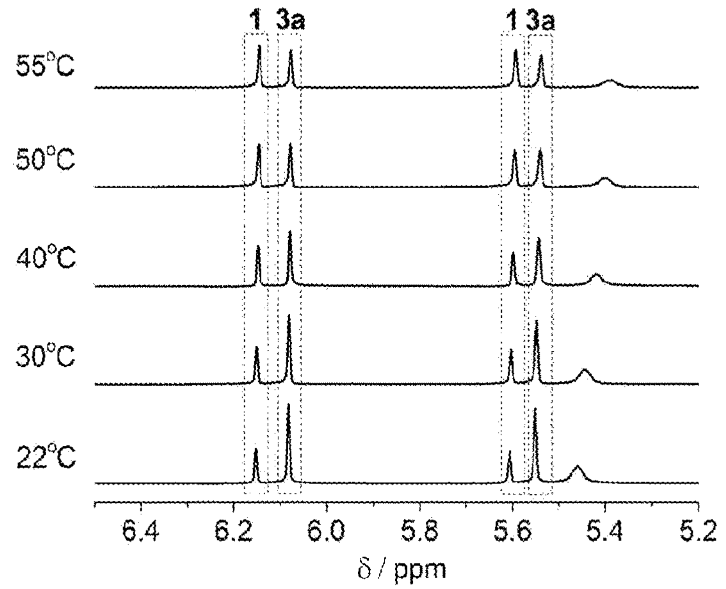
FIG. 6. Thermodynamic equilibrium of TMPCA bond at different temperatures. i) $^1$H-NMR spectra of the mixture of compound 1 and 2a at initial concentration of 0.110 M and 0.107 M, respectively, at different temperatures (see FIG. 5-*i* for complete assignments of peaks). Disassociation is more favored at higher temperature; ii) concentrations of 1, 2a, and 3a with calculated equilibrium constants at different temperatures. Equilibrium constants decrease with the increase of temperature. iii) Plot of linear fitting of the logarithm of equilibrium constant $\ln K_{eq}$ and reciprocal of temperature (1/T). The equilibrium reaction follows Arrhenius' relationship with thermodynamic constant calculated as follows: $\Delta H = -39$ kJ mol$^{-1}$, $\Delta S = -94$ J mol$^{-1}$ K$^{-1}$.
Figure 6:
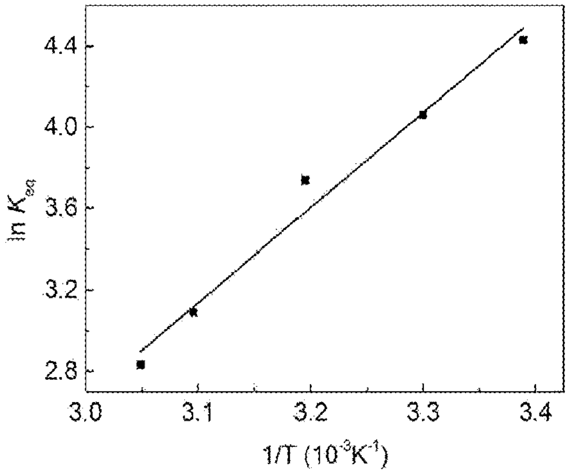

2,2,6,6-Tetramethylpiperidine (2a), a bulky amine containing two tert-butyl equivalent groups, was selected first and mixed with 1 in $CDCl_3$ to synthesize 3a bearing a HUB moiety: 2,2,6,6-tetramethylpiperidinylcarboxyamide (TMPCA) (FIG. 1*c*). As expected, TMPCA is reversible and coexistence of 1, 2a and 3a was observed in $CDCl_3$ by $^1$H-NMR analysis (FIG. 5). They were in thermodynamic equilibrium with a binding constant $K_{eq}$ of 88 $M^{-1}$ at room temperature independent of the concentration of 1 and 2a (FIGS. 5-6). By reducing the substituent bulkiness on the amine and by using N-isopropyl-2-methylpropan-2-amine (2b) to replace 2a, a larger binding constant was obtained ($K_{eq}$ of 3600 $M^{-1}$) as the reversibility of 1-(tert-butyl)-1-isopropylurea (TBIPU). The corresponding HUB is reduced and the reaction is more prone toward the formation of the urea bond. If HUBs with such low $K_{eq}$ values were used in design of polymers via condensation reactions, such polymers would have a low degree of polymerization (DPs) and limited bulk mechanical properties. Thus, 3a and 3b are reversible HUBs, but are not the ideal dynamic bonds to be used for the preparation of dynamic polyureas.

Figure 7:
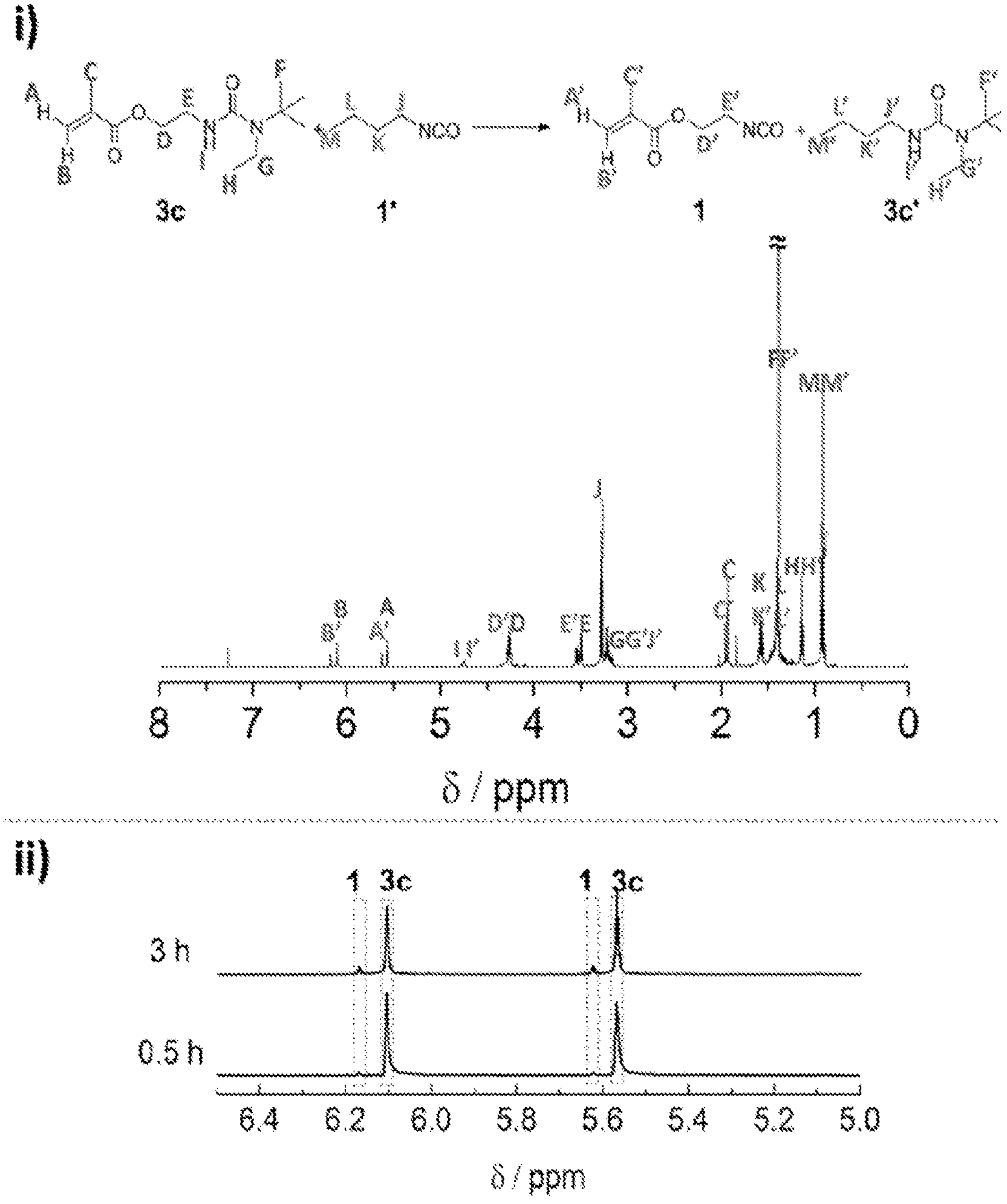
FIG. 7. Dissociation kinetics of TBEU bond. i) $^1$H-NMR spectrum of the mixture of compound 1' and 3c (and the produced compound 1 and 3c') in $CDCl_3$. Peaks are assigned to each compound. The spectrum was taken 48 h after 1' and 3c were mixed. ii) $^1$H-NMR spectra showing exchange reaction between 3c and 1' at room temperature at different times. The generation rate of free isocyanate 1 was used to calculate the disassociation rate of TBEU bond with the following equation.

To get a larger $K_{eq}$, we further reduced the bulkiness of N-substituents on amines and used tert-butyl-ethylamine (2c), diisopropylamine (2d) and diethylamine (2e) to react with 1 to prepare 3c-3e containing the corresponding HUBs (1-(tert-butyl)-1-ethylurea (TBEU), 1,1-diisopropylurea (DIPU) and 1,1-diethylurea (DEU), respectively (FIG. 1*c*). These HUBs with reduced N-substituent sizes have much greater binding constants compared to that of 3a and 3b and their binding constants are too large to be determined by $^1$H-NMR ($K_{eq}>10^7$ $M^{-1}$). Their disassociation constants ($k_{-1}$) were determined through the intermediates trapping experiments (FIGS. 7-9). 3c has the largest $k_{-1}$ among these three HUBs (FIG. 1*c*) with a $k_{-1}$ value of 0.042 $h^{-1}$, while 3d and 3e showed much a smaller $k_{-1}$ even at elevated temperature. Because TBEU has a large $K_{eq}$ ($k_1$) and the largest $k_{-1}$. The specific HUB was verified as a promising dynamic urea bond subject to ambient and catalyst-free bond exchange and dynamic polyurea synthesis.

Figure 2:
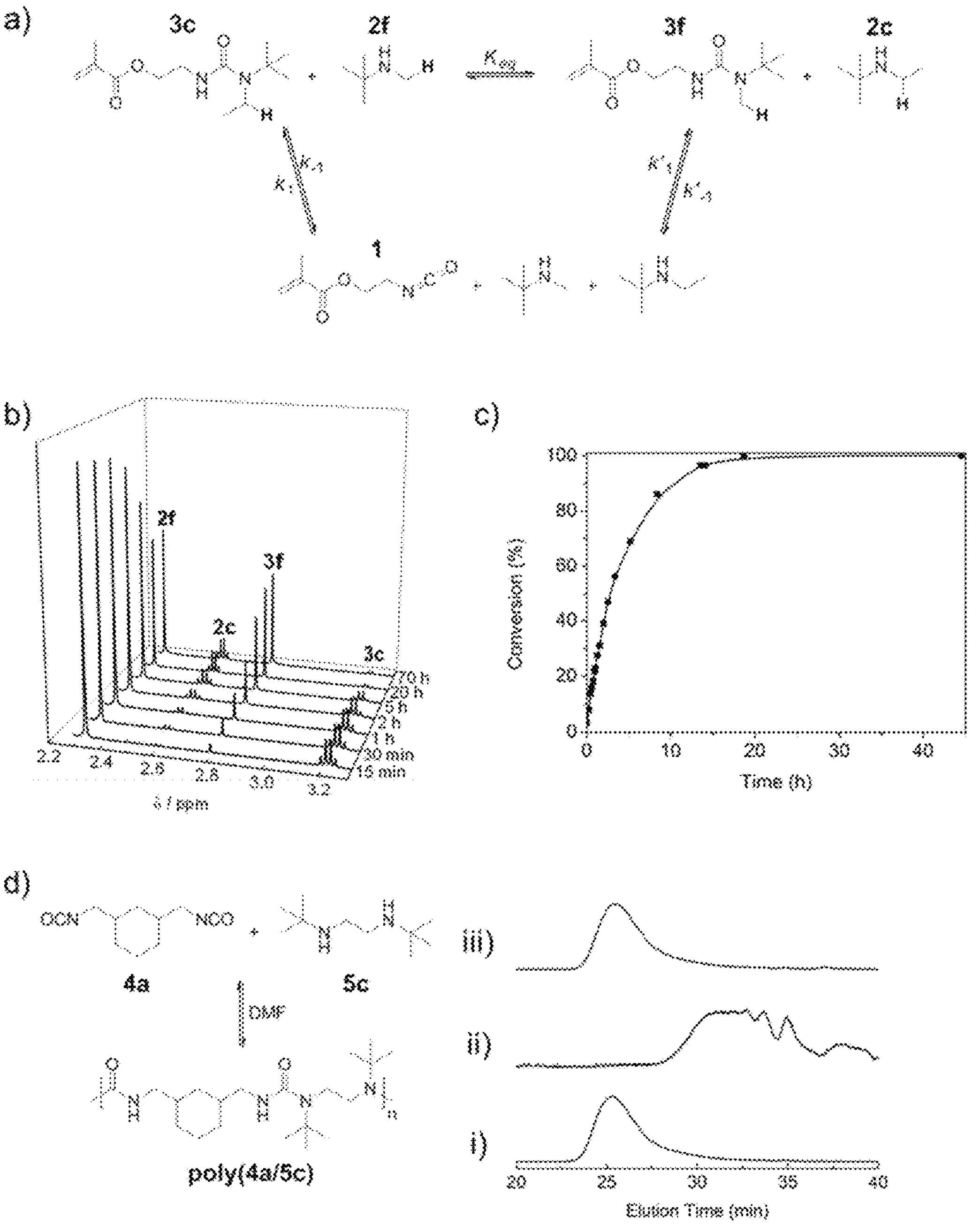
FIG. 2. Dynamic exchange of TBEU in small molecule or polymer. (a) Exchange reaction of mixture of compound 3c and 2f producing compound 3f and 2c with isocyanate 1 as the intermediate; (b) $^1$H-NMR spectra after mixing compound 3c and 2f for different times at 37° C. The peaks for 3c and 2f decrease while the peaks for 3f and 2c increase with time. The peaks reach a plateau after approximately 20 hours, when equilibrium is achieved; (c) plot showing the reaction conversion at different times (reaction conversion=([3c]$_0$-[3c]$_t$)/[3c]$_0$−[3c]$_{eq}$, [3c]$_0$=initial concentration of 3c, [3c]$_t$=concentration of 3c at time t, [3c]$_{eq}$=equilibrium concentration of 3c); (d) Gel permeation chromatography (GPC) curves (from light scattering detector) of dynamic polymer formed between compound 4a and 5c: i) solution with [4a]$_0$:[5c]$_0$=1:1; ii) solution with another molar equivalent of 5c added to i ([4a]$_0$:[5c]$_0$=1:2) and 12 h reaction at 37° C.; iii) solution with another molar equivalent of 4a added to ii (back to [4a]$_0$:[5c]$_0$=1:1). Solution i and iii have the same concentration ([4a]$_0$:[5c]$_0$=1.0 M).

The dynamic exchange of TBEU was studied by mixing 3c with t-butylmethylamine (2f), a compound with very similar N-substituent steric bulkiness as 2c. The ratio change was monitored for each compound in $CDCl_3$ through $^1$H-NMR. Although the concentration of 1, the isocyanate intermediate, was too low to be observed, the t-butylmethyl urea compound 3f and t-butylethyl amine (2c) were produced, substantiating the exchange reaction through isocyanate intermediate 1 (FIG. 2*a*). As shown in FIG. 2*b*, the concentration of compound 3f and 2c increased over the time while the concentration of compound 3c and 2f decreased until equilibrated. Linear fitting analysis of reaction kinetics showed the reversible exchange mechanism of these species. (See Example 4 and FIG. 10.) The time for reaching complete equilibrium was about 20 h at about 37° C., and the disassociation rate was about 0.21 $h^{-1}$ ($t_{1/2}$=3.3 h) (FIG. 2*c*). This experiment demonstrated the dynamic urea bond exchange in compounds containing the TBEU moiety.

The dynamic behavior of TBEU in polymer was demonstrated by mixing 1,3-bis(isocyanatomethyl)cyclohexane (4a) and N,N'-di-tert-butylethylenediamine (5c, a bisfunctional analogue of 2c) in 1:1 stoichiometry at a $[4a]_0$ (or $[5c]_0$) concentration of 1.0 M in DMF solution (FIG. 2*d*). Poly(4a/5c) was formed with an $M_n$ of $1.7\times10^4$ g/mol as shown by the analysis of gel permeation chromatography (GPC) (curve i, FIG. 2*d*). Adding another equivalence of 5c resulted in complete degradation of the polymer to small molecules within 12 h at 37° C. (curve ii, FIG. 2*d*). When an additional equivalence of compound 4a was added to the reaction solution to make 4a:5c ratio back to 1:1 (DMF was also added to keep $[4a]_0$ (or $[5c]_0$) 1.0 M), poly(4a/5c) was reformed with exactly the same molecular weight as the original poly(4a/5c) (curve iii vs. i, FIG. 2*d*). In another experiment, poly(4a/5c) of two distinctly different molecular weights ($M_n1=13.0\times10^3$ g/mol, $M_{n2}=2.8\times10^3$ g/mol) were mixed in DMF solutions. After stirring for 12 h at 37° C., the GPC curve of the polymer merged into a monomodal peak with a molecular weight between those of the two parental poly(4a/5c)s ($M_n=4.8\times10^3$ g/mol, FIG. 11). These experiments demonstrated that the TBEU bond is in fast dynamic exchange in polymer. As control studies, 4a was also mixed with other diamines with different bulkiness in stoichiometry. More bulky bis(2,2,6,6-tetramethyl-4-piperidyl) sebacate (5a, a bisfunctional analog of 2a) cannot form high molecular weight polymer with 4a because of the low $K_{eq}$ (FIG. 12). Less bulky N,N'-diisopropylethylenediamine (5d, a bisfunctional analogue of 2d) can form high molecular weight polymer (poly(4a/5d)) with 4a. Poly(4a/5d) showed non-detectable dynamic bond exchange under the same conditions (FIG. 13).

Figure 3:
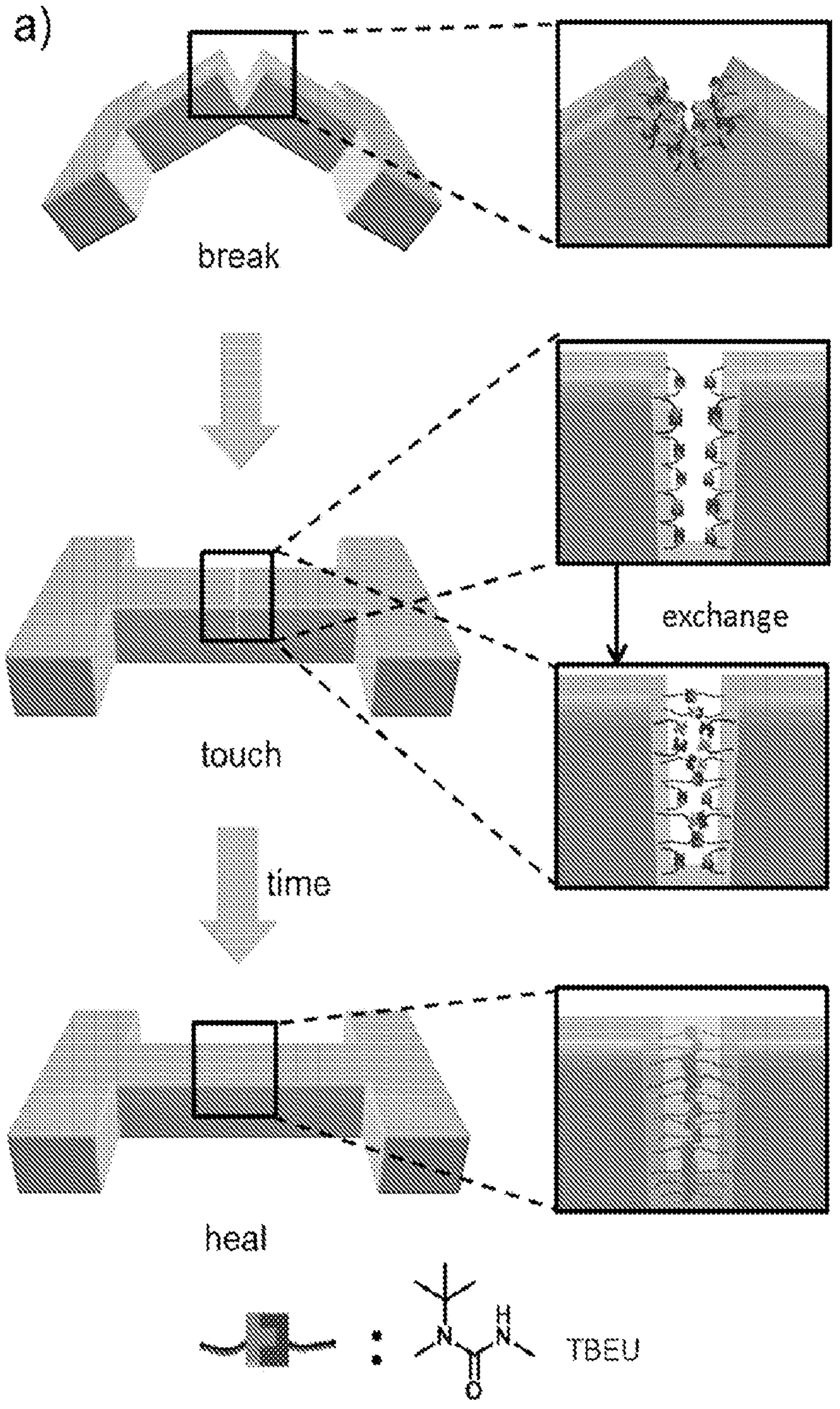
FIG. 3. Design of HUB-based self-healing materials. a) Illustration of self-healing process of TBEU based poly (urethane-urea); b) Structures and ratios of components for synthesis of HUB based cross-linked poly(urethane-urea); c) Pictures of the self-healing process of TBEU based poly (urethane-urea) 6c. The broken gel was gently pressed together and left to heal for 12 hours at 37° C. The gel can then be stretched without breaking at the cut region, showing efficient recovery of mechanical property at the cut site. The arrows point out the positions of the original cuts.
Figure 3B:
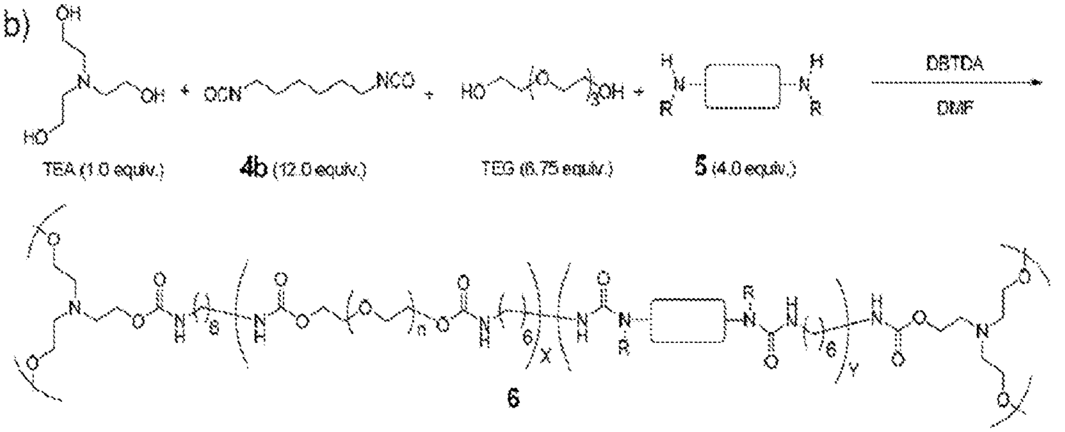
Figure 3B:
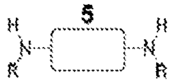
Figure 3B:
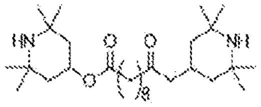
Figure 3B:
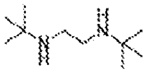
Figure 3B:

After identifying the dynamic exchange feature of TBEU, the specific HUB was used in the design of self-healing materials and the TBEU associated dynamic chemistry used for fast, catalyst-free, room-temperature materials self-repairing (FIG. 3*a*). To demonstrate the HUB-based reversible polymer in real application, a cross-linked polyurethane/urea containing HUB was formed and tested (FIG. 3*b*). Triethanolamine (TEA) was used as the cross-linker and tetra(ethylene glycol) (TEG) was used as the chain extender. Hindered diamines 5a, 5c and 5e form the corresponding HUB motifs (TBEU, TMPCA and DEU) in the final polymer 6a, 6c and 6e, respectively. TEA, TEG and diamine were allowed to react with hexamethylene diisocyanate (4b) in DMF solution with dibutyltin diacetate (DBTDA) as the catalyst and yielded cross-linked poly(urethane-urea) (12). The molar ratio of TEA/4b/TEG/5 was set at 1:12:6.8:4 for the synthesis of the self-healing material. The hydroxyl and amine groups were in excess of the isocyanate groups. This design can improve the materials stability to moisture by increasing the free amine concentration (see detailed analysis in Example 6 and FIGS. 14 and 15).

Figure 4A:
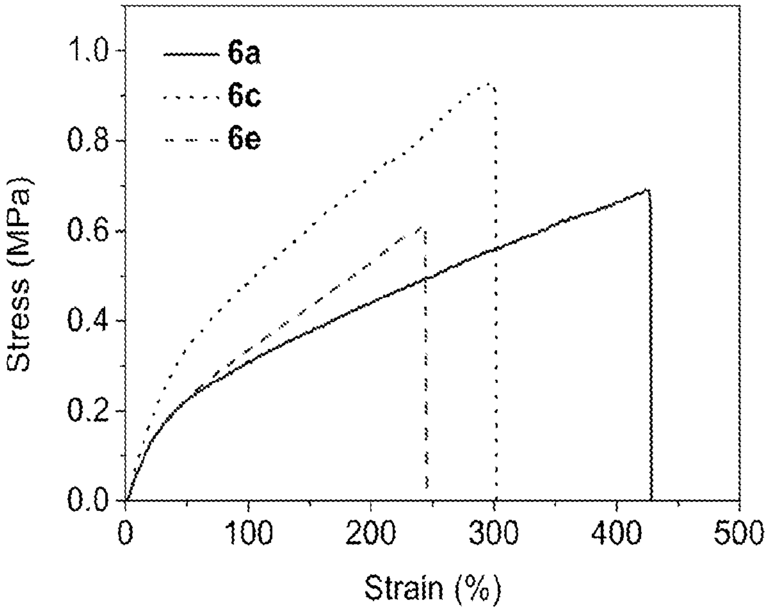
FIG. 4. Mechanical characterization of HUB based cross-linked poly (urethane-urea). (a) Stress-strain curves of 6a, 6c and 6e; (b) creep-recovery of 6a, 6c and 6e with initial strain of 50%; (c) recovery of breaking strain of sample 6c with variant healing times. The breaking strain of the cut can be efficiently healed within 12 h; (d) low recovery of breaking strain of sample 6e for different healing time.

All three samples were shown as elastic rubber (FIG. 4*a*) with subambient glass transition temperatures ($T_g$, see FIG. 16), which provide sufficient chain mobility for bond exchange. As summarized in Table 1, all samples had a Young's modulus of about 1 MPa, which was comparable to classical rubbers.

Figure 4B:
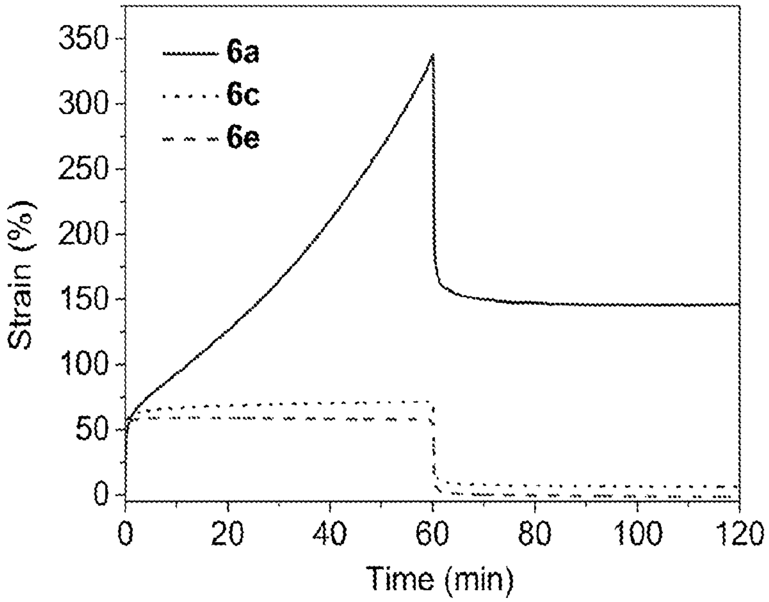

The creep-recovery behaviors were determined to further understand the elastomeric property of these three samples (FIG. 4*b*). 6a showed completely different behavior from 6c and 6e. A stress of 0.08 MPa was applied to 6a and was maintained for 60 minutes. The rubber started with about 50% strain, yielding to about 350% after 60 minutes (with strain increase of 6.3% per minute). After the stress was released, the rubber could not return to its original length and had a residual strain as high as about 150% (FIG. 4*b*). This phenomenon could be explained by the weak strength of the TMPCA bond in 6a, which makes the material behave more like a physically cross-linked rubber that yields upon stretching. For 6e under the same conditions, the strain increase very slowly. After stress was released, the rubber could recover its original dimension with negligible residual strain (FIG. 4*b*). This experiment demonstrated the strong binding and long lifetime of DEU bond in 6e. Compared to 6e, 6c showed a slightly elected strain increase (0.09% per minute) and residual strain (6%) (FIG. 4*b*), both of which were much smaller than those of 6a. This experiment showed that with chain exchange for self-healing, 6c was still strong enough for keeping satisfactory dimensional stability under the external stress.

The self-healing behavior was tested for the three polyurethane rubbers containing HUB moieties. The polymer was cured in a dog-bone shaped mold and cut with a razor. The two pieces were gently contacted and left in a 37° C. environment for healing without the protection of inert gas. TMPCA-based 6a showed very dynamic behavior because of the highly reversible urea bond. After compressing the two cut pieces by hands for only 5 minutes at room temperature, substantial reconnection and recovery of mechanical properties occurred. Complete recovery of breaking strain was difficult to achieve due to the high moisture sensitivity of 6a, or due to the high concentration of free isocyanate because of the small $K_{eq}$ of TMPCA, see FIG. 1*d*.

The rubber 6a was initially transparent, but became turbid after being under ambient condition for several hours, suggesting substantial material property change due primarily to hydrolysis of isocyanate groups. The surfaces of the cut pieces subject to healing are potentially more exposed to the moisture in air, which could result in more severe, irreversible hydrolysis and material degradation than other non-exposed regions, which deleteriously affects the healing of 6a (FIG. 17).

Figure 3C:
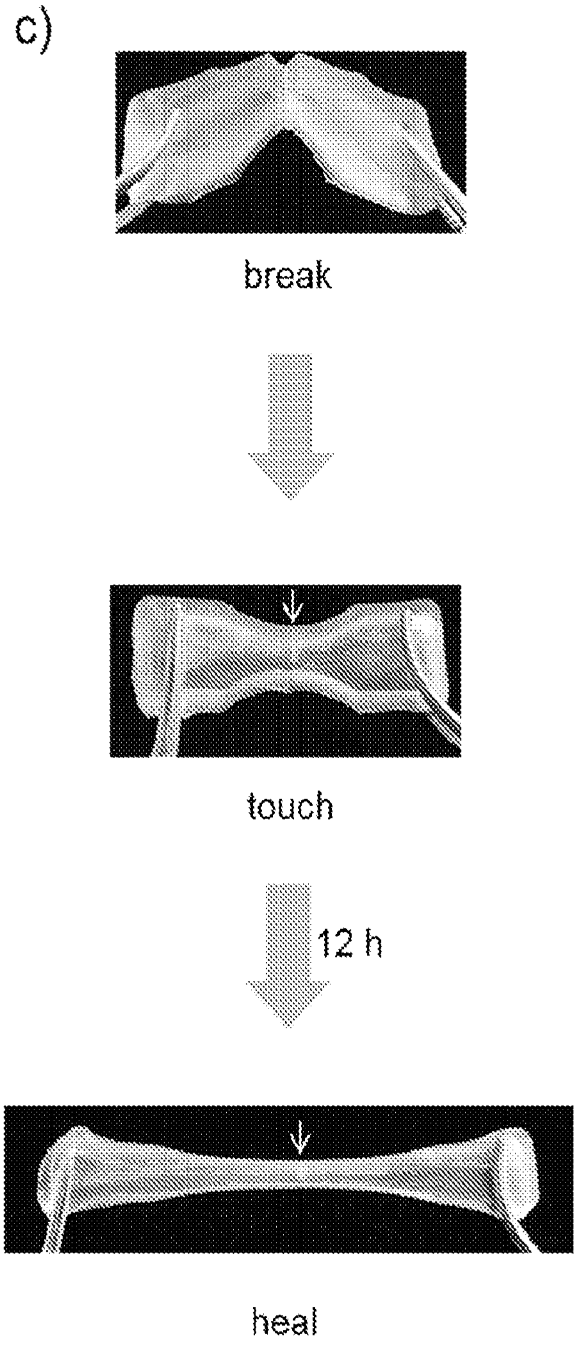

On the other hand, 6e has much less dynamic urea bonds and showed much lower healing capability. After a dog-bone shaped 6e was cut and allowed to heal for 40 hours, only 30% of the original breaking strain was recovered, which did not improve upon further extended curing (FIG. 4*d*). Stretching of the cured 6e resulted in fracture of the materials at the cut site. TBEU-based 6c balanced the dynamicity, which showed very efficient self-healing behavior (FIG. 3*c*).

TABLE 1

Physical properties of cross-linked polyurethane with different dynamic urea bonds.

| | | | Before Cutting | | After Cutting | | Breaking |
|---|---|---|---|---|---|---|---|
| | Tg (C. °) | Young's Modulus (MPa) | Breaking Stress (MPa) | Breaking strain (%) | Breaking Stress (MPa) | Breaking strain (%) | strain recovery (%) |
| 6a | −49 | 0.87 ± 0.04 | 0.69 ± 0.05 | 462 ± 20 | — | — | — |
| 6c | −52 | 1.22 ± 0.12 | 0.93 ± 0.06 | 301 ± 12 | 0.71 ± 0.05 | 268 ± 13 | 87 ± 4 |
| 6e | −78 | 0.87 ± 0.20 | 0.62 ± 0.02 | 243 ± 21 | 0.32 ± 0.08 | 68 ± 4 | 29 ± 2 |

Figure 4C:
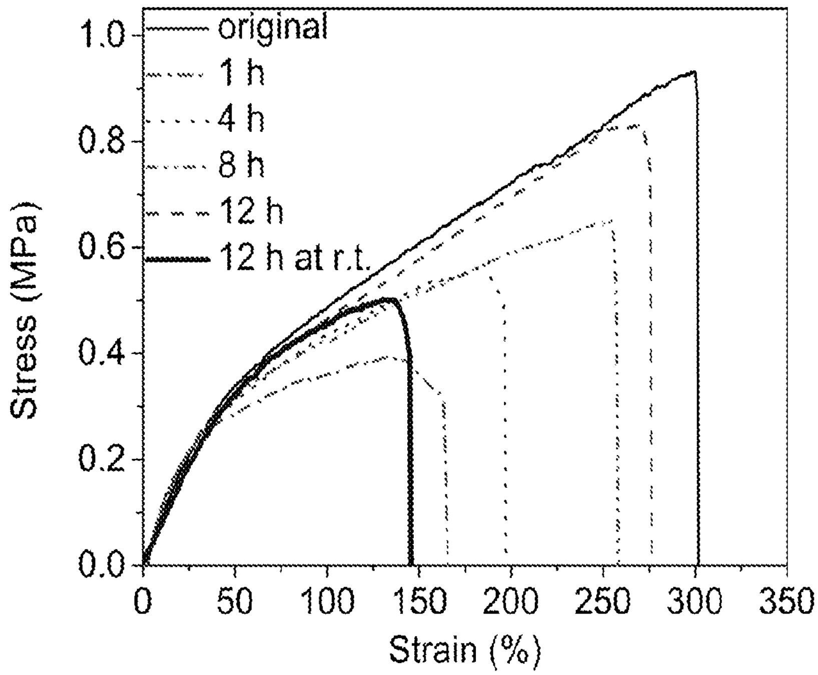
Figure 4D:
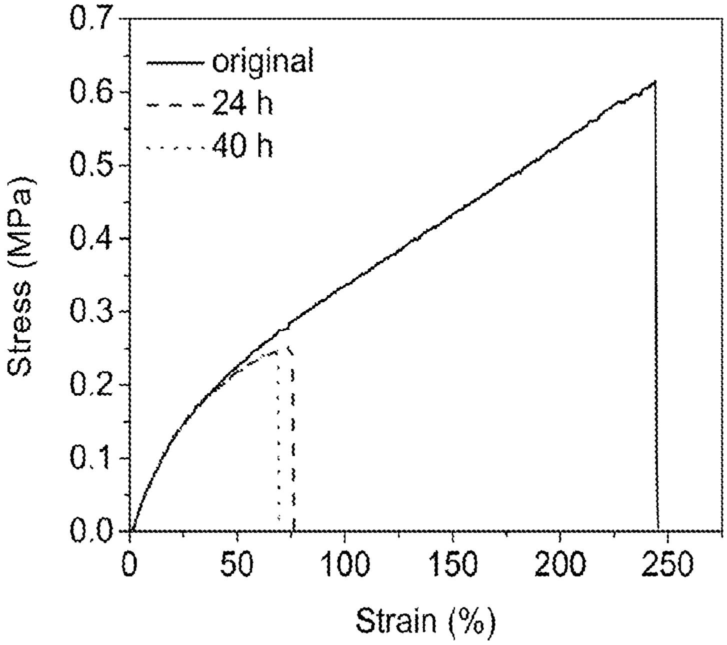

A breaking strain of 50% was recovered within about 1 hour, and longer curing time led to improved self-repairing and increased breaking strains (FIG. 4*c*). After 12 hours, the extensibility of the cured 6c had recovered for 87%, and the sample did not always fracture at the cutting positions upon stretching. To test the self-healing efficiency in materials with better mechanical properties, we also tried to synthesize 6c with solvent removed by vacuum oven after curing (6c', see Example 1). Material with higher modulus, breaking strain was obtained, and complete recovery of breaking strain can still be achieved after cutting, although longer healing time may be used (see FIG. 18).

Our results showed that by incorporating bulky substituents to nitrogen atoms, hindered urea bond (HUB) behaved as a highly reversible dynamic covalent bond. The bulkiness of substituents determines the reversibility of HUB, with more bulky group giving more dynamic bond (smaller $K_{eq}$ and larger $k_{-1}$). Among the series of HUBs, N-tert-butyl-N-ethylurea (TBEU) bond was identified as effective for room-temperature reversible polymers because it has both large $K_{eq}$ and $k_{-1}$ under mild condition. Polymer chain reshuffling was observed for a linear polyurea based on TBEU. As a proof of concept of HUB applications, the TBEU moiety was incorporated into a cross-linked polyurethane/urea to obtain a catalyst-free, room temperature self-healing rubber with good mechanical strength, dimensional rigidity and chemical stability. HUB can be easily synthesized by isocyanate and hindered amine, both of which are widely used a variety of inexpensive industrial raw materials. The dynamic properties of HUB can be well controlled by the bulkiness of the substituents. It also has a hydrogen-bonding motif inherited from the urea bond to increase the mechanical strength of polymers, which most other dynamic covalent chemistries do not have.

DEFINITIONS

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment," "an embodiment," etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation.

The term "and/or" means any one of the items, any combination of the items, or all of the items with which this term is associated. The phrase "one or more" is readily understood by one of skill in the art, particularly when read in context of its usage. For example, one or more substituents on a phenyl ring refers to one to five, or one to four, for example if the phenyl ring is disubstituted.

The term "about" can refer to a variation of ±5%, ±10%, ±20%, or ±25% of the value specified. For example, "about 50 percent" can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percents, proximate to the recited range that are equivalent in terms of the functionality of the individual ingredient, the composition, or the embodiment.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the disclosure encompasses not only the entire group listed as a whole, but each member of the group individually and all possible subgroups of the main group. Additionally, for all purposes, the disclosure encompasses not only the main group, but also the main group absent one or more of the group members. The disclosure therefore envisages the explicit exclusion of any one or more of members of a recited group. Accordingly, provisos may apply to any disclosed category or embodiment, whereby any one or more of the recited elements, species, or embodiments, may be excluded from such categories or embodiments, for example, as used in an explicit negative limitation.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. The isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups (groups from which a proton can be removed (e.g., —COOH) or added (e.g., amines) or which can be quaternized (e.g., amines)). All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this disclosure for a given application. In specific applications, the selection of a given anion or cation for preparation of a salt may result in increased or decreased solubility of that salt.

Whenever a range is given in the specification, for example, a temperature range, a time range, a carbon chain range, or a composition or concentration range, all intermediate ranges and subranges, as well as all individual values included in the ranges given are intended to be individually included in the disclosure. It will be understood that any sub-ranges or individual values in a range or sub-range included in the description may be optionally excluded from embodiments of the disclosure.

Specific values listed below for radicals, substituents, and ranges, are for illustration only; they do not exclude other defined values or other values within defined ranges for the radicals and substituents. Certain values or ranges of values may be optionally be excluded from certain embodiments in the form of negative limitations.

The compounds described herein have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is R', $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (0), e.g., RC(O)O— wherein R is as defined in connection with the term "acyl."

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group includes both alkenyl and alkynyl groups. The alkyl can be a monovalent hydrocarbon radical, as described and exemplified above, or it can be a divalent hydrocarbon radical (i.e., an alkylene). In some embodiments, "alkyl" refers to a fully saturated alkyl. In other embodiments, "alkyl" is branched or unbranched, and is non-cyclic.

The term "alkenyl" as used herein describes groups which are preferably lower alkenyl containing from two to eight carbon atoms in the principal chain and up to 20 carbon atoms. They may be straight or branched chain and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below. The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted, as described for alkyl groups.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties optionally substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

Generally, the term "substituted" indicates that one or more hydrogen atoms on the group indicated in the expression using "substituted" is replaced with a "substituent". The number referred to by 'one or more' can be apparent from the moiety one which the substituents reside. For example, one or more can refer to, e.g., 1, 2, 3, 4, 5, or 6; in some embodiments 1, 2, or 3; and in other embodiments 1 or 2. The substituent can be one of a selection of indicated groups, or it can be a suitable group known to those of skill in the art, provided that the substituted atom's normal valency is not exceeded, and that the substitution results in a stable compound. Suitable substituent groups include, e.g., alkyl, alkenyl, alkynyl, alkoxy, halo, haloalkyl, hydroxy, hydroxyalkyl, aryl, aroyl, (aryl)alkyl (e.g., benzyl or phenylethyl), heteroaryl, heterocycle, cycloalkyl, alkanoyl, alkoxycarbonyl, amino, alkylamino, dialkylamino, trifluoromethyl, trifluoromethoxy, trifluoromethylthio, difluoromethyl, acylamino, nitro, carboxy, carboxyalkyl, keto, thioxo, alkylthio, alkylsulfinyl, alkylsulfonyl, arylsulfinyl, arylsulfonyl, heteroarylsulfinyl, heteroarylsulfonyl, heterocyclesulfinyl, heterocyclesulfonyl, phosphate, sulfate, hydroxyl amine, hydroxyl (alkyl)amine, and cyano. Additionally, suitable substituent groups can be, e.g., —X, —R, —O—, —OR, —SR, —S—, $—NR_2$, $—NR_3$, =NR, $—CX_3$, —CN, —OCN, —SCN, —N=C=O, —NCS, —NO, $—NO_2$, $=N_2$, $—N_3$, —NC(=O)R, —C(=O)R, —C(=O)NRR, $—S(=O)_2O—$, $—S(=O)_2OH$, $—S(=O)_2R$, $—OS(=O)_2OR$, $—S(=O)_2NR$, —S(=O)R, $—OP(=O)(OR)_2$, $—P(=O)(OR)_2$, —OP(=O)(OH)(OR), —P(=O)(OH)(OR), $—P(=O)(O—)_2$, $—P(=O)(OH)_2$, —C(=O)R, —C(=O)X, —C(S)R, —C(O)OR, —C(O)O—, —C(S)OR, —C(O)SR, —C(S)SR, —C(O)NRR, —C(S)NRR, or —C(NR)NRR, where each X is independently a halogen ("halo"): F, Cl, Br, or I; and each R is independently H, alkyl, aryl, (aryl)alkyl (e.g., benzyl), heteroaryl, (heteroaryl) alkyl, heterocycle, heterocycle(alkyl), or a protecting group. As would be readily understood by one skilled in the art, when a substituent is keto (=O) or thioxo (=S), or the like, then two hydrogen atoms on the substituted atom are replaced. In some embodiments, one or more of the substituents above are excluded from the group of potential values for substituents on the substituted group.

The term "interrupted" indicates that another group is inserted between two adjacent carbon atoms (and the hydrogen atoms to which they are attached (e.g., methyl ($CH_3$), methylene ($CH_2$) or methine (CH))) of a particular carbon chain being referred to in the expression using the term "interrupted, provided that each of the indicated atom's normal valency is not exceeded, and that the interruption results in a stable compound. Suitable groups that can interrupt a carbon chain include, e.g., with one or more non-peroxide oxy (—O—), thio (—S—), imino (—N(H)—), methylene dioxy ($—OCH_2O—$), carbonyl (—C(=O)—), carboxy (—C(=O)O—), carbonyldioxy (—OC(=O)O—), carboxylato (—OC(=O)—), imine (C=NH), sulfinyl (SO) and sulfonyl ($SO_2$). Alkyl groups can be interrupted by one or more (e.g., 1, 2, 3, 4, 5, or about 6) of the aforementioned suitable groups. The site of interruption can also be between a carbon atom of an alkyl group and a carbon atom to which the alkyl group is attached. An alkyl group that is interrupted by a heteroatom therefor forms a heteroalkyl group.

Substituents can include cycloalkylalkyl groups. "Cycloalkylalkyl" may be defined as a cycloalkyl-alkyl-group in which the cycloalkyl and alkyl moieties are as previously described. Exemplary monocycloalkylalkyl groups include cyclopropylmethyl, cyclopentylmethyl, cyclohexylmethyl and cycloheptylmethyl.

As used herein, "bulky" refers to a group or substituent having steric hindrance, especially where the bulky group provides dynamic exchange within a polymer, as described herein. The term "bulky" may be applied to an alkyl, aryl, amino, or other group. Exemplary "bulky alkyl" groups include, but are not limited to, isopropyl, tert-butyl, and neopentyl. Exemplary "bulky aryl" groups include trityl, biphenyl, naphthyl, indenyl, anthracyl, fluorenyl, azulenyl, phenanthrenyl, and pyrenyl. Exemplary "bulky amine" groups include, but are not limited to, tertiary amines substituted with one or more bulky alkyl or bulky aryl group, such as two tert-butyl groups. Exemplary "bulky amide" groups include, but are not limited to, carbonyl groups coupled to a bulky amine.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount a reagent effective to bring about a recited effect, such as a chemical reaction. The term "effective amount" is intended to include an amount of a compound described herein, or an amount of a combination of compounds described herein, greater than the minimum amount of the agent to bring about a desired effect.

The term "reversible polymer" refers to a polymer with blocks or repeating units containing non-covalent or dynamic covalent bond that can reversibly form and dissociate.

"Highly reversible" refers to the property of a reversible polymer where dissociation and association are fast (dissociation rate>1 $day^{-1}$) and the lifetime of reversible bonding is short (<1 day).

With respect to the polymers described herein, "self-healing" refers to the property of a reversible polymer that autonomously repair damage caused by mechanical usage over time and recover substantially original modulus and strength.

EXAMPLES

The following examples are intended to illustrate the above disclosure and should not be construed as to narrow its scope. One skilled in the art will readily recognize that the examples suggest many other ways in which the disclosure could be practiced. It should be understood that numerous variations and modifications may be made while remaining within the scope of the disclosure.

Materials. 2-Isocyanatoethyl methacrylate was purchased from TCI America (Portland, Oreg., USA) and used as received. Anhydrous dimethylformamide (DMF) was dried by a column packed with 4 Å molecular sieves. Tetrahydrofuran (THF) was dried by a column packed with alumina. All other chemicals were purchased from Sigma-Aldrich (St. Louis, Mo., USA) and used as received unless otherwise specified.

Instrumentation. NMR spectra were recorded on a Varian U400 (400 MHz), a U500 (500 MHz) a VXR-500 (500 MHz), or a UI600 (600 MHz) spectrometer. Gel permeation chromatography (GPC) experiments were performed on a system equipped with an isocratic pump (Model 1100, Agilent Technology, Santa Clara, Calif., USA), a DAWN HELEOS multi-angle laser light scattering detector (MALLS detector, Wyatt Technology, Santa Barbara, Calif., USA) or an Optilab rEX refractive index detector (Wyatt Technology, Santa Barbara, Calif., USA). The detection wavelength of HELEOS was set at 658 nm. The separations were performed using serially connected size exclusion columns (100 Å, 500 Å, $10^3$ Å and $10^4$ Å Phenogel columns, 5 μm, 300×7.8 mm, Phenomenex, Torrance, Calif., USA) at 60° C. using DMF containing 0.1 M LiBr as the mobile phase. Creep-recovery experiments were performed on DMA Q800 (TA instruments, New Castle, Del., USA). Stress-strain experiments were performed on a bidirectional screw driven rail table assembled by IMAC Motion Control Group (Elgin, Ill., USA) with translation stage from Lintech (Monrovia, Calif., USA), motor from Kollmorgen (Radford, Va., USA), and load cell from Honeywell Sensotech (Columbus, Ohio, USA). Glass transition temperatures were tested by differential scanning calorimetry (DSC, Model 821e, Mettler Toledo, Columbus, Ohio, USA).

Example 1

Preparation of Self-Healing Materials 6a, 6c and 6e

Synthesis of 6a. In a typical run, hexamethylene diisocyanate (HDI) (1.280 g, 7.6 mmol) and DMF (0.380 g, 15% weight ratio) were charged in a glass vial and cooled to 4° C. Diamine 5a (1.220 g, 2.54 mmol) was slowly added to form oligourea. After cooling to room temperature, triethylamine (TEA, 0.094 g, 0.63 mmol) and tetra(ethylene glycol) (TEG, 0.829 g, 4.27 mmol) were added and the solution was vigorously homogenized. Then the pre-polymer was charged to a dog-bone shaped mold and added tin catalyst dibutyltin diacetate (DBTDA) (1 drop, about 10 mg). The polymer was allowed to cure at room temperature for 24 h under an inert gas.

Synthesis of 6c. In a typical run, HDI (1.380 g, 8.2 mmol) and DMF (0.317 g, 15% weight ratio) were charged in a glass vial and cooled to 4° C. Diamine 5c (0.471 g, 2.74 mmol) was slowly added to form oligourea. After cooling to room temperature, TEA (0.102 g, 0.69 mmol) and TEG (0.897 g, 4.62 mmol) were added and the solution was vigorously homogenized. Then the pre-polymer was charged to a dog-bone shaped mold and added tin catalyst DBTDA (1 drop, ~10 mg). The polymer was allowed to cure at room temperature for 12 h and then at 60° C. for another 12 h under the protection of inert gas.

Synthesis of 6c'. In a typical run, HDI (1.380 g, 8.2 mmol) and THF (1.221 g, 30% weight ratio) were charged in a glass vial and cooled to 4° C. Diamine 5c (0.471 g, 2.74 mmol) was slowly added to form oligourea. After cooling to room temperature, TEA (0.102 g, 0.69 mmol) and TEG (0.897 g, 4.62 mmol) were added and the solution was vigorously homogenized. Then the pre-polymer was charged to a dog-bone shaped mold and added tin catalyst DBTDA (1 drop, about 10 mg). The polymer was allowed to cure at room temperature for 12 h. After that, the gel was heated up in the vacuum oven to 60° C. for another 12 h to remove the THF.

Synthesis of 6e. In a typical run, HDI (1.450 g, 8.6 mmol) and DMF (0.707 g, 30% weight ratio) were charged in a glass vial and cooled to 4° C. Diamine 5e (0.330 g, 2.84 mmol) was slowly added to form oligourea. After cooling to room temperature, TEA (0.107 g, 0.72 mmol) and TEG (0.939 g, 4.84 mmol) were added and the solution was vigorously homogenized. Then the pre-polymer was charged to a dog-bone shaped mold and added tin catalyst DBTDA (1 drop, about 10 mg). The polymer was allowed to cure at room temperature for 12 h and then at 60° C. for another 12 h under the protection of inert gas.

Example 2

Equilibrium of the TMPCA Bond

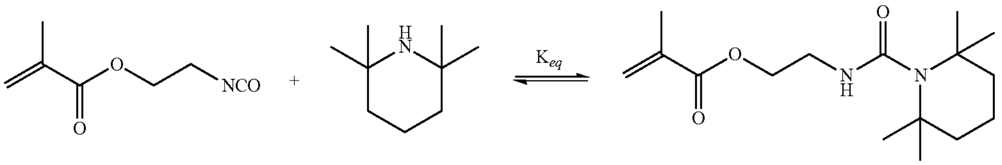

1 2a 3a

Equilibrium constants with different initial ratios of amine and isocyanate: 2-Isocyanatoethyl methacrylate (1) and 2,2,6,6-tetramethylpiperidine (2a) were dissolved in $CDCl_3$ (0.5 mL) with three different ratios and added to the NMR tubes (FIG. 5). $^1$H-NMR spectra were collected after 0.5 h reaction time for reaching equilibrium (FIG. 5) at room temperature. Concentration of each species was calculated based on the integral ratios of the $^1$H-NMR signals and the initial concentrations of 1 and 2a. The equilibrium constants were calculated as $K_{eq}=[3a]_{eq}/([1]_{eq}\cdot[2a]_{eq})$.

Equilibrium constants at different temperatures: 2-Isocyanatoethyl methacrylate (1, 8.5 mg, 0.055 mmol) and 2,2,6,6-tetramethylpiperidine (2a, 7.5 mg, 0.054 mmol) were dissolved in $CDCl_3$ and added to the NMR tubes. $^1$H NMR spectra were collected at different temperatures (FIG. 6). The concentration of each species was calculated according to the integral ratios of $^1$H NMR signals and the initial concentration of 1 and 2a. The equilibrium constants were calculated as $K_{eq}=[3a]_{eq}/([1]_{eq}\cdot[2a]_{eq})$.

Example 3

Disassociation Kinetics of Hindered Urea Bonds

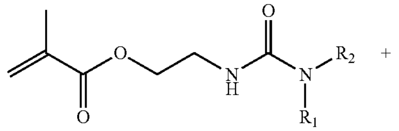

3c: $R_1$ = t-Bu, $R_2$ = Et
3d: $R_1$ = $R_2$ = i-Pr
3e: $R_1$ = $R_2$ = Et

-continued

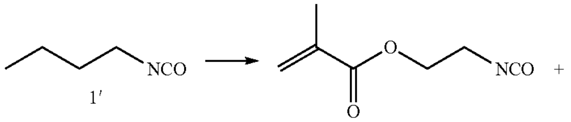

1′ 1

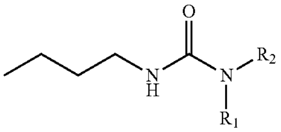

3c′: $R_1$ = t-Bu, $R_2$ = Et
3d′: $R_1$ = $R_2$ = i-Pr
3e′: $R_1$ = $R_2$ = Et

The disassociation kinetics of TBEU, DIPU and EEU were tested. Urea compound 3c, 3d, 3e were simply synthesized by mixing isocyanate 1 with relative hindered amine 2c, 2d, 2e in equal molar in $CDCl_3$. Then butyl isocyanate (compound 1') was added to capture the released free amine. The production rates of captured urea product 3c', 3d', 3e' (or released free isocyanate 1) were monitored with $^1$H NMR at room temperature or higher temperature as the disassociation kinetics of urea compound 3c, 3d, 3e. See FIGS. 7-9.

Example 4

Kinetics Study of Dynamic Exchange of TBEU Bonds

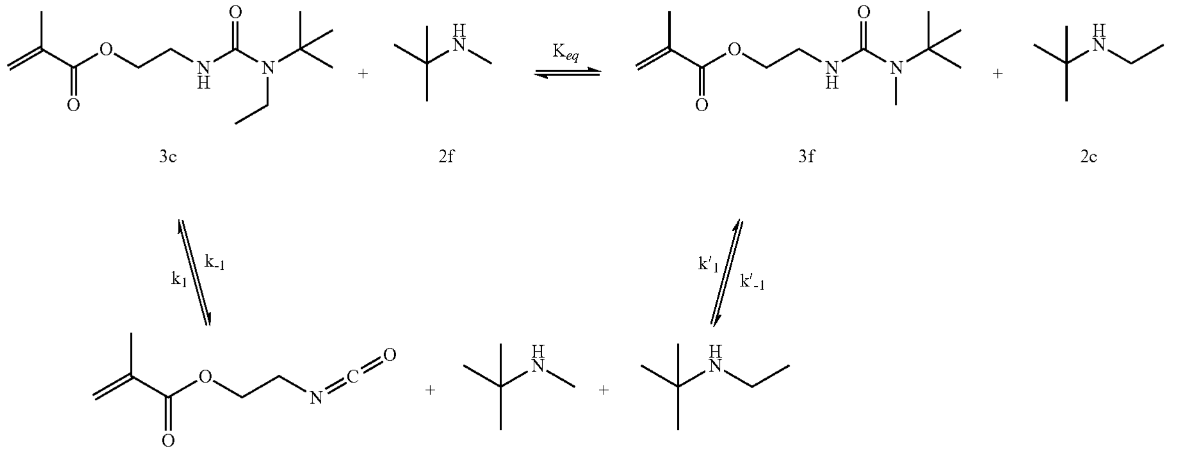

3c 2f 3f 2c

1

The dynamic exchange of TBEU with tert-butylmethylamine was studied. Urea compound 3c (11.3 mg, 0.044 mmol) and tert-butylmethylamine 2f (8.8 mg, 0.102 mmol) were mixed in $CDCl_3$ (0.5 mL), quickly transferred to NMR instrument and heated up to 37° C. $^1$H NMR spectra were collected at certain time intervals until chemical equilibrium was reached. Kinetic analysis was provided to prove the proposed mechanism: ($[M]_0$: initial concentration, $[M]_{eq}$: equilibrium concentration).

Kinetic analysis of the equilibrium mechanism. If the exchange reaction works through the proposed mechanism, then we have:

$$-\frac{d[3c]}{dt} = -\frac{d[2f]}{dt} = k_{-1}[3c] - k_1[1][2c]$$

Here, concentration of isocyanate intermediate 1 can be regarded as constant, so we have:

$$[1] = [1]_{eq} = \frac{k_{-1}}{k_1} \times \frac{[3c]_{eq}}{[2c]_{eq}}$$

Then, $$-\frac{d[3c]}{dt} = k_{-1}[3c] - k_{-1} \times \frac{[3c]_{eq}}{[2c]_{eq}} \times [2c]$$

-continued

Since $$[2c] = [3c]_0 - [3c],$$

$$-\frac{d[3c]}{dt} = k_{-1}[3c] - k_{-1} \times \frac{[3c]_{eq}}{[2c]_{eq}} \times ([3c]_0 - [3c]) = k_{-1} \times \left(1 + \frac{[3c]_{eq}}{[2c]_{eq}}\right) \times [3c] - k_{-1} \times \frac{[3c]_{eq}}{[2c]_{eq}} \times [3c]_0$$

Solve the differential equation, we have:

$$[3c] = [3c]_0 \times \frac{[2c]_{eq}}{[3c]_{eq} + [2c]_{eq}} e^{-k_{-1}\frac{[3c]_{eq}+[2c]_{eq}}{[2c]_{eq}} \times t} + [3c]_0 \times \frac{[3c]_{eq}}{[3c]_{eq} + [2c]_{eq}}$$

$$\ln\left(\frac{[3c]}{[3c]_0} - A\right) = -\frac{1}{1-A}k_{-1}t + \ln A$$

Here, $$A = \frac{[3c]_{eq}}{[3c]_{eq} + [2c]_{eq}}.$$

We found a very good linear fitting of $$\ln\left(\frac{[3c]}{[3c]_0} - A\right)$$

and t ($R^2$=0.998), and from the slope we got the disassociation rate of TBEU bond ($L_1$) as 0.21 $h^{-1}$ (FIG. 10).

Example 5

Dynamic Property of Hindered Urea Polymers

TBEU polymer (poly(4a/5c)): 1,3-Bis(isocyanatomethyl) cyclohexane (4a, 437 mg, 2.25 mmol) and N,N'-di-tert-butylethylene-diamine (5c, 387 mg, 2.25 mmol) in equal molar were dissolved in DMF (2.00 mL). The mixture was stirred at 37° C. vigorously. After 2 h, the sample was tested by GPC for the formation of polymer. Then the mixture was added another equivalence of compound 5c (378 mg, 2.20 mmol) and DMF (0.90 mL), and reacted for 20 h and then sent for another GPC test for the degradation of polymer. Finally the mixture was added another molar equivalence of compound 4a (427 mg, 2.20 mmol) and DMF (1.05 mL), and lasted for another 2 h. GPC was tested again monitoring the recovery of polymer structure.

In another experiment, two batches of poly(4a/5c) were synthesized. Poly(4a/5c)–1 was synthesized by mixing 4a (338 mg, 1.74 mmol) and 5c (299 mg, 1.74 mmol) in DMF (1.5 mL) and poly(4a/5c)–2 was synthesized by mixing 4a (338 mg, 1.74 mmol) and 5c (337 mg, 1.96 mmol) in DMF (1.5 mL). Solutions of poly(4a/5c)–1 and poly(4a/5c)–2 were mixed in same volume (500 μL each) and stirred at 37° C. vigorously. After 12 h, the mixture was tested by GPC to illustrate the polymer chain reshuffling.

TMPCA polymer (poly(4a/5a)): 1,3-Bis(isocyanatomethyl)cyclohexane (4a, 152 mg, 0.78 mmol) and bis(2,2,6,6-tetramethyl-4-piperidyl) sebacate (5a, 376 mg, 0.78 mmol) in equaimolar amounts were dissolved in DMF (1.00 mL). The mixture was stirred at 37° C. vigorously. After 2 h, the sample was tested by GPC for the formation of polymer.

DIPU polymer (poly(4a/5d)): 1,3-Bis(isocyanatomethyl) cyclohexane (4a, 203 mg, 1.05 mmol) and N,N'-diisopropylethylene-diamine (5d, 151 mg, 1.05 mmol) in equimolar amounts were dissolved in DMF (1.00 mL). The mixture was stirred at 37° C. vigorously. After 2 h, the sample was tested by GPC for the formation of polymer. Then the mixture was added another molar equivalence of compound 5d (153 mg, 1.06 mmol) and DMF (0.43 mL), and reacted for 20 h and then sent for another GPC test for the degradation of polymer (FIGS. 11-13).

Example 6

Stability of TBEU Bonds to Water

Water stability issue of TBEU and potential way to solve the problem. One concern about HUB chemistry in real applications is its instability to moisture, since the isocyanate intermediate produced by HUB dissociation might slowly react with water. TBEU has a large binding constant for forming urea so that the concentration of free isocyanate is very low, which reduces the kinetics of degradation in moisture. Additionally, the existence of free hindered amine can further reduce the concentration of free isocyanate according to the equilibrium equation: [isocyanate]=[urea]/$K_{eq}$·[amine], and thus reduce the hydrolysis kinetics. Hydrolysis of TBEU compound 3c was studied in 1% water/DMSO solution with or without free amine 2c. After staying at room temperature for 120 hours (5 days), a small shoulder peak showed up in the solution without the coexistence of 2c, illustrating the partial hydrolysis of TBEU bond. On the contrary, negligible hydrolysis was observed for sample containing the free amine.

Experimental Procedures: In a NMR tube was added urea 3c (11.5 mg), $d_6$-DMSO (0.5 mL), and $D_2O$ (5 mg, 1% in DMSO, experiment a). In another NMR tube, hindered amine 2c (8.6 mg) was also added with the species mentioned above (experiment b). The hydrolysis was monitored with time going by $^1$H-NMR (FIGS. 14 and 15).

Example 7

Materials Mechanical Property Characterization

Stress-strain experiments: Stress-strain experiments were performed on a custom built bi-directional screw driven rail table allowed tensile testing of samples with both grips translating simultaneously and in opposite directions, keeping the center of mass of the sample stationary. The samples were extended at the speed of 2 mm $s^{-1}$. Load was measured via a 22 N capacity load cell.

Creep-recovery experiments: The samples were fixed by the grips and pulled to a certain strain (about 50%) and stayed for 60 minutes. Afterward, the stress was released and the samples were allowed to relax for another 60 minutes.

Self-healing experiments: The samples were cut by a blade and then gently put back together. Then the samples were left to heal at 37° C. for various times without the protection of inert gas. The samples after self-healing were subjected to stress-strain experiments to test the recovery of breaking strain. See FIGS. 16-18.

While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

All publications, patents, and patent documents are incorporated by reference herein, as though individually incorporated by reference. No limitations inconsistent with this disclosure are to be understood therefrom. The disclosure has been described with reference to various specific and exemplary embodiments and techniques. However, it should be understood that many variations and modifications may be made while remaining within the spirit and scope of the disclosure.

Exemplary Embodiments

Exemplary embodiment 1. A polyurea polymer of Formula (I'):

(I')

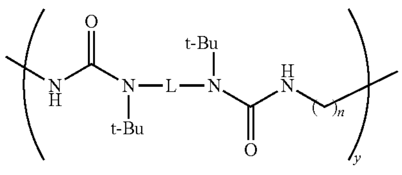

wherein

L is ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$)alkyl, ($C_6$-$C_{10}$)aryl, ($C_1$-$C_{20}$)alkyl($C_6$-$C_{10}$)aryl, ($C_1$-$C_{20}$)alkyl($C_6$-$C_{10}$)aryl($C_1$-$C_{20}$)alkyl, or ($C_2$-$C_{20}$)alkyl-PEG-($C_2$-$C_{20}$)alkyl;

n is 2-12; and y is about 5 to about 500.

Exemplary embodiment 2. The polyurea polymer of exemplary embodiment 1 wherein L is ($C_2$-$C_{20}$)alkyl.

Exemplary embodiment 3. The polyurea polymer of exemplary embodiment 1 or 2 wherein n is 4-8.

Exemplary embodiment 4. The polyurea polymer of any one of exemplary embodiments 1-3 wherein y is 10 to about 100.

Exemplary embodiment 5. The polyurea polymer of any one of exemplary embodiments 1-4 wherein the polymer displays dynamic urea bonding where the t-Bu urea bonds of Formula (I) reversibly dissociate into stable isocyanate and amine moieties, and the dissociation has a $K_{eq}$ of greater than $10^7$ $M^{-1}$ and a $k_{-1}$ of at least 0.03 $h^{-1}$ at 23° C.

Exemplary embodiment 6. A copolymer comprising the polymer of anyone of exemplary embodiments 1-5 and a polyurethane polymer.

Exemplary embodiment 7. The copolymer of exemplary embodiment 6 further comprising polyethylene glycol segments.

Exemplary embodiment 8. The copolymer of exemplary embodiment 7 wherein the copolymer comprises cross-linking.

Exemplary embodiment 9. The copolymer of exemplary embodiment 8 wherein the crosslinking comprises triethanolamine moieties.

Exemplary embodiment 10. A copolymer comprising a polyurea segment, a polyurethane segment, and a polyethylene glycol segment, wherein the copolymer comprises crosslinking with triethanolamine moieties, and the polyurea segment comprises tert-butyl groups on one of the nitrogen moieties of the urea bonds that render the urea linkages reversibly dissociable.

Exemplary embodiment 11. The copolymer of exemplary embodiment 10 wherein the copolymer is derived from an alkyl diisocyanate, a polyethylene glycol chain extender, a triealkanolamine cross-linker, and an alkane diamine of the formula (t-Bu)NH—(($C_2$-$C_{20}$)alkyl)NH(t-Bu).

Exemplary embodiment 12. A copolymer comprising a poly(urea-urethane) of Formula (II'):

to provide a cross-linked poly (urea-urethane) polymer.

Exemplary embodiment 14. The method of exemplary embodiment 13 wherein the diisocyanate is a $C_2$-$C_{12}$ diisocyanate.

Exemplary embodiment 15. The method of exemplary embodiment 13 or 14 wherein the alkyl diamine has the formula (t-Bu)NH—(($C_2$-$C_{20}$)alkyl)NH(t-Bu).

Exemplary embodiment 16. The method of any one of exemplary embodiments 13-15 wherein the trialkanolamine is triethanolamine.

Exemplary embodiment 17. The method of any one of exemplary embodiments 13-16 wherein the polyethylene glycol is tetraethylene glycol.

Exemplary embodiment 18. The method of any one of exemplary embodiments 13-17 wherein the condensation reaction catalyst is dibutyltin diacetate.

Exemplary embodiment 19. The method of any one of exemplary embodiments 13-18 wherein the copolymer is cured at about room temperature to about 75° C.

Exemplary embodiment 20. The method of any one of exemplary embodiments 13-19 wherein the cross-linked poly (urea-urethane) polymer is a reversible polymer at room temperature.

Exemplary embodiment 20A. The method of any one of exemplary embodiments 13-20 wherein the stoichiometry of the components is such that a gel point is achieved.

Exemplary embodiment 21. A composition comprising a polyurea of any one of exemplary embodiments 1-5 or a copolymer of any one of exemplary embodiments 6-10, and one or more additional polymers.

Exemplary embodiment 22. The composition of exemplary embodiment 18 wherein the composition is a coating, fiber, adhesive, or plastic.

(II')

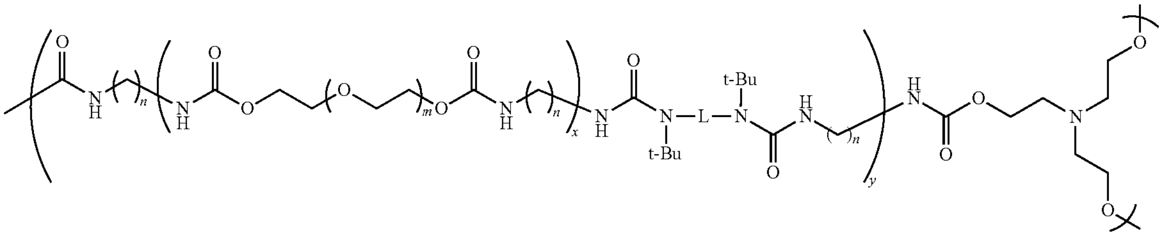

wherein n is 2-12;

m is 2-50;

x is 0-100;

y is 1-100;

L is ($C_2$-$C_{20}$)alkyl, ($C_4$-$C_{10}$)cycloalkyl, ($C_1$-$C_{20}$)alkyl($C_4$-$C_{10}$)cycloalkyl, ($C_1$-$C_{20}$)alkyl($C_4$-$C_{10}$)cycloalkyl($C_1$-$C_{20}$) alkyl, ($C_6$-$C_{10}$)aryl, ($C_1$-$C_{20}$)alkyl($C_6$-$C_{10}$)aryl, ($C_1$-$C_{20}$) alkyl($C_6$-$C_{10}$)aryl($C_1$-$C_{20}$)alkyl, or ($C_2$-$C_{20}$)alkyl-PEG-($C_2$-$C_{20}$)alkyl.

Exemplary embodiment 13. A method for preparing a copolymer comprising dynamic urea moieties comprising:

contacting an alkyl diisocyanate and an alkyl diamine in solution, wherein the amines of the alkyl diamine comprise a tert-butyl substituent in a solvent system to form an oligo-urea;

contacting the oligo-urea with a trialkanolamine and a polyethylene glycol in the presence of a condensation reaction catalyst, thereby initiating cross-linking;

Exemplary embodiment 23. A polyurea of any one of exemplary embodiments 1-5 or a copolymer of any one of exemplary embodiments 6-10, wherein the polyurea or copolymer is self-healing.

Exemplary embodiment 24. A polyurea polymer of Formula (III'):

(III')

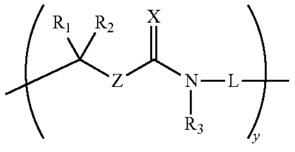

wherein $R_1$ is ($C_2$-$C_{20}$)alkyl or H;

$R_2$ is ($C_2$-$C_{20}$)alkyl or H;

$R_3$ is t-Bu, i-Pr, Et, Me, cycloalkyl, adamantane, phenyl, or a bulky alkyl or aryl group;

X is O or S;

Z is O, S or NH;

L is a linear, branched or network polymer or a small molecule linker, $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, or $(C_2$-$C_{20})$alkyl-PEO-$(C_2$-$C_{20})$alkyl, phenyl, or $(C_1$-$C_{20})$alkylphenyl$(C_1$-$C_{20})$alkyl; and alkyl, $(C_6$-$C_{10})$aryl, $(C_1$-$C_{20})$alkyl$(C_6$-$C_{11})$aryl, $(C_1$-$C_{20})$alkyl$(C_6$-$C_{10})$aryl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

M is alkyl or phenyl;

R is t-Bu, i-Pr, Et, Me, cycloalkyl, adamantane, or phenyl;

X is O or S; and y is 5 to about 500.

Exemplary embodiment 27. A polyurea polymer of Formula (VI'):

(VI')

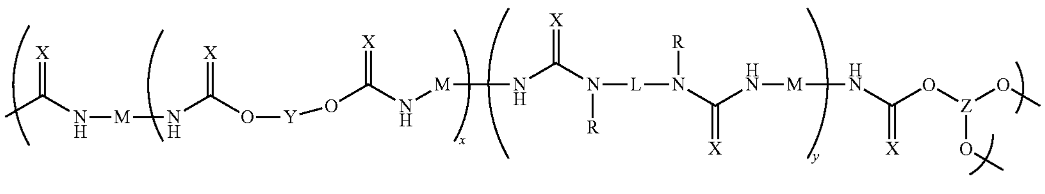

y is about 5 to about 500.

Exemplary embodiment 25. A polyurea polymer of Formula (IV'):

(IV')

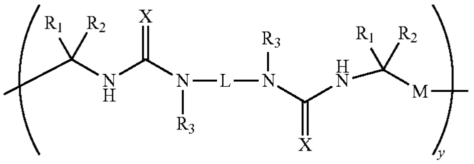

wherein

L is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{11})$aryl, $(C_1$-$C_{20})$alkyl$(C_6$-$C_{10})$aryl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

M is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

$R_1$ is $(C_2$-$C_{20})$alkyl, H $R_2$ is $(C_2$-$C_{20})$alkyl, H $R_3$ is t-Bu, i-Pr, Et, Me, cycloalkyl, adamantane, phenyl, or a bulky aryl or alkyl group;

X is O or S; and

Y is about 5 to about 500.

Exemplary embodiment 26. A polyurea polymer of Formula (V'):

(V')

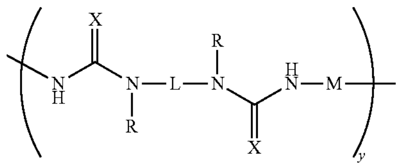

wherein

L is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$ wherein L is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{11})$aryl, $(C_1$-$C_{20})$alkyl$(C_6$-$C_{10})$aryl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

M is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

Y is $(C_2$-$C_{20})$alkyl, $(C_4$-$C_{10})$cycloalkyl, $(C_1$-$C_{20})$alkyl$(C_4$-$C_{10})$cycloalkyl, $(C_1$-$C_{20})$alkyl$(C_4$-$C_{10})$cycloalkyl$(C_1$-$C_{20})$alkyl, $(C_6$-$C_{10})$aryl, $(C_1$-$C_{20})$alkyl$(C_6$-$C_{10})$aryl, $(C_1$-$C_{20})$alkyl$(C_6$-$C_{10})$aryl$(C_1$-$C_{20})$alkyl, or $(C_2$-$C_{20})$alkyl-PEG-$(C_2$-$C_{20})$alkyl, phenyl, or $(C_1$-$C_{20})$alkylphenyl$(C_1$-$C_{20})$alkyl;

R is t-Bu, i-Pr, Et, Me, cycloalkyl, adamantane, or phenyl;

X is O or S;

Z is a 3-8 arm cross-linker moiety; and y is 5 to about 500.

What is claimed is:

1. A copolymer comprising a polyurea polymer, a polyurethane polymer, polyethylene glycol segments, and triethanolamine crosslinking moieties, wherein the polyurea polymer is selected from, (A) A polyurea polymer of Formula (IIIa) consisting of:

(IIIa)

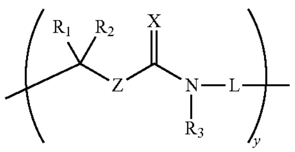

wherein $R_2$ is $(C_2$-$C_{20})$alkyl or H;

$R_2$ is $(C_2$-$C_{20})$alkyl or H;

$R_3$ is t-Bu;

X is O or S;

Z is O, S or NH;

L is a linear, branched or network polymer or a small molecule linker, $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $(C_1\text{-}C_{20})$alkylphenyl$(C_1\text{-}C_{20})$alkyl; and y is about 5 to about 500, and wherein the polymer displays reversible dynamic properties where the substituted urea bonds of Formula (IIIa) dissociate into stable isocyanate and amine moieties and the dissociation has a $K_{eq}$ of less than $10^7$ $M^{-1}$ and a $k_{-1}$ of at least 0.03 $h^{-1}$ at 23° C.;

(B) a polyurea polymer of Formula (Ia) consisting of:

(Ia)

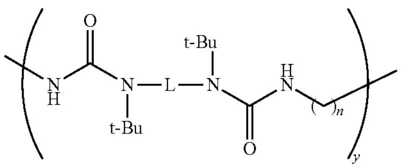

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, or $(C_2\text{-}C_{20})$alkyl-TEG-$(C_2\text{-}C_{20})$alkyl;

n is 2-12; and y is about 5 to about 500, and wherein the polymer displays reversible dynamic properties where the t-Bu urea bonds of Formula (Ia) dissociate into stable isocyanate and amine moieties and the dissociation has a $K_{eq}$ of less than $10^7$ $M^{-1}$ and a $k_{-1}$ of at least 0.03 $h^{-1}$ at 23° C.;

(C) a polyurea polymer of Formula (IVa) consisting of:

(IVa)

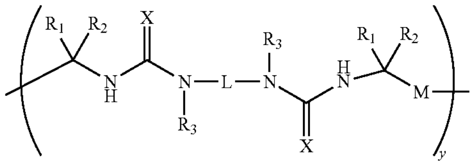

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

M is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

$R_1$ is $(C_2\text{-}C_{20})$alkyl, H $R_2$ is $(C_2\text{-}C_{20})$alkyl, H $R_3$ is t-Bu;

X is O or S; and

Y is about 5 to about 500, and wherein the polymer displays reversible dynamic properties where the substituted urea bonds of Formula (IVa) dissociate into stable isocyanate and amine moieties and the dissociation has a $K_{eq}$ of less than $10^7$ $M^{-1}$ and a $k_{-1}$ of at least 0.03 $h^{-1}$ at 23° C.; or (D) a polyurea polymer of Formula (Va) consisting of:

(Va)

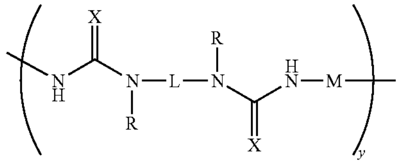

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

M is alkyl or phenyl;

R is t-Bu;

X is O or S; and

Y is about 5 to about 500, and wherein the polymer displays reversible dynamic properties where the substituted urea bonds of Formula (Va) dissociate into stable isocyanate and amine moieties and the dissociation has a $K_{eq}$ of less than $10^7$ $M^{-1}$ and a $k_{-1}$ of at least 0.03 $h^{-1}$ at 23° C.

2. A copolymer according to claim 1 wherein the polyurea polymer is a polyurea polymer of Formula (IIIa) consisting of:

(IIIa)

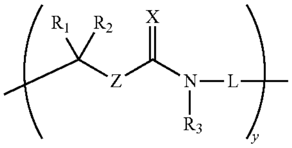

wherein $R_1$ is $(C_2\text{-}C_{20})$alkyl or H;

$R_2$ is $(C_2\text{-}C_{20})$alkyl or H;

$R_3$ is t-Bu;

X is O or S;

Z is O, S or NH;

L is a linear, branched or network polymer or a small molecule linker, $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $(C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $(C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $(C_1\text{-}C_{20})$alkylphenyl$C_1\text{-}C_{20})$alkyl; and y is about 5 to about 500, and wherein the polymer displays reversible dynamic properties where the substituted urea bonds of Formula (IIIa) dissociate into stable isocyanate and amine moieties and the dissociation has a $K_{eq}$ of less than $10^7$ $M^{-1}$ and a $k_{-1}$ of at least 0.03 $h^{-1}$ at 23 ° C.

3. A copolymer according to claim 1 wherein the polyurea polymer is a polyurea polymer of Formula (Ia) consisting of:

(Ia)

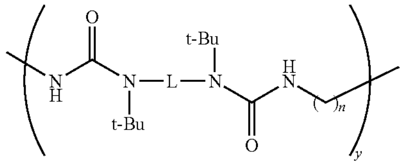

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $C_1\text{-}C_{20})$alkyl$(C_6\text{-}C_{10})$aryl$(C_1\text{-}C_{20})$alkyl, or $(C_2\text{-}C_{20})$alkyl-TEG-$(C_2\text{-}C_{20})$alkyl;

n is 2-12; and y is about 5 to about 500, and wherein the polymer displays reversible dynamic properties where the t-Bu urea bonds of Formula (la) dissociate into stable isocyanate and amine moieties and the dissociation has a $K_{eq}$ of less than $10^7$ $M^{-1}$ and a $k_{-1}$ of at least 0.03 $h^{-1}$ at 23° C.

4. A copolymer according to claim 3 wherein L is $(C_2\text{-}C_{20})$alkyl.

5. A copolymer according to claim 3 wherein n is 4-8.

6. A copolymer according to claim 3, wherein y is 10 to about 100.

7. A copolymer according to claim 1 wherein the polyurea polymer is a polyurea polymer of Formula (IVa) consisting of:

(IVa)

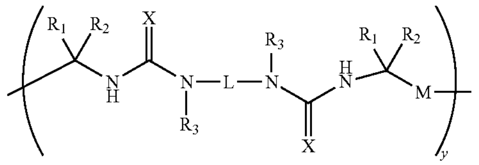

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

M is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

$R_1$ is $(C_2\text{-}C_{20})$alkyl, H $R_2$ is $(C_2\text{-}C_{20})$alkyl, H $R_3$ is t-Bu;

X is O or S; and y is about 5 to about 500, and wherein the polymer displays reversible dynamic properties where the substituted urea bonds of Formula (IVa) dissociate into stable isocyanate and amine moieties and the dissociation has a $K_{eq}$ of less than $10^7$ $M^{-1}$ and a $k_{-1}$ of at least 0.03 $h^{-1}$ at 23° C.

8. A copolymer according to claim 1 wherein the polyurea polymer is a polyurea polymer of Formula (Va) consisting of:

(Va)

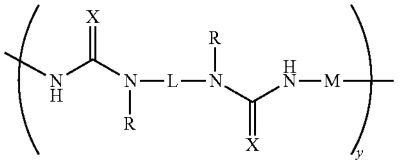

wherein

L is $(C_2\text{-}C_{20})$alkyl, $(C_4\text{-}C_{10})$cycloalkyl, $(C_1\text{-}C_{20})$alkyl$(C_4\text{-}C_{10})$cycloalkyl, $C_1\text{-}C_{20})$alkyl$(C_4\text{-}C_{10})$cycloalkyl$(C_1\text{-}C_{20})$alkyl, $(C_6\text{-}C_{10})$aryl, $(C_1\text{-}C_{20})$alkyl$(C_6\text{-}C_{10})$aryl, $C_1\text{-}C_{20})$alkyl$(C_6\text{-}C_{10})$aryl$(C_1\text{-}C_{20})$alkyl, $(C_2\text{-}C_{20})$alkyl-TEG-$(C_2\text{-}C_{20})$alkyl, phenyl, or $C_1\text{-}C_{20})$alkylphenyl$(C_1\text{-}C_{20})$alkyl;

M is alkyl or phenyl;

R is t-Bu;

X is O or S; and y is about 5 to about 500, and wherein the polymer displays reversible dynamic properties where the substituted urea bonds of Formula (Va) dissociate into stable isocyanate and amine moieties and the dissociation has a $K_{eq}$ of less than $10^7$ $M^{-1}$ and a $k_{-1}$ of at least 0.03 $h^{-1}$ at 23° C.

9. The polyurea polymer of claim 4 wherein n is 4-8.

10. The polyurea polymer of claim 4, wherein y is 10 to about 100.

11. The polyurea polymer of claim 8, wherein y is 10 to about 100.

* * * * *